(12) United States Patent
Isobe et al.

(10) Patent No.: US 12,147,170 B2
(45) Date of Patent: Nov. 19, 2024

(54) IMAGE FORMING APPARATUS HAVING TONER CHARGING

(71) Applicant: Canon Kabushiki Kaisha, Tokyo (JP)

(72) Inventors: Yuta Isobe, Meridian, ID (US);
Kuniaki Tamagaki, Kanagawa (JP);
Takashi Koyanagi, Shizuoka (JP);
Akihisa Matsukawa, Tokyo (JP);
Ryosuke Kanai, Kanagawa (JP);
Hiroki Tanaka, Kanagawa (JP);
Motonari Ito, Shizuoka (JP); Kazuhisa Shida, Kanagawa (JP); Makoto Fukatsu, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 582 days.

(21) Appl. No.: 17/437,987

(22) PCT Filed: Mar. 11, 2020

(86) PCT No.: PCT/JP2020/010425
§ 371 (c)(1),
(2) Date: Sep. 10, 2021

(87) PCT Pub. No.: WO2020/184595
PCT Pub. Date: Sep. 17, 2020

(65) Prior Publication Data
US 2022/0187734 A1 Jun. 16, 2022

(30) Foreign Application Priority Data

Mar. 11, 2019 (JP) .................................. 2019-044320
Mar. 11, 2019 (JP) .................................. 2019-044321

(51) Int. Cl.
*G03G 15/08* (2006.01)
*C08G 18/78* (2006.01)
(Continued)

(52) U.S. Cl.
CPC ......... *G03G 15/065* (2013.01); *C08G 18/785* (2013.01); *G03G 15/0808* (2013.01);
(Continued)

(58) Field of Classification Search
USPC ............................................................ 399/88
See application file for complete search history.

(56) References Cited

U.S. PATENT DOCUMENTS 7,346,301 B2 3/2008 Hashimoto et al.
10,831,125 B2 11/2020 Ito et al.
(Continued)

FOREIGN PATENT DOCUMENTS

EP 2309335 A1 4/2011
JP H11-190959 A 7/1999
(Continued)

OTHER PUBLICATIONS

International Search Report and Written Opinion issued in corresponding parent International Application No. PCT/JP2020/010425 dated Sep. 16, 2020.
(Continued)

*Primary Examiner* — Quana Grainger
(74) *Attorney, Agent, or Firm* — VENABLE LLP

(57) ABSTRACT

An image forming apparatus includes a developer carrying member that bears and conveys developer. The developer carrying member has at least a base and a surface layer, with the surface layer having an electron donating portion that mainly donates charge to the developer when the developer and the surface layer make frictional contact to exchange charge and an electron accepting portion that mainly accepts charge from the developer when the developer and the surface layer makes frictional contact to exchange charge. A controller applies an AC voltage to the developer carrying member during a period in which an image forming opera-
(Continued)

tion is not performed and the developer carrying member is driven, with the AC voltage being different from that applied during an image forming period, and a rotating speed of the developer carrying member during a non-image forming period is slower than that during an image forming period.

64 Claims, 28 Drawing Sheets

(51) Int. Cl.
G03G 15/00 (2006.01)
G03G 15/06 (2006.01)
G03G 21/20 (2006.01)
(52) U.S. Cl.
CPC ..... *G03G 15/0812* (2013.01); *G03G 15/0817* (2013.01); *G03G 15/0818* (2013.01); *G03G 15/5004* (2013.01); *G03G 21/203* (2013.01)

(56) References Cited

U.S. PATENT DOCUMENTS

| | | | |
|---|---|---|---|
| 11,029,622 | B2 | 6/2021 | Yamaguchi et al. |
| 2008/0240759 | A1 | 10/2008 | Kouno |
| 2011/0085808 | A1* | 4/2011 | Hirata ................. G03G 15/0877 399/27 |
| 2012/0237236 | A1* | 9/2012 | Nakade ................. G03G 15/065 399/55 |
| 2020/0199402 | A1 | 6/2020 | Yamaguchi et al. |
| 2020/0201203 | A1 | 6/2020 | Ito et al. |

FOREIGN PATENT DOCUMENTS

| | | |
|---|---|---|
| JP | 2002-091163 A | 3/2002 |
| JP | 2002-207354 A | 7/2002 |
| JP | 2003-215893 A | 7/2003 |
| JP | 2004-102140 A | 4/2004 |
| JP | 2004-333709 A | 11/2004 |
| JP | 2005-049717 A | 2/2005 |
| JP | 2006-317524 A | 11/2006 |
| JP | 2007-199623 A | 8/2007 |
| JP | 2008-249821 A | 10/2008 |
| JP | 2009-042258 A | 2/2009 |
| JP | 2010-139547 A | 6/2010 |
| JP | 2012-027282 A | 2/2012 |
| JP | 2013050715 | 3/2013 |
| JP | 2014029496 A | 2/2014 |
| JP | 2014-191195 A | 10/2014 |
| JP | 6463534 B1 | 3/2019 |

OTHER PUBLICATIONS

Japanese Office Action dated Mar. 28, 2023, in related Japanese Patent Application No. 2019-044320.
Japanese Office Action dated Jan. 10, 2023, in related Japanese Patent Application No. 2019-044320.
Japanese Office Action dated Jan. 10, 2023, in related Japanese Patent Application No. 2019-044321.

* cited by examiner

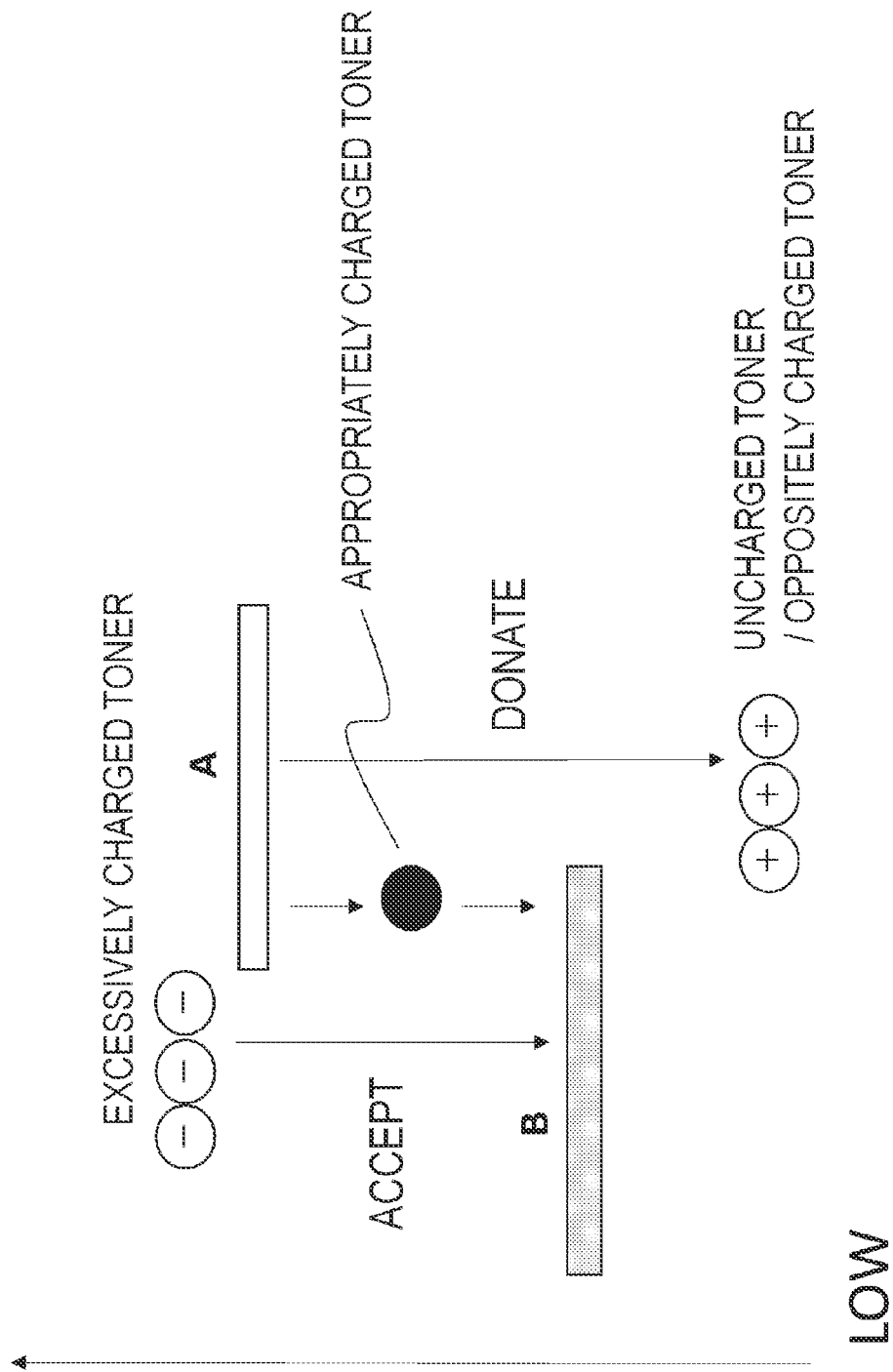

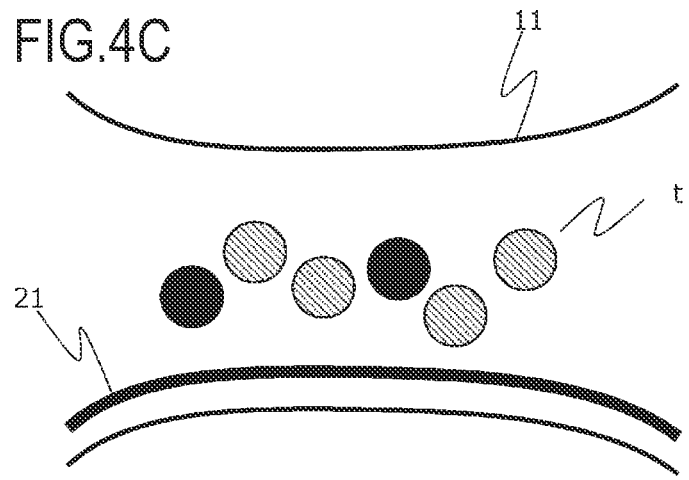
FIG.4C
FIG.4D
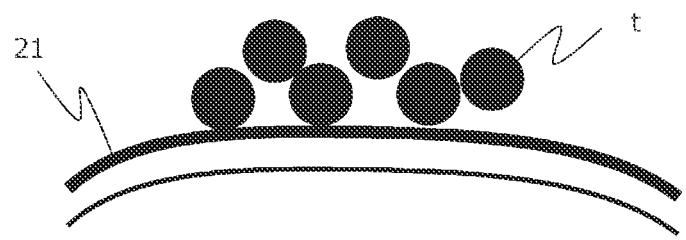

(a) NORMAL ENVIRONMENT (b) LOW-TEMPERATURE AND LOW-HUMIDITY ENVIRONMENT

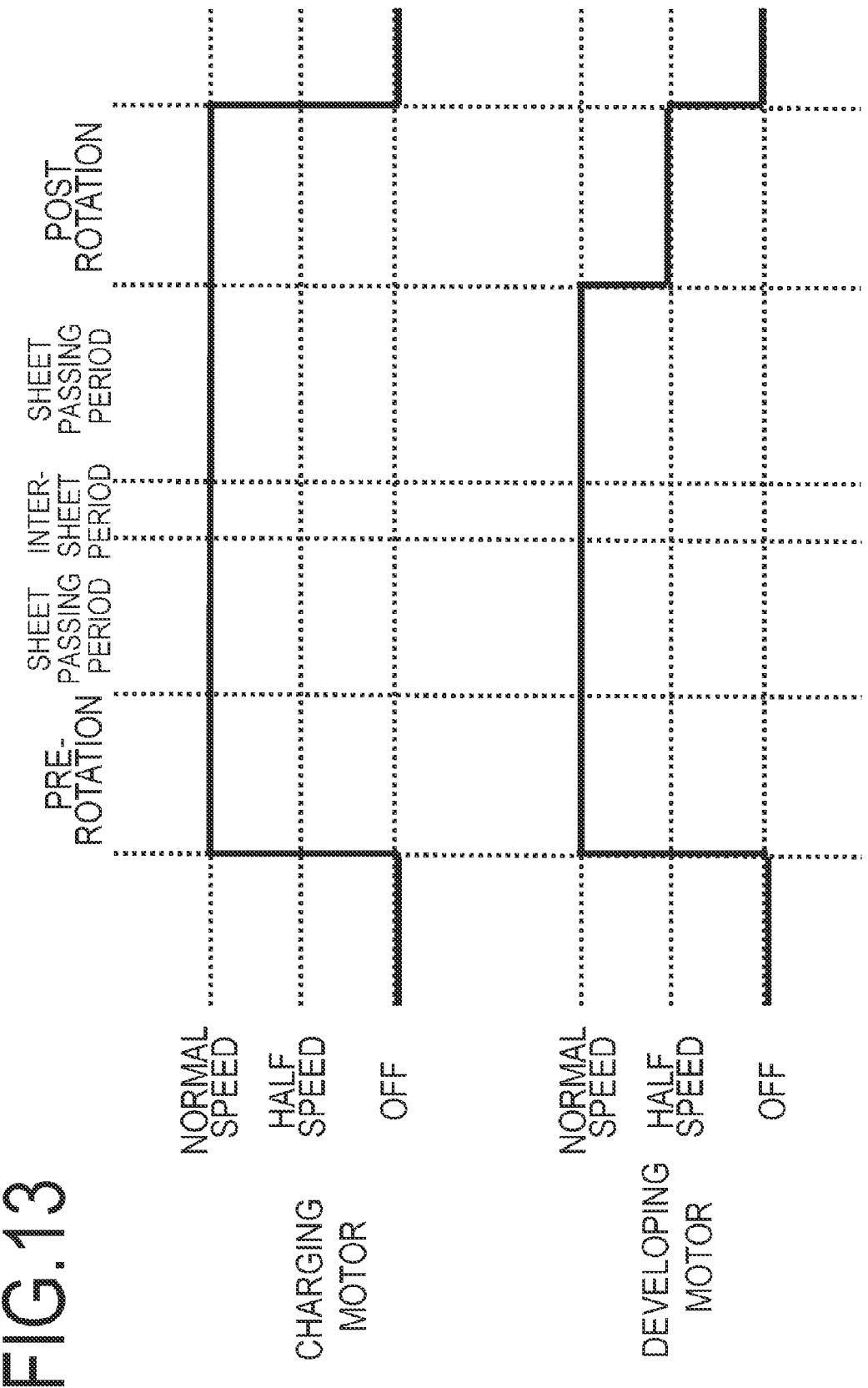

IMAGE FORMING APPARATUS HAVING TONER CHARGING

TECHNICAL FIELD

The present invention relates to an image forming apparatus.

BACKGROUND ART

An electrophotographic image forming apparatus such as a copier and a laser beam printer radiates light corresponding to image data to an electrophotographic photosensitive member (a photosensitive member) to form an electrostatic image (a latent image). A developer toner which is a printing material is supplied from a developing apparatus to the electrostatic image to develop the electrostatic image as a toner image. The toner image is transferred from the photosensitive member to a recording material such as a recording sheet by a transfer apparatus. Furthermore, the toner image is fixed to the recording material by a fixing apparatus whereby a printing image is formed.

Various apparatuses have been proposed as a developing apparatus which uses a dry one-component developing method. For example, the following apparatuses are known. That is, a one-component developer (toner) is borne on a developing sleeve as a developer carrying member and a uniform toner layer is formed by a layer thickness regulating member. In this case, charge is provided to the toner layer on the developing sleeve due to friction with the developing sleeve. The developing sleeve is held with a very small gap with respect to a photosensitive drum as an image bearing member. A developing bias voltage composed of an AC component, for example, is applied to the developing sleeve so that a potential difference is generated between the electrostatic image on the photosensitive member and the developing sleeve. In this way, the toner is moved to the electrostatic image and developing is performed.

In order to obtain a satisfactory image quantity in developing, it is very important to stably provide charge to the toner on the developing sleeve. Therefore, a developing sleeve including a surface layer having a resin containing a quaternary ammonium base or a tertiary amine group in order to enhance a toner charge donating ability has been proposed (PTL 1).

CITATION LIST

Patent Literature

[PTL 1] Japanese Patent Application Publication No. 2013-050715
[PTL 2] Japanese Patent Application Publication No. 2014-29496

SUMMARY OF INVENTION

Technical Problem

However, in the conventional example, for example, the toner applied to a developer carrying member may be charged excessively under a low-temperature and low-humidity environment. Such toner charged excessively is a factor that causes various image defects. For example, the excessively charged toner is strongly fixed by image force acting between the toner and the developer carrying member, the fixing force exceeds regulating force of a toner regulating member, and a regulation detect which is disorder of the toner layer on the developer carrying member occurs. Moreover, the regulation defect is a factor that causes an image defect such as fogging and density abnormality.

The present invention has been made in view of the above-described problems. An object of the present invention is to provide a developing apparatus capable of suppressing excessive charging of toner while maintaining a toner charge donating ability sufficient for developing.

Solution to Problem

The present invention employs the following configurations.

An image forming apparatus of the present invention comprising:
an image bearing member that forms an electrostatic latent image;
a developer container that stores a developer;
a developer carrying member that bears and conveys the developer;
a regulating member that makes contact with the developer carrying member to regulate a layer thickness of the developer borne by the developer carrying member;
an interval maintaining member that maintains a distance between the image bearing member and the developer carrying member;
a power source that applies a voltage to the developer carrying member; and
a controller that controls the power source, wherein
the developer carrying member has at least a base and a surface layer,
the surface layer has an electron donating portion that mainly donates charge to the developer when the developer and the surface layer make frictional contact to exchange charge and an electron accepting portion that mainly accepts charge from the developer when the developer and the surface layer make frictional contact to exchange charge, and
the controller applies an AC voltage to the developer carrying member during a period in which an image forming operation is not performed and the developer carrying member is driven, the AC voltage being different from that applied during an image forming period.

An image forming apparatus of the present invention comprising:
an image bearing member that forms an electrostatic latent image;
a developer container that stores a developer;
a developer carrying member that bears and conveys the developer;
a regulating member that makes contact with the developer carrying member to regulate a layer thickness of the developer borne by the developer carrying member;
an interval maintaining member that maintains a distance between the image bearing member and the developer carrying member;
a power source that applies a voltage to the developer carrying member; and
a controller that controls the power source, wherein
the developer carrying member has at least a base and a surface layer,
the surface layer contains a urethane resin having a carbonate bond and containing a tertiary amine structure, and the controller applies an AC voltage to the developer carrying member during a period in which an image forming operation is not performed and the developer carrying member is driven, the AC voltage being different from that applied during an image forming period.

An image forming apparatus of the present invention comprising:
an image bearing member that forms an electrostatic latent image;
a developer container that stores a developer;
a developer carrying member that makes contact with the image bearing member, and bears and conveys the developer;
a regulating member that makes contact with the developer carrying member to regulate a layer thickness of the developer borne by the developer carrying member;
a power source that applies a voltage to the developer carrying member; and
a controller that controls the power source, wherein
the developer bearing member has at least a base and a surface layer,
the surface layer has an electron donating portion that mainly donates charge to the developer when the developer and the surface layer make frictional contact to exchange charge and an electron accepting portion that mainly accepts charge from the developer when the developer and the surface layer make frictional contact to exchange charge, and
the controller applies an AC voltage to the developer carrying member during a period in which an image forming operation is not performed and the developer carrying member is driven.

An image forming apparatus of the present invention comprising:
an image bearing member that forms an electrostatic latent image;
a developer container that stores a developer;
a developer bearing member that makes contact with the image bearing member, and bears and conveys the developer;
a regulating member that makes contact with the developer carrying member to regulate a layer thickness of the developer borne by the developer carrying member;
a power source that applies a voltage to the developer carrying member; and
a controller that controls the power source, wherein
the developer carrying member has at least a base and a surface layer,
the surface layer contains a urethane resin having a carbonate bond and containing a tertiary amine structure, and
the controller applies an AC voltage to the developer carrying member during a period in which an image forming operation is not performed and the developer carrying member is driven.

An image forming apparatus of the present invention comprising:
an image bearing member;
a developer carrying member that makes contact with the image bearing member and conveys a developer to the image bearing member;
a control portion that controls a potential difference between the image bearing member and the developer carrying member; and
a detecting portion that detects a state in which the image forming apparatus is used, wherein the developer carrying member has at least a base and a surface layer,
the surface layer has (A) a charge donating portion that mainly donates charge to the developer when the developer and the surface layer make frictional contact to exchange charge and (B) a charge accepting portion that mainly accepts charge from the developer when the developer and the surface layer make frictional contact to exchange charge, and
when the detecting portion detects a predetermined state, the control portion increases an absolute value of the potential difference at a predetermined timing so as to be larger than that before the predetermined state is detected.

An image forming apparatus of the present invention comprising:
an image bearing member;
a developer carrying member that makes contact with the image bearing member and conveys a developer to the image bearing member;
a layer thickness regulating member that makes contact with the developer carrying member to regulate a layer thickness of the developer borne by the developer carrying member;
a control portion that controls a potential difference between the developer bearing member and the layer thickness regulating member; and
a detecting portion that detects a state in which the image forming apparatus is used, wherein
the developer carrying member has at least a base and a surface layer,
the surface layer has (A) a charge donating portion that mainly donates charge to the developer when the developer and the surface layer make frictional contact to exchange charge and (B) a charge accepting portion that mainly accepts charge from the developer when the developer and the surface layer make frictional contact to exchange charge, and
when the detecting portion detects a predetermined state, the control portion increases an absolute value of the potential difference at a predetermined timing so as to be larger than that before the predetermined state is detected.

An image forming apparatus of the present invention comprising:
an image bearing member;
a developer container that stores a developer;
a developer carrying member that is disposed in an opening of the developer container to make contact with the image bearing member and convey the developer to the image bearing member;
a developer sealing member having one end fixed to the developer container and the other end which is a free end making sliding contact with the developer carrying member;
a first bias application portion that applies a bias to the developer bearing member; and
a second bias application portion that applies a bias to the developer sealing member, wherein
the developer carrying member has at least a base and a surface layer,
the surface layer has (A) a charge donating portion that mainly donates charge to the developer when the developer and the surface layer makes frictional contact to exchange charge and (B) a charge accepting portion that mainly accepts charge from the developer when the developer and the surface layer makes frictional contact to exchange charge, a surface of the developer sealing member has conductive properties, and the first bias application portion applies a bias to the developer carrying member and the second bias application portion applies a bias to the developer sealing member so that a difference between a DC component of the bias applied to the developer carrying member and a DC component of the bias on the surface of the developer sealing member is formed.

An image forming apparatus of the present invention comprising:

an image bearing member;

a developer carrying member that makes contact with the image bearing member and conveys a developer to the image bearing member; and a control portion that controls a rotating speed of the developer carrying member, wherein the developer carrying member has at least a base and a surface layer, the surface layer has (A) a charge donating portion that mainly donates charge to the developer when the developer and the surface layer make frictional contact to exchange charge and (B) a charge accepting portion that mainly accepts charge from the developer when the developer and the surface layer make frictional contact to exchange charge, and the control portion decreases the rotating speed of the developer carrying member during a non-image forming period so as to be slower than the rotating speed during an image forming period.

An image forming apparatus of the present invention comprising:

an image bearing member;

a developer carrying member that makes contact with the image bearing member and conveys a developer to the image bearing member; and a layer thickness regulating member that makes contact with the developer carrying member to regulate a layer thickness of the developer borne by the developer carrying member;

a first bias application portion that applies a bias to the developer carrying member; and a third bias application portion that applies a bias to the layer thickness regulating member, wherein the developer carrying member has at least a base and a surface layer, the surface layer has (A) a charge donating portion that mainly donates charge to the developer when the developer and the surface layer make frictional contact to exchange charge and (B) a charge accepting portion that mainly accepts charge from the developer when the developer and the surface layer make frictional contact to exchange charge, the third bias application portion applies an AC bias to the layer thickness regulating member, and a wave number of the AC bias is one wave number or more within a period in which the developer passes through a nip at which the developer carrying member and the layer thickness regulating member make contact with each other.

An image forming apparatus of the present invention comprising:

an image bearing member;

a developer carrying member that makes contact with the image bearing member and conveys a developer to the image bearing member;

a control portion that controls a potential difference between the image bearing member and the developer carrying member; and a detecting portion that detects a state in which the image forming apparatus is used, wherein the developer carrying member has at least a base and a surface layer, the surface layer contains a urethane resin, the urethane resin has a carbonate bond and contains a tertiary amine structure, and when the detecting portion detects a predetermined state, the control portion increases an absolute value of the potential difference at a predetermined timing so as to be larger than that before the predetermined state is detected.

An image forming apparatus of the present invention comprising:

an image bearing member;

a developer carrying member that makes contact with the image bearing member and conveys a developer to the image bearing member;

a layer thickness regulating member that makes contact with the developer bearing member to regulate a layer thickness of the developer borne by the developer carrying member;

a control portion that controls a potential difference between the developer bearing member and the layer thickness regulating member; and a detecting portion that detects a state in which the image forming apparatus is used, wherein the developer carrying member has at least a base and a surface layer, the surface layer contains a urethane resin, the urethane resin has a carbonate bond and contains a tertiary amine structure, and when the detecting portion detects a predetermined state, the control portion increases an absolute value of the potential difference at a predetermined timing so as to be larger than that before the predetermined state is detected.

An image forming apparatus of the present invention comprising:

an image bearing member;

a developer container that stores a developer;

a developer carrying member that is disposed in an opening of the developer container to make contact with the image bearing member and convey the developer to the image bearing member;

a developer sealing member having one end fixed to the developer container and the other end which is a free end making sliding contact with the developer carrying member;

a first bias application portion that applies a bias to the developer carrying member; and a second bias application portion that applies a bias to the developer sealing member, wherein the developer carrying member has at least a base and a surface layer, the surface layer contains a urethane resin, the urethane resin has a carbonate bond and contains a tertiary amine structure, a surface of the developer sealing member has conductive properties, and the first bias application portion applies a bias to the developer carrying member and the second bias application portion applies a bias to the developer sealing member so that a difference between a DC component of the bias applied to the developer carrying member and a DC component of the bias on the surface of the developer sealing member is formed.

An image forming apparatus of the present invention comprising:

an image bearing member;

a developer carrying member that makes contact with the image bearing member and conveys a developer to the image bearing member; and a control portion that controls a rotating speed of the developer carrying member, wherein the developer carrying member has at least a base and a surface layer, the surface layer contains a urethane resin, the urethane resin has a carbonate bond and contains a tertiary amine structure, and the control portion decreases the rotating speed of the developer carrying member during a non-image forming period so as to be slower than the rotating speed during an image forming period.

An image forming apparatus of the present invention comprising:

an image bearing member;

a developer carrying member that makes contact with the image bearing member and conveys a developer to the image bearing member; and a layer thickness regulating member that makes contact with the developer carrying member to regulate a layer thickness of the developer borne by the developer carrying member;

a first bias application portion that applies a bias to the developer carrying member; and a third bias application portion that applies a bias to the layer thickness regulating member, wherein the developer carrying member has at least a base and a surface layer, the surface layer contains a urethane resin, the urethane resin has a carbonate bond and contains a tertiary amine structure, the third bias application portion applies an AC bias to the layer thickness regulating member, and a wave number of the AC bias is one wave number or more within a period in which the developer passes through a nip at which the developer carrying member and the layer thickness regulating member make contact with each other.

Advantageous Effects of Invention

According to the present invention, it is possible to provide a developing apparatus capable of suppressing excessive charging of toner while maintaining a toner charge donating ability sufficient for developing.

Further features of the present invention will become apparent from the following description of exemplary embodiments with reference to the attached drawings.

BRIEF DESCRIPTION OF DRAWINGS

FIG. 3 is a diagram for describing a function of a developing sleeve and the concept of the Fermi level.

FIG. 4C is a diagram for describing a toner electron donating and static elimination sequence of Embodiment 1.

FIG. 4D is a diagram for describing a toner electron donating and static elimination sequence of Embodiment 1.

FIG. 13 is a diagram for describing a durability test of Embodiment 4.

DESCRIPTION OF EMBODIMENTS

Figure 1:
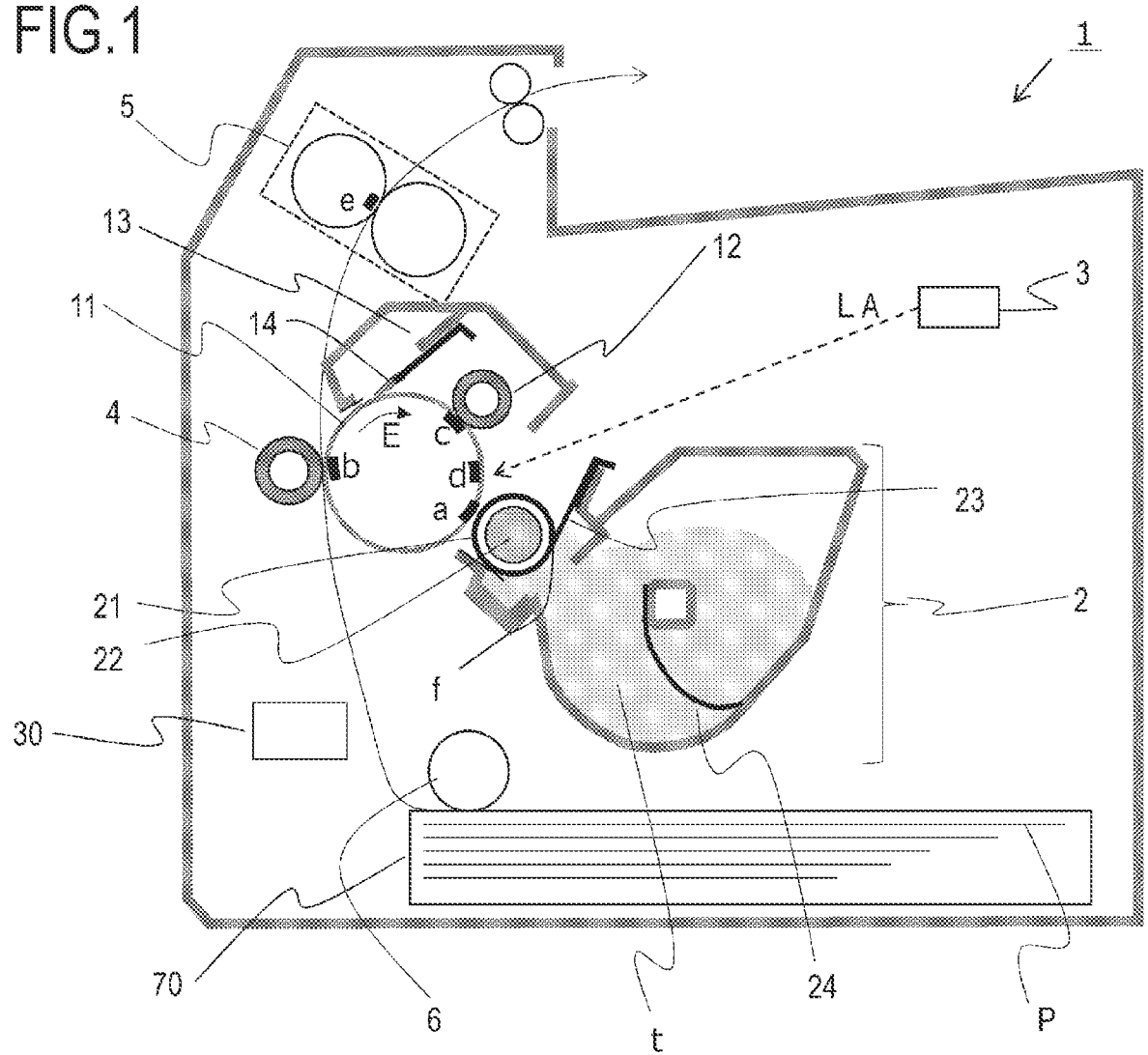
FIG. 1 is a schematic cross-sectional view of an image forming apparatus according to an embodiment of the present invention.

Hereinafter, preferred embodiments of the present invention will be described with reference to the drawings. However, dimensions, materials, shapes, relative positions, and the like of constituent components described below are changed appropriately according to a configuration and various conditions of an apparatus to which the present invention is applied. That is, the scope of the present invention is not limited to the following embodiments, <<Overview of Overall Configuration of Image Forming Apparatus>>

First, an overview of an overall configuration of an image forming apparatus according to the present invention will be described with reference to FIG. 1, Moreover, a functional block of the image forming apparatus according to the present invention will be described with reference to FIG. 7. Furthermore, a configuration of a developing sleeve according to the present invention will be described with reference to FIG. 2. Furthermore, the concept of the Fermi level according to the present invention will be described with reference to FIG. 3, in the present specification, the components of these diagrams are described mainly in association with Embodiment 1. However, the following description on the constituent components described in the drawings and the functions thereof may be applied to other embodiments unless such combinations incur technical contradictions.

FIG. 1 is a schematic cross-sectional view illustrating an overall configuration of an image forming apparatus according to the present invention. In the following description, a monochrome laser printer which uses an electrophotographic process will be described as an example of an image forming apparatus. Examples of an image forming apparatus to which the present invention can be applied include a copier, a printer, and the like which uses an electrophotographic system or an electrostatic recording system.

<Image Forming Apparatus>

An image forming apparatus 1 illustrated in FIG. 1 includes, as its main components, a photosensitive drum 11 as an image bearing member, a charging roller 12 as a charging unit, and a cleaning blade 14 as a cleaning unit of the photosensitive drum 11. Moreover, the image forming apparatus 1 includes a developing apparatus 2 as a developing unit, a laser beam scanner 3 as an exposure unit, a transfer roller 4 as a transfer unit, and a fixing roller 5 as a fixing apparatus. Moreover, the image forming apparatus 1 includes a process cartridge in which the photosensitive drum 11, the charging roller 12, the developing apparatus 2, and the like are formed as a cartridge and which is detachably attached to the image forming apparatus 1. Moreover, the image forming apparatus 1 includes a developing sleeve 21 which will be described in detail later with reference to FIG. 2.

<Functional Block Configuration>

Figure 7:
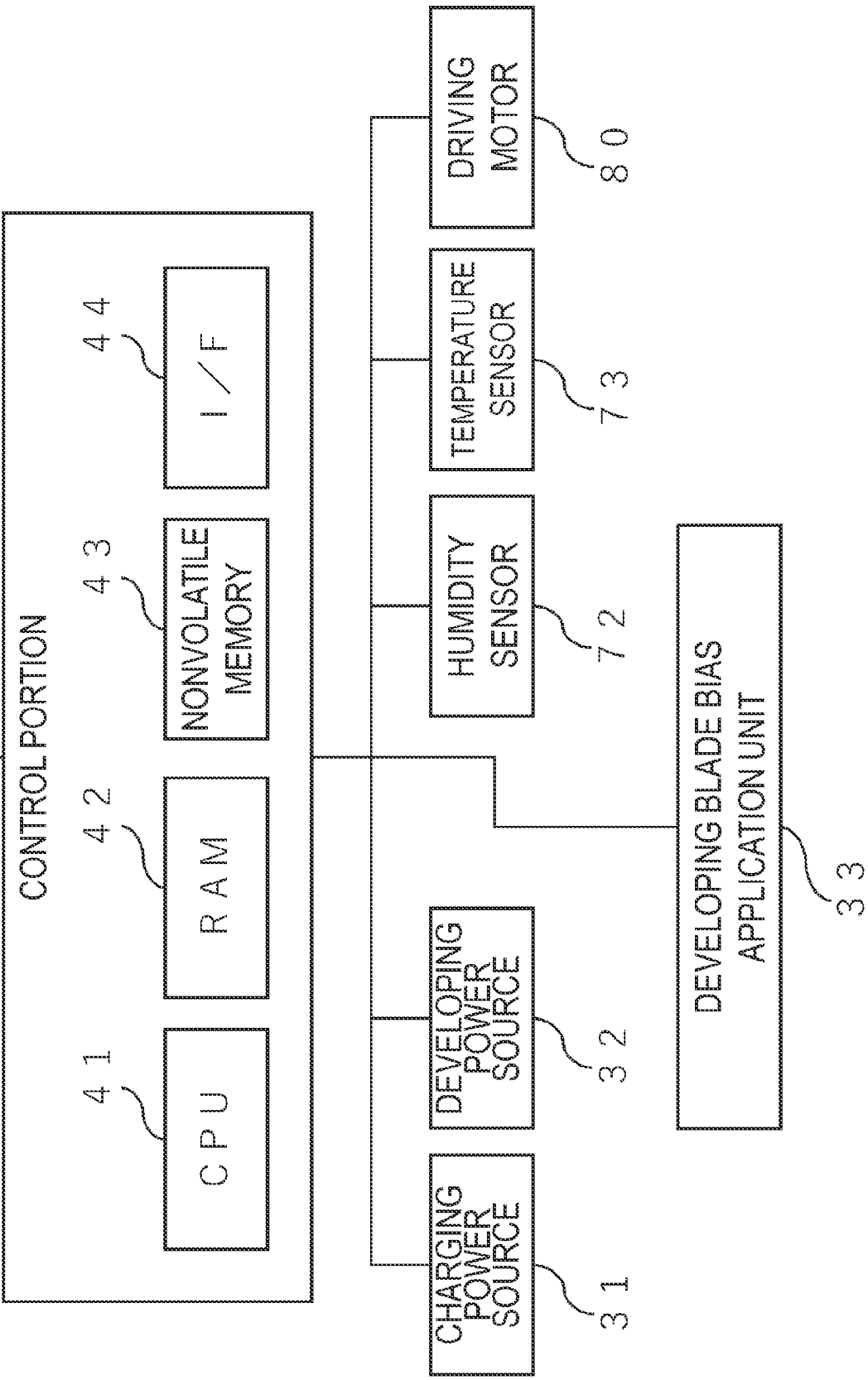
FIG. 7 is a functional block diagram related to control of an image forming apparatus.

FIG. 7 is a schematic block diagram illustrating a configuration related to control of the image forming apparatus according to the present invention. As illustrated in FIG. 7, the image forming apparatus 1 includes a control portion 40 as a controller. The control portion 40 controls the operations of the respective configuration blocks via a signal line or wireless communication to execute a control sequence during an image forming or non-image forming period. An information processing device that operates according to a command from a program stored in a memory or a user to perform information processing is ideally used as the control portion 40. For example, a processor including arithmetic resources such as a CPU 41, a RAM 42, a nonvolatile memory 43, and an interface (I/F) 44 can be used as the control portion 40. Furthermore, the image forming apparatus 1 includes a power source device that supplies electric power to respective configuration blocks via a power line. In this example, a charging power source 31 and a developing power source 32 are illustrated as the power source device. However, the image forming apparatus 1 may include another power source device other than those illustrated herein and the same power source device may have a plurality of functions. The charging power source 31 and the developing power source 32 change the magnitudes and timings of voltages applied to respective constituent components according to the command from the control portion 40.

<Photosensitive Drum>

The photosensitive drum 11 illustrated in FIG. 1 is a negatively charging CPC drum having an outer diameter of φ24 mm. The photosensitive drum 11 is provided to be able to rotate at a circumferential speed (a process speed or a printing speed) of 100 mm/sec in a rotation direction E indicated by an arrow in FIG. 1.

The charging roller 12 charges the surface of the photosensitive drum 11. The charging roller 12 is a conductive elastic roller and includes a core and a conductive elastic layer covering the core. The charging roller 12 makes pressure-contact with the photosensitive drum 11 with predetermined pressing force (see a charging nip at position c). The charging roller 12 is rotated following the rotation of the photosensitive drum 11.

The charging power source 31 included in the image forming apparatus 1 applies a charging bias to the charging roller 12. The charging power source 31 applies a DC voltage to the core of the charging roller 12. The DC voltage is set to such a value that a potential difference between the surface of the photosensitive drum 11 and the charging roller 12 is equal to or larger than a discharge start voltage. Specifically, the charging power source 31 applies a DC voltage of −1000 V to the charging roller 12 according to the control of the control portion 40 as the charging bias. In this case, the surface potential (a dark-part potential) of the photosensitive drum 11 is uniformly charged to −500 V. The size, the speed, the application voltage, and the like of the photosensitive drum 11 mentioned herein are examples only.

The laser beam scanner 3 includes a laser diode, a polygon mirror, and the like. The laser beam scanner 3 outputs a laser beam LA which has been intensity-modulated according to desired image information and scans and exposes the charged surface of the photosensitive drum 11 with the laser beam (see position d). When the entire surface of the photosensitive drum 11 is exposed with the laser beam, the laser power of the laser beam scanner 3 is adjusted so that the surface potential (a bright-part potential) of the photosensitive drum 11 is −100 V.

<<Overview of Developing Apparatus>>

In the configuration of FIG. 1, the electrostatic latent image on the photosensitive drum 11 is developed according to a non-contact developing system. However, as illustrated in other diagrams, a contact developing system may be employed.

<Overview of Developing Apparatus>

The developing apparatus 2 includes a developing sleeve 21, a magnet roller 22, and a developing blade 23. The developing sleeve 21 has an outer diameter of φ10 mm and is rotatably attached to the developing apparatus 2. The developing sleeve 21 rotates at a circumferential speed of 100 mm/sec (that is, at the same speed as the photosensitive drum 11). Moreover, toner t as a magnetic developer is stored in the developing apparatus 2 which functions as a developer container. In the present embodiment, magnetic toner having a spherical shape and a particle size of 7 μm is used. Moreover, a stirring member 24 is a member that can stir the toner t. The size, the circumferential speed, and the like of the developing sleeve 21 mentioned herein are examples only.

Figure 2:
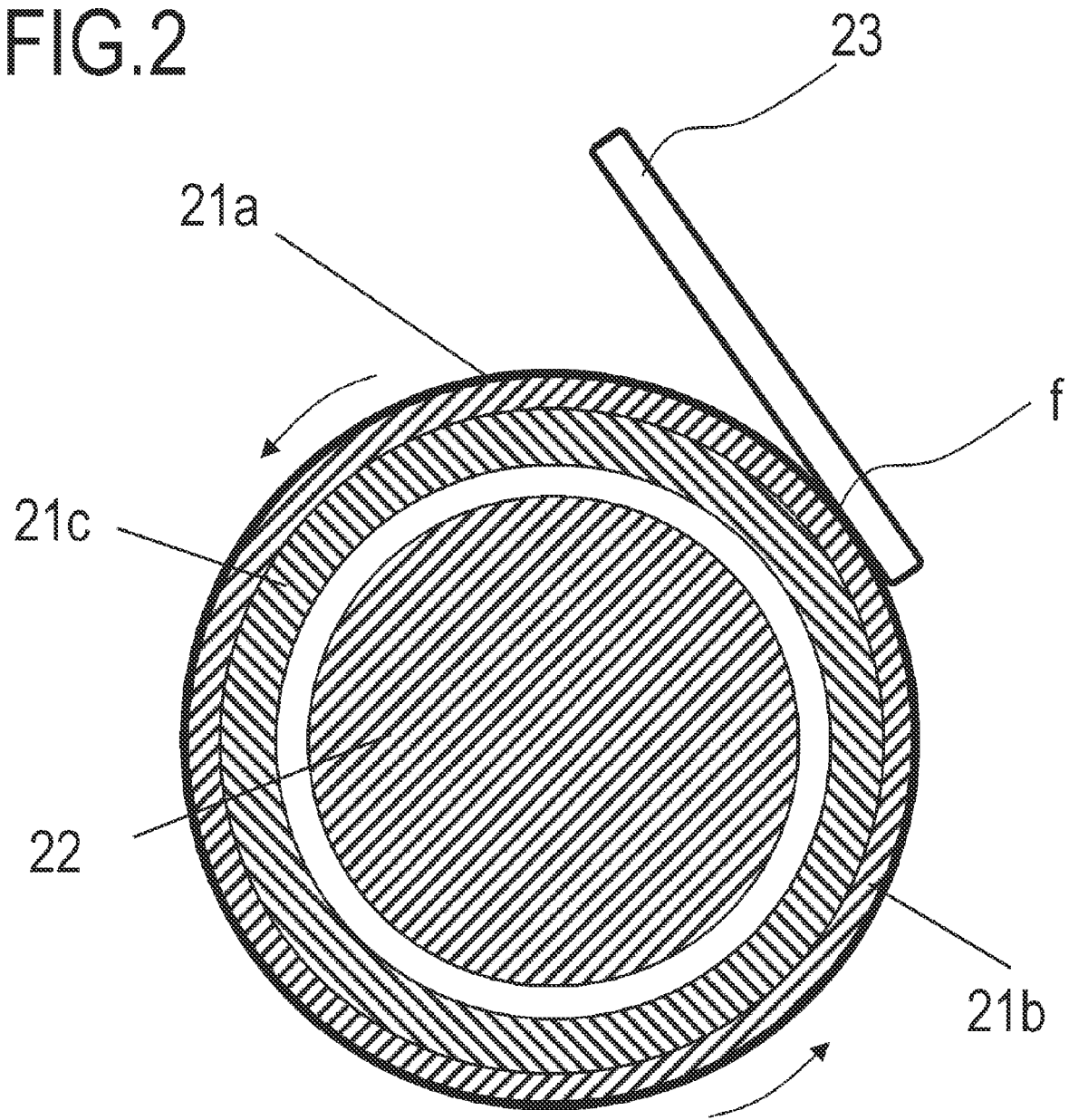
FIG. 2 is a schematic cross-sectional view of a developing sleeve according to an embodiment of the present invention.

In the developing apparatus 2, the developing sleeve 21 as a developer carrying member and the developing blade 23 as a regulating member that regulates the layer thickness of a developer are provided. As illustrated in FIG. 2, the developing sleeve 21 is a member in which a conductive elastic layer 21b and a surface layer 21a are coated on a base 21c which is a conductive cylinder. An interval maintaining member (not illustrated) is provided at both ends of the developing sleeve 21. When the interval maintaining member contacts the photosensitive drum 11, the developing sleeve 21 is held with a very small gap from the photosensitive drum 11. In the present embodiment, the very small gap is 300 μm. In a non-contact developing system, the interval maintaining member separates the photosensitive drum 11 and the developing sleeve 21 from each other. On the other hand, such a separation member may not be used when a contact developing system is employed.

<Configuration of Developing Power Source>

The toner t in the developing apparatus 2 is attracted to the surface of the developing sleeve 21 by magnetic force of the magnet roller 22 which is a magnetic field generation unit included in the developing sleeve 21. The toner t is triboelectrically charged to a negative polarity at a position f (nip) at which the developing sleeve 21 and the developing blade 23 face each other, following the rotation of the developing sleeve 21. In the present embodiment, a negative polarity is referred to as a normal polarity and a positive polarity is referred to as an opposite polarity.

The developing power source 32 included in the image forming apparatus 1 applies an AC bias which is a developing bias to the developing sleeve 21 according to the control of the control portion 40. The electrostatic latent image on the photosensitive drum 11 is developed as a toner image by a potential difference between the developing bias and the electrostatic latent image of the photosensitive drum 11 (see position a). The AC bias is a rectangular wave in which a soaring bias for generating an electric field in a direction for allowing the toner t to soar from the developing sleeve 21 to the photosensitive drum 11 and a restoring bias for restoring the toner from the photosensitive drum 11 to the developing sleeve 21. The soaring bias is set to −1100 V, the restoring bias is set to +400 V, and the frequency is set to 2500 Hz. An effective value (a median value) of the AC bias is −350 V. The application voltage and the like mentioned herein are examples only. In this case, the surface potential (a dark-part potential) of the photosensitive drum 11 is uniformly charged to −500 V.

<Detailed Configuration of Developer Carrying Member>

FIG. 2 illustrates the developing sleeve 21 as a developer carrying member. FIG. 2 is a diagram illustrating a configuration of a developing sleeve according to the present invention. As illustrated in other diagrams, the developing sleeve 21 of the present invention is not limited to this configuration.

The developing sleeve 21 roughly includes the base 21c, the elastic layer 21b, and the surface layer 21a, and includes the magnet roller 22 with a gap disposed therebetween.

(Substrate)

The base 21c functions as an electrode of the developing sleeve 21 and a support member. The base 21c is formed of a conductive material such as metal, an alloy, or a conductive synthetic resin.

(Elastic Layer)

The elastic layer 21b is formed of a material that can form a regulation nip f having a predetermined width in a contact portion between the developing sleeve 21 and the developing blade 23.

(Configuration of Surface Layer)

The surface layer 21a uses a material that can quickly triboelectrically charge toner and suppress excessive charging of toner. The surface layer 21a is configured to provide a charge amount appropriate to toner by friction with toner. The surface layer 21a is formed of a urethane resin having (A) a functional group having electron donating properties and (B) a functional group having electron accepting properties. That is, the surface layer 21a of the present invention contains an electron donating portion and an electron accepting portion in the molecules of the urethane resin. (A) is a partial structure derived from a reaction of a compound represented by Structural Formula (1) below and a polyisocyanate.

(A) includes a tertiary amine group having an unshared electron pair. Since an unshared electron pair is rich in electrons, it acts as an electron donating group A. As a result, it is possible to provide sufficient charge to uncharged toner and positive-polarity toner.

(B) includes a carbonate bond. A carbonate bond includes one carbon atom that bonds with three oxygen atoms, Since an oxygen atom has a larger electronegativity than a carbon atom, an electron density in the carbon atom is low. Therefore, the carbonate bond is a functional group (an electron accepting group B) that can easily accept electrons. As a result, it is possible to accept the charge of the excessively charged toner.

(A) can be represented by Structural Formula (1), for example.

(C1)

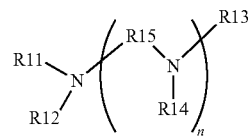

Structural Formula (1)

In Structural Formula (1),

R15 represents a linear or branched alkylene group having at least 2 and not more than 4 carbon attribute items, n is an integer of at least 1 and not more than 4, and a plurality of R15s are each independently defined similarly to the above when n is at least 2 and not more than 4, and R11 to R14 are each independently any one selected from the group consisting of (a) to (d) below, a plurality of R14s are each independently defined similarly to the above when n is at least 2 and not more than 4, all of R11 to R14 are any one selected from the group consisting of (h) to (d) below when n=1, at least four of R11 to R13 and two to four R14s are any one selected from the group consisting of (b) to (d) below when n is at least 2 and not more than 4:
(a) a hydrogen atom or a linear or branched alkyl group having 1 to 4 carbon atoms;
(b) a linear or branched hydroxyalkyl group having 1 to 8 carbon atoms;
(c) a linear or branched aminoalkyl group having 2 to 8 carbon atoms; and
(d) a group represented by Structural Formula (2) below:

(C2)

Structural Formula (2)

in Structural Formula (2), m is 2 or 3, and a plurality of R21s each independently represent a linear or branched alkylene group having at least 2 and not more than 5 carbon atoms.

<Concept of Fermi Level and Function of Surface Layer>

The function of the surface layer 21a will be described with reference to the concept of the Fermi level. FIG. 3 is a schematic diagram illustrating the Fermi levels of the electron donating group A, the electron accepting group B (a carbonate bond), uncharged or opposite-polarity toner, excessively charged toner, and appropriately charged toner. Here, the electron donating group A corresponds to an electron donating portion that mainly donates electrons to toner when toner and the surface layer 21a make frictional contact with each other to exchange charge. Contacting target toner of the frictional contact includes excessively charged toner, appropriately charged toner, uncharged toner, and oppositely charged toner. Moreover, the expression "mainly" means that an electron donating function of donating electrons to the electron (charge) exchange target toner works stronger than an electron accepting function. Moreover, the electron accepting group B corresponds to an electron accepting portion that mainly accepts charge when toner and the surface layer 21a make frictional contact with each other to exchange charge. Similarly to the above, the contacting target toner includes excessively charged toner, appropriately charged toner, uncharged toner, and oppositely charged toner. Moreover, the expression "mainly" means that an electron accepting function of accepting electrons from the electron (charge) exchange target toner works stronger than an electron donating function.

A vertical axis represents the energy level of electrons and indicates that electrons have higher energy as it goes upward. When substances having two different energy levels make frictional contact, electrons move from a substance having a higher energy level to a substance having a lower energy level and the substances are charged to positive and negative polarities, respectively. The developer carrying member (the developing sleeve 21) has the base 21c connected to a power source and a constant bias is applied thereto. Therefore, since the same amount of electrons as the electrons donated or accepted in association with frictional contact are donated or accepted from a power source, the Fermi level is maintained at a certain height. On the other hand, since electrons of toner having moved in association with frictional contact are immovable, the charging state thereof is maintained. Therefore, the Fermi level of the charged toner increases when it has accepted electrons and the Fermi level thereof decreases when it has donated electrons.

In FIG. 3, a negatively charging toner is used as toner, and uncharged toner in the drawing has a lower Fermi level than the other toners and is likely to accept electrons from the other member. The uncharged toner is charged to a negative polarity by making frictional contact with the electron donating group A or the electron accepting group B that forms the surface layer 21a of the developer carrying member and the Fermi level thereof increases according to the charge amount thereof. The larger the difference in Fermi levels during frictional contact, the faster the exchange of electrons. Therefore, since the developer carrying member has the electron donating group A, it is possible to quickly provide a charge amount necessary for printing and to perform high-quality printing.

On the other hand, the excessively charged toner has a higher Fermi level than the other toner and donates electrons to the other member. When the excessively charged toner makes frictional contact with the electron donating group A or the electron accepting group B, the Fermi level thereof decreases and the excessive negative-polarity charge amount reaches an appropriate charge amount. In this case, since the developing sleeve has a carbonate bond which is the electron accepting group B, it is possible to accept electrons quickly from toner having an excessive charge amount.

When the toner repeats the frictional contact with the electron donating group A and the electron accepting group B, the Fermi level of the toner settles down to a region between the Fermi levels of the electron donating group A and the electron accepting group B.

In FIG. 3, a partial bond such as (A) and a carbonate bond are used. However, the electron donating group A and the electron accepting group B are not limited to this combination. For example, when a positive-polarity toner is used, it is preferable to form the electron donating group A and the electron accepting group B using substances different from those of the above-described embodiment.

<Production of Developer Carrying Member>

Next, an example of a method of producing the developing sleeve 21 as a developer carrying member will be described.

(Production of Elastic Roller)

A primer (trade name, DY35-051; produced by Dow Corning Toray Co., Ltd.) was applied to an aluminum cylindrical tube grinded to an outer diameter of 10 mm and an arithmetic mean roughness Ra of 0.2 µm and was baked to obtain a base 21c.

The base 21c was arranged in a mold, and an addition type silicone rubber composition in which the following materials were mixed was injected to a cavity formed in the mold.
Liquid silicone rubber material (trade name, SE6724A/B; produced by Dow Corning Toray Co., Ltd.): 100 parts by mass,
Carbon black (trade name, Tokablack #4300; produced by Tokai Carbon Co., Ltd): 15 parts by mass,
Silica powder as heat resistance-imparting agent; 0.2 parts by mass, and
Platinum catalyst: 0.1 parts by mass.

Subsequently, the mold was heated to vulcanize and cure the silicone rubber at a temperature of 150° C. for 15 minutes. The base 21c having the cured silicone rubber layer formed on the periphery surface thereof was released from the mold, and then, the base 21c was further heated at a temperature of 180° C.' for 1 hour to complete a curing reaction of the silicone rubber layer. In this way, an elastic roller was produced in which the elastic layer 21b of the silicone rubber having a diameter of 11.4 mm and a thickness of 0.7 mm was formed on the outer periphery of the base 21c.
(Surface Layer)
Next, a production example for obtaining the surface layer will be described.
((Synthesis of Isocyanate-Terminated Prepolymer))
Hereinafter, a synthesis example of an isocyanate-terminated prepolymer which is one of raw materials for synthesizing a urethane resin of the surface layer 21a will be described.

30.8 parts by mass of isocyanate (pure-MDI, trade name: Millionate MT, produced by Tosoh Corporation) was dissolved in methyl ethyl ketone (hereinafter MEK) in a reaction vessel under a nitrogen atmosphere so that a final solid content was 50%. After that, 100.0 parts by mass of Nippollan 982 (produced by Tosoh Corporation) were gradually dropped while maintaining the temperature the reaction vessel at 65° C.

After completion of the dropping, the resultant was reacted at a temperature of 65° C. for 2 hours. The obtained reaction mixture was cooled to a room temperature to obtain an isocyanate-terminated prepolymer (a polyisocyanate) having a solid content of 50% and an isocyanate group content of 4.7% by weight.
((Synthesis of Amino Compound))

10.0 g (0.11 mol) of 1,4-diaminobutane as an amino compound serving as a raw material and 200 ml of pure water as a reaction solution were heated to 40° C. while being stirred in a reaction vessel to which a stirring apparatus, a thermometer, a dropping apparatus, and a temperature regulating apparatus were attached. Subsequently, 38.3 g (0.66 mol) of propylene oxide as an additive raw material was gradually dropped over 30 minutes while maintaining the reaction temperature at 40° C. or lower. The resultant was further stirred for 2 hours and reacted to obtain a reaction mixture. The obtained reaction mixture was heated under reduced pressure to distill water to obtain an amino compound (Tetrakis(2-hydroxypropyl)butylenediamine).
((Production of Surface Layer))

The following materials were stirred and mixed as the materials of the surface layer 21a.

Isocyanate-terminated prepolymer: 84.8 parts by mass,
Amino compound (Tetrakis(2-hydroxypropyl)butylenediamine): 15.2 parts by mass,
Carbon black (trade name, MA-230; produced by Mitsubishi Chemical Co., Ltd.): 10.0 parts by mass, and
Urethane resin fine particles (trade name: Art Pearl C-400; produced by Negami Chemical Industrial Co., Ltd.): 30.0 parts by mass.

Subsequently, MEK was added so that the total solid content ratio was 30% by mass, and then mixed by a sand mill. Furthermore, the viscosity of the resultant was adjusted to 10 to 13 cps by MEK to prepare a surface layer forming coating material.

Subsequently, the elastic roller produced in advance was dipped in the surface layer forming coating material to form a coating film of the coating material on the surface of the elastic layer 21b of the elastic roller and the elastic roller was dried. Furthermore, the resultant was subjected to a heat treatment at a temperature of 160° C. for 1 hour to produce the surface layer 21a having a film thickness of approximately 15 μm on the outer periphery of the elastic layer 21b and to produce the developer carrying member according to Embodiment 1. The materials and the production method mentioned herein illustrate preferred examples only.

<Characteristics of Toner Used for Developing>
For example, a negative-polarity polymerized magnetic toner can be used as the toner as a developer. As an example, a weight average particle size of a magnetic toner was 7.8 μm and the content of a magnetic substance was 65 parts. Moreover, the magnetic toner preferably has a high average circularity. Specifically, when the average circularity is 0.960 or more, and more preferably, 0.970 or more, the contact between the developer carrying member and the toner occurs actively and the effects of the present invention are obtained.

In the present invention, the average circularity is used as a simple method for quantitatively expressing the shape of a particle. In the present invention, a particle shape is measured using a flow-type particle image analyzer FPIA-2100 (produced by Toa Medical Electronics Corporation) and the circularity is calculated by Equation 1 below. Furthermore, as illustrated in Equation 2 below, a value obtained by dividing the sum of the measured circularities of all particles by the number of all particles is defined as the average circularity.

$$\text{Circularity } (Ci) = \frac{[\text{Circumference of circle having the same projection area as number of particles}]}{[\text{Circumference of projected particle image}]} \quad \text{(Math. 1)}$$

$$\text{Average circularity } (\overline{C}) = \sum_{i=m}^{m} Ci/m \quad \text{(Math. 2)}$$

First, "FPIA-2100" which is a measuring device used in the present invention calculates the circularities of particles. After the circularities are calculated, when the average circularity is calculated, first, the obtained circularities are divided into division ranges in which circularities of 0.400 to 1.000 are divided at predetermined intervals. The average circularity is calculated using the median value and the frequency of the division points. Specifically, the circularities of 0.400 to 1.000 are divided into 61 division ranges at intervals of 0.010. That is, the respective ranges are "0.400 to 0.410", "0.410 to 0.420", . . . , "0.990 to 1.000", and "1.000".

The errors between the respective values of the average circularity calculated by this calculation method and the respective values of the average circularities calculated by a calculation formula which directly uses the circularities of respective particles are very small and are substantially negligible. Therefore, in the present invention, such a calculation method which is partially modified using the concept of a calculation formula which directly uses the circularities of respective particles is used due to data handling reasons such as shortening of calculation time and simplification of a calculation formula.

<Transferring and Fixing>
A transfer material P (a recording material) is stored in a transfer material storage portion 70. When printing starts, the control portion 40 separates and feeds the transfer material P from the transfer material storage portion 70 with the aid of a transfer material supply unit 6 and delivers the same to a transfer portion (see position b) in synchronization with the timing at which a toner image is formed on the photosensitive drum 11. The conductive transfer roller 4 as a transfer unit is pressure-contact with the photosensitive drum 11 at a predetermined position. In the present embodiment, a voltage of +2000 V was applied to the transfer roller 4 so that the toner image formed on the photosensitive drum 11 was transferred to the transfer material P.

The fixing roller 5 as a fixing apparatus fixes the toner image to the transfer material P (see position e) by heating and pressing the transfer material P having passed through the transfer portion and having the toner image transferred thereto. After that, the transfer material P having the toner image fixed thereto is discharged outside the apparatus. The transfer-residual toner remaining on the photosensitive drum 11 is removed by the cleaning blade 14 and is collected to a cleaning apparatus 13.

Embodiment 1

Next, the configuration and the control of Embodiment 1 performed using the image forming apparatus 1 having the configuration illustrated in FIGS. 1 and 2 will be described in detail, <Toner Electron Donating and Static Elimination Sequence>

As described above, it is possible to maintain the charge of toner satisfactorily to a certain degree by using the developing sleeve 21 having a surface layer containing an electron donating group and an electron accepting group. However, the use of the developing sleeve 21 cannot sufficiently suppress excessive charging of toner in a low-humidity environment, for example. The cause of this problem is that, since the amount of water molecules which are polar molecules on or near the surface of the developer carrying member decreases in a low-humidity environment, a dark decay amount of toner charge decreases, and as a result, the amount of excessively charged toner tends to increase.

Figure 4A:
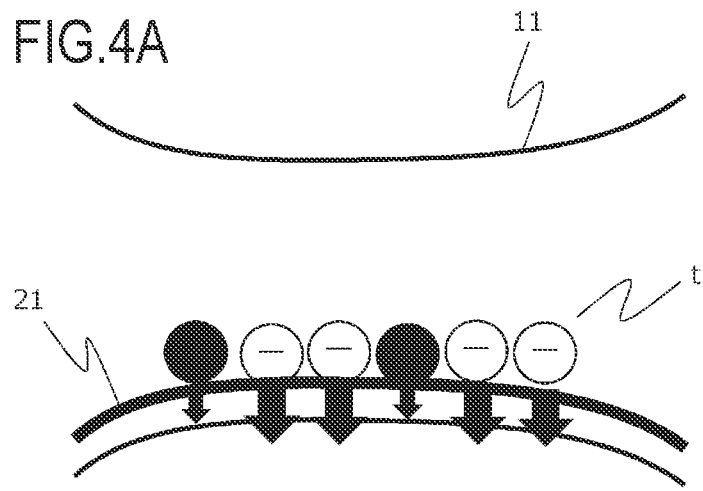
FIG. 4A is a diagram for describing a toner electron donating and static elimination sequence of Embodiment 1.
Figure 4B:
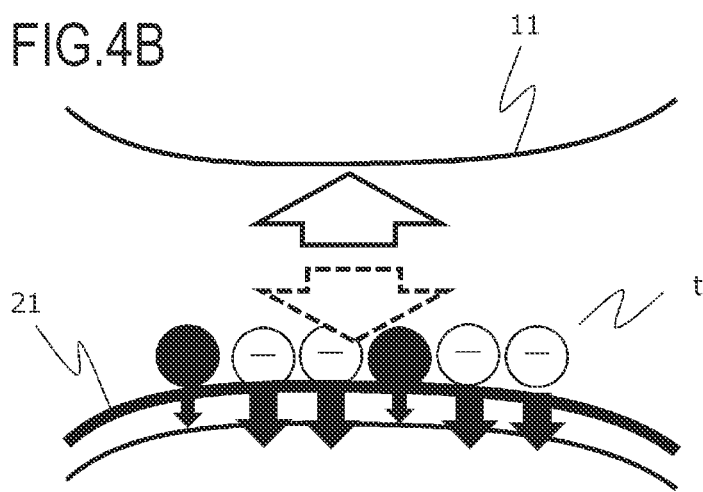
FIG. 4B is a diagram for describing a toner electron donating and static elimination sequence of Embodiment 1.

The state of toner on the developing sleeve 21 in a low-humidity environment will be described with reference to FIG. 4A. In FIGS. 4A-4D, circles indicate toner, and among the circles, white circles indicate excessively charged toner, black circles indicate appropriately charged toner, and meshed circles indicate toner transitioning from an excessive charging state to an appropriate charging state. Excessively charged toner adheres strongly due to image force between the toner and the developing sleeve 21. Black arrows in the drawing indicate the image force and the size of an arrow indicates the strength of the force. As illustrated in FIG. 4A, the excessively charged toner is strongly fixed by image force acting between the toner and the developer carrying member, the fixing force exceeds regulating force of a toner regulating member, and a regulation defect which is disorder of the toner layer on the developer carrying member occurs. Moreover, the regulation defect is a factor that causes an image defect such as fogging and density abnormality.

Therefore, in the present embodiment, in a post-processing operation after printing which is the non-printing timing, the control portion 40 controls the developing power source 32 to apply an AC voltage to the developing sleeve 21 to perform a toner electron donating and static elimination sequence. In the present embodiment, it is assumed that the surface of the photosensitive drum 11 is uniformly charged to −500 V by the charging roller 12. As the toner electron donating and static elimination sequence, the control portion 40 controls the developing power source 32 to apply an AC bias having a frequency of 2500 Hz made up of a soaring bias of −1300 V and a restoring bias of +600 V to the developing sleeve 21 for one second. In this case, in order to allow the excessively charged toner strongly fixed to the developing sleeve 21 by image force to soar, the developing power source 32 applies an AC bias larger than an AC bias for printing. However, these values are examples only.

From the state of FIG. 4A, the toner electron donating and static elimination sequence starts. The toner on the developing sleeve 21 receives electrostatic force in a direction (a void arrow in the drawing) away from the developing sleeve 21 due to the soaring bias (see FIG. 4B) and receives electrostatic force in a direction (a dot arrow in the drawing) closer to the developing sleeve 21 due to the restoring bias. In this way, the excessively charged toner having obtained the electrostatic force in a direction of cancelling the image force between the toner and the developing sleeve 21 repeats soaring from the surface of the developing sleeve 21 (see FIG. 4C) and making contact with the surface of the developing sleeve due to the restoring bias (see FIG. 4D).

As a result of the repeated contact, various surfaces of the excessively charged toner make frictional contact with the developing sleeve 21. As a result, the excessively charged toner is statically eliminated and an appropriate charging state is created. Moreover, when another toner is disposed between the developing sleeve 21 and the excessively charged toner having soared once, the distance to the developing sleeve 21 increases (see FIG. 4D) and the image force between the excessively charged toner and the developing sleeve 21 decreases. In this state, when the toner is conveyed to a position f which is a contact portion between the developing sleeve 21 and the developing blade 23 with rotation of the developing sleeve 21, the toner can easily move and rotate, and the excessively charged toner can be statically eliminated.

A regulation defect due to excessively charged toner is a phenomenon that can occur remarkably easily in a low-humidity environment. Therefore, information on an installation environment such as a temperature or an absolute humidity (the amount of moisture (g) per unit volume) is detected by a humidity sensor 72 and a temperature sensor 73 disposed in an image forming apparatus, and the toner electron donating and static elimination sequence can be optimized in an arbitrary environment.

Table 1 illustrates an example of an environment classification based on an absolute humidity using the humidity sensor 72. An environment classification L (Low) indicates an environment in which an absolute humidity D is lower than 5.0 g/m$^3$. In the present embodiment, in the environment classification L, the toner electron donating and static elimination sequence is performed during post-processing after printing is performed. When the toner electron donating and static elimination sequence is performed during the post-processing, it is possible to eliminate a waiting time for the toner electron donating and static elimination sequence with respect to a print request of a user. Moreover, in an environment classification N (Normal) (5.0≤D<15.0) and an environment classification H (High) (15.0≤D), the toner electron donating and static elimination sequence is not performed in order to shorten an operation time. The environment classification corresponds to environment information of the present invention. In the present embodiment, the humidity sensor 72 corresponds to an environment information acquisition unit that acquires environment information. In the table, although 5.0 g/m$^3$ and 15.0 g/m$^3$ are illustrated as predetermined thresholds of the environment classification, these threshold humidities are examples only.

TABLE 1

| Environment classification | Absolute humidity D (g/m$^3$) | Toner electron donating and static elimination sequence |
|---|---|---|
| L | D < 5.0 | Performed |
| N | 5.0 ≤ D < 15.0 | Not performed |
| H | 15.0 ≤ D | Not performed |

<Verification Test>

Hereinafter, the results of a verification test on the effects of a toner electron donating and static elimination sequence in the present embodiment will be described.

Table 2 is the results of a print operation of performing a print job of two sheets under an environment of D=1.3 g/m$^3$ (15° C., 10% RH (relative humidity)) which is the environment classification L "O" indicates no abnormality and indicates that printing has been performed normally. "X" indicates occurrence of abnormality and indicates that a low density at leading edge and fogging associated with excessive charging of toner, which is observed in a low-humidity environment has occurred.

TABLE 2

| 2-sheet job | Number of printed sheets | Toner electron donating and static elimination sequence | Fogging/density abnormality |
|---|---|---|---|
| Embodiment 1 | 0 sheet | Performed | O (No abnormality) |
| | 1000 sheets | Performed | O (No abnormality) |
| Comparative example 1 | 0 sheet | Not performed | O (No abnormality) |
| | 1000 sheets | Not performed | X (Abnormality occurred) |

As illustrated in Table 2, when the toner electron donating and static elimination sequence was not performed in Comparative Example 1, fogging and a density abnormality of a decreasing density at a leading edge of an image was observed around the time when 1000 sheets were printed. On the other hand, when the toner electron donating and static elimination sequence was executed during the post-processing for each job in Embodiment 1, fogging or a density abnormality was not observed even when 1000 sheets were printed.

As described above, when the developing sleeve 21 containing the electron donating group A and the electron accepting group B is used and the toner electron donating and static elimination sequence is performed, excessive charging of the toner t does not occur. Therefore, a regulation defect does not occur and an image defect such as fogging and a density abnormality can be suppressed.

Moreover, in the present embodiment, although the same effective value of the AC bias that the developing power source 32 applies to the developing sleeve 21 during the toner electron donating and static elimination sequence is used during a printing period, the effective value may be changed appropriately. The soaring bias may cause the excessively charged toner on the developing sleeve 21 to soar from the surface of the developing sleeve, and the restoring bias may cause the excessively charged toner to restore from the photosensitive drum 11 to the developing sleeve 21. The electrostatic force from the surface of the photosensitive drum 11 can be adjusted by changing the time ratio of the soaring bias and the restoring bias and changing differences from the values during a printing period. Moreover, the application times of these biases can be adjusted in view of productivity of printed matter.

Moreover, a method of determining an environment is not limited to the determination using the absolute humidity as in the present embodiment. For example, the environment may be determined using a temperature only, an absolute humidity only, or a method which uses a combination thereof.

Moreover, an execution frequency of the toner electron donating and static elimination sequence is not limited to the above example but may be performed every predetermined number of prints or during a driving period of the developing sleeve. Furthermore, the execution frequency may be changed for each environment classification.

Embodiment 2

Next, Embodiment 2 will be described. The same components as those of the above-described embodiment will be denoted by the same reference numerals and the description thereof will be simplified. In the present embodiment, the same apparatus configuration as Embodiment 1 is used.

An image forming apparatus needs to perform a print preparation operation before printing in order to stabilize the fixing roller 5 and the laser beam scanner 3. In an image forming apparatus, the number of driving motors generally tends to decrease from the viewpoint of cost and size-reduction, and the photosensitive drum 11, the developing apparatus 2, the charging roller 12, and the like are often controlled using the same driving motor. In this case, the photosensitive drum 11, the developing apparatus 2, the charging roller 12, and the like may be driven simultaneously with the preparation operation of the fixing roller 5 and the laser beam scanner 3.

In this case, since triboelectric charging by the developing blade 23 is repeatedly performed on the toner t on the developing sleeve 21, the amount of excessively charged toner increases. A phenomenon called a development ghost is known in which an image defect in which disorder of a toner layer on the developing sleeve 21 occurs and the density decreases only in one rotation of the developing sleeve 21 occurs. It is known that such a development ghost occurs in excessively charged toner of which the degree of charging is minor as compared to an image defect such as a density abnormality and fogging due to a regulation defect resulting from excessively charged toner, which is the problem to be solved by Embodiment 1. Moreover, even when the toner electron donating and static elimination sequence is performed after a printing operation is performed as in Embodiment 1, excessive charging of toner may occur during a print preparation operation performed before subsequent printing is performed and a development ghost may occur. In such a case, it is preferable to perform the toner electron donating and static elimination sequence before printing after receiving a print command, and preferably during a print preparation operation immediately before printing.

However, when the developing power source 32 applies such an AC bias as illustrated in Embodiment 1 to the developing sleeve 21, the toner on the developing sleeve 21 soars toward the photosensitive drum 11 and the toner adheres to the photosensitive drum 11. Moreover, toner stain adheres to the transfer roller 4 positioned on the downstream side in the rotation direction of the photosensitive drum 11. When the toner stain adheres to the transfer roller 4, a sheet back contamination that stain adheres to a surface of the transfer material P making contact with the transfer roller 4 occurs. Moreover, when cleaning of the transfer roller 4 is performed to prevent the sheet back contamination, a print start timing is delayed.

It is necessary to prevent adhesion of toner to the photosensitive drum 11 in order to obviate the above-described problems occurring when the toner electron donating and static elimination sequence is performed during the print preparation operation.

Therefore, the AC bias applied between the photosensitive drum 11 and the developing sleeve 21 needs to have an amplitude and a frequency such that toner does not reach the photosensitive drum 11.

Here, when a sinusoidal AC bias is used, an electrostatic force F(t) that toner receives from the AC bias is expressed as below.

$$F(t) = QV_0/D \times \sin(2\pi f \cdot t) + QVdc/D$$

When this equation is time-integrated twice, a position X(t) of toner is obtained as below.

$$X(t) = -Q/4\pi^2 MD \times V_0/f^2 \times \sin(2\pi f \cdot t) + Q/MD \cdot Vdc/2 \cdot t^2$$

Here, the constants are as follows.
M: Mass of toner
Q: Charge of toner
$V_0$: Amplitude of AC bias
f: Frequency of AC bias
Vdc: DC component of bias
D: Gap distance In order to prevent adhesion of toner to the photosensitive drum 11, the toner position X(t) may satisfy the following relation with respect to the gap distance D, which is an interval between the photosensitive drum 11 and the developing sleeve 21.

$$D > 2|X(t)|$$

This is the condition of Expression (1) below.

$$D^2 > Q/M \times (V_0/2\pi^2 + Vdc)f^2 \qquad (1)$$

By applying an AC bias satisfying the condition of Expression (1), it is possible to prevent adhesion of toner to the photosensitive drum 11 during the toner electron donating and static elimination sequence.

In the present embodiment, the control portion 40 controls the developing power source 32 to apply an AC bias having an amplitude of ±100 V and a frequency of 2000 Hz to the developing sleeve 21 for one second as an AC bias for the toner electron donating and static elimination sequence. During the print preparation operation, the charging of the surface of the photosensitive drum 11 is not performed and the position thereof is 0 V. Here, Q/M of appropriately charged toner is approximately 8 μC/g and Q/M of excessively charged toner is approximately 30 μC/g.

Table 3 is a print result for the first sheet when the toner electron donating and static elimination sequence was performed during the print preparation operation of the present embodiment under an environment of 23° C. and 50% RH (an absolute humidity of D=10.3 g/m³). "O" indicates printing has been performed normally (no abnormality). "X" indicates that a development ghost or a sheet back contamination has occurred (abnormality occurred). In Comparative Example 2, the static elimination sequence was not performed. In Comparative Example 3, the amplitude of the AC bias of the static elimination sequence was set to ±1000 V.

TABLE 3

|  | Embodiment 2 | Comparative Example 2 | Comparative Example 3 |
| --- | --- | --- | --- |
| Toner electron donating, and static elimination sequence | Performed | Not performed | Performed |
| AC bias | ±100 V | Not performed | ±1000 V |
| Development ghost | O (No abnormality) | X (Abnormality occurred) | O (No abnormality) |
| Sheet back contamination | O (No abnormality) | O (No abnormality) | X (Abnormality occurred) |

As illustrated in Table 3, a development ghost was observed in Comparative Example 2 where the toner electron donating and static elimination sequence was not executed. Moreover, a development ghost has not occurred but a sheet back contamination has occurred in Comparative Example 3 where the toner electron donating and static elimination sequence was executed but the AC bias was high. On the other hand, neither development ghost nor sheet back contamination has occurred in Embodiment 2 where the toner electron donating and static elimination sequence was executed and the AC bias was set to ±100 V.

In this manner, by setting an appropriate value as the AC bias during the toner electron donating and static elimination sequence, it is possible to prevent adhesion of the toner t to the photosensitive drum 11 and to prevent occurrence of a development ghost. Although a sinusoidal AC bias is used in the present embodiment, a rectangular or triangular wave may be used. In this case, an AC bias can be derived similarly.

Embodiment 3

Next, Embodiment 3 will be described. The same components as those of the above-described embodiment will be denoted by the same reference numerals and the description thereof will be simplified.

<Apparatus Configuration>

Figure 5:
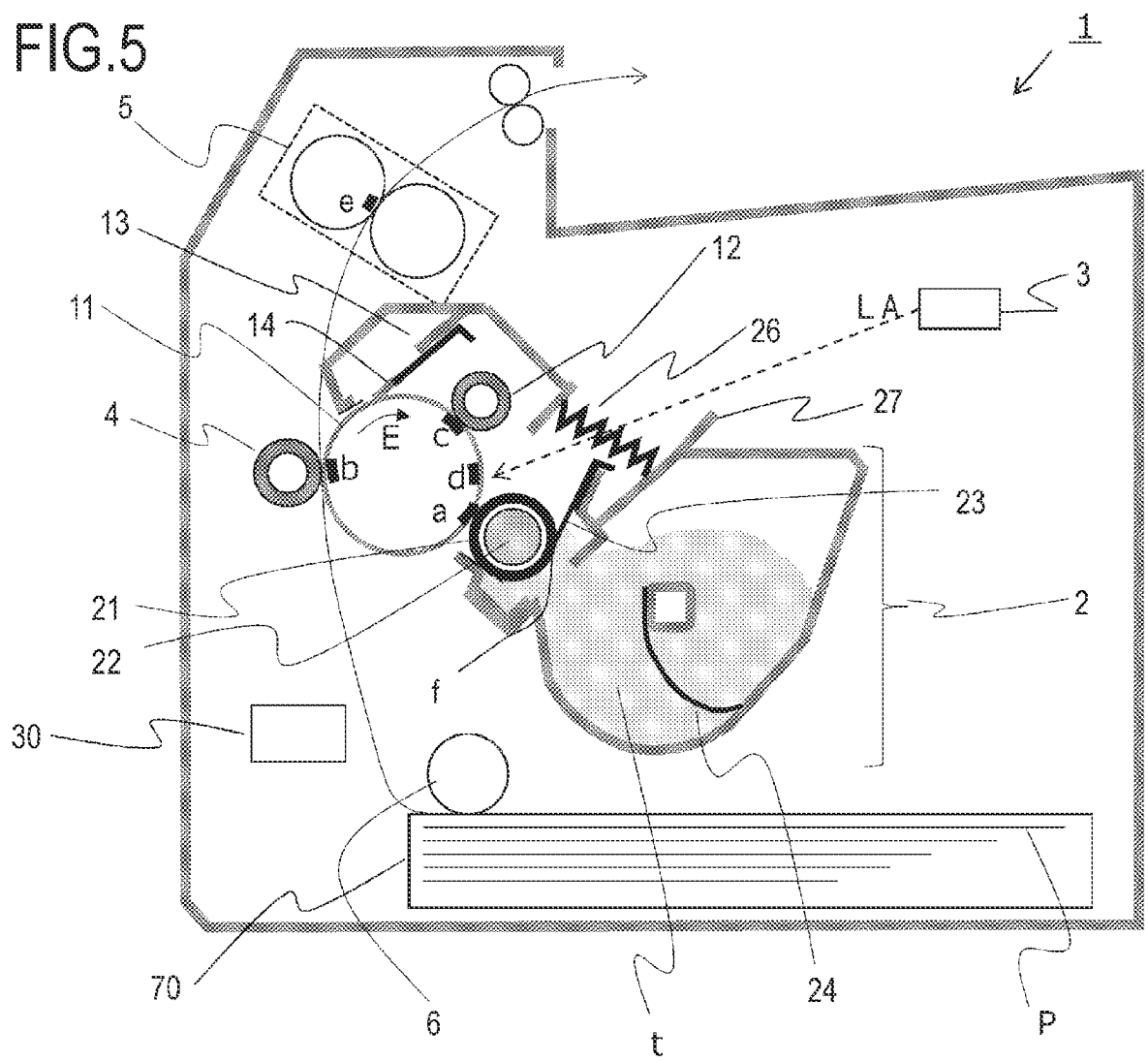
FIG. 5 is a schematic cross-sectional view of an image forming apparatus according to Embodiment 3.

In the present embodiment, the image forming apparatus 1, as illustrated in FIG. 5, which employs a contact developing system and visualizes an electrostatic latent image on the photosensitive drum 11 is used.

The developing apparatus 2 of the present embodiment includes the developing sleeve 21, the magnet roller 22, and the developing blade 23. Moreover, toner t as a magnetic developer is stored in the developing apparatus 2. In the present embodiment, the same developing sleeve 21 as that of Embodiment 1 is used.

The developing apparatus 2 of the present embodiment has a pressure spring 26 that holds the attitude of the developing sleeve 21 so that the developing sleeve 21 makes contact with the photosensitive drum 11 with predetermined pressing force, in this way, the developing sleeve 21 and the photosensitive drum 11 are rotated in a contacting state during a printing period. The image forming apparatus has a developing power source 32 that applies a developing bias to the developing sleeve 21. The electrostatic latent image on the photosensitive drum 11 is developed as a toner image by the potential difference between the developing sleeve 21 and the electrostatic latent image on the photosensitive drum 11. In the present embodiment, the control portion 40 controls the developing power source 32 to apply a DC bias of −350 V to the developing sleeve 21 as a developing bias during a printing period. However, this value is an example only.

<Toner Electron Donating and Static Elimination Sequence>

In the configuration of the contact developing system of the present embodiment, it may not be possible to sufficiently suppress excessive charging of the toner t in a low-temperature and low-humidity environment or the like. For example, the triboelectric charging by the developing blade 23 is performed repeatedly on the toner t on the developing sleeve 21, which has not been used for developing during a printing period. In this way, the amount of excessively charged toner increases, disorder of coating on the developing sleeve 21, called a regulation defect, occurs, and an image defect such as fogging or development stripes occurs.

Therefore, in the contact developing system of the present embodiment, the control portion 40 controls the developing power source 32 to apply an AC bias to the developing sleeve 21 during a non-image forming period so that excessively charged toner makes sufficient frictional contact with the developing sleeve 21 and the amount of charge accepted in the electron accepting group B increases. In this way, excessive charging of toner is suppressed.

The toner electron donating and static elimination sequence of the present embodiment will be described with reference to FIG. 5 to FIG. 6C. During a non-image forming period after an image forming operation ends, the control portion 40 controls the developing power source 32 to apply an AC bias for toner electron donating and static elimination sequence to the developing sleeve 21. An AC bias having a frequency of 2000 Hz made up of a soaring bias of −450 V and a restoring bias of +750 V was applied for one second as the AC bias. The effective value was +150 V. The photosensitive drum 11 and the developing sleeve 21 are rotationally driven without charging the surface of the photosensitive drum 11.

Figure 6A:
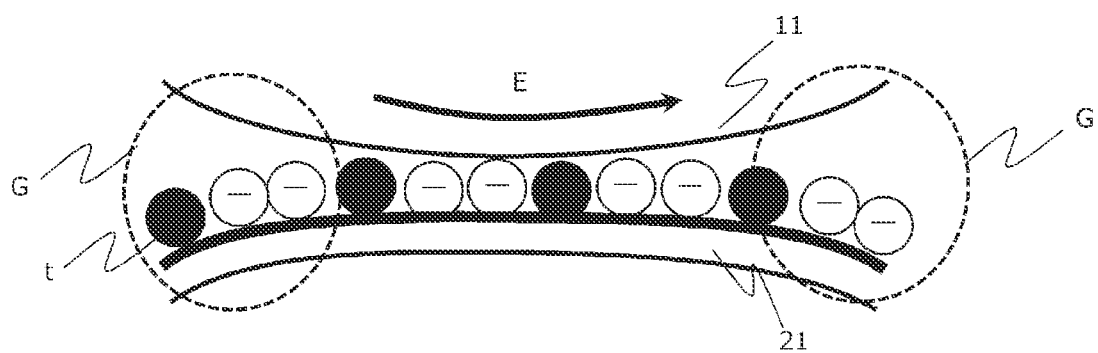
FIG. 6A is a diagram for describing a toner electron donating and static elimination sequence according to Embodiment 3.
Figure 6B:
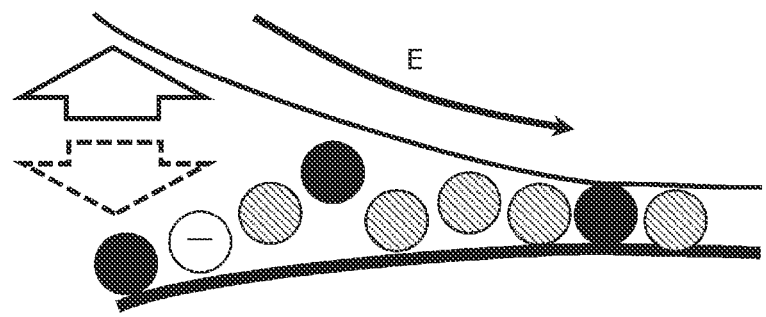
FIG. 6B is a diagram for describing a toner electron donating and static elimination sequence according to Embodiment 3.
Figure 6C:
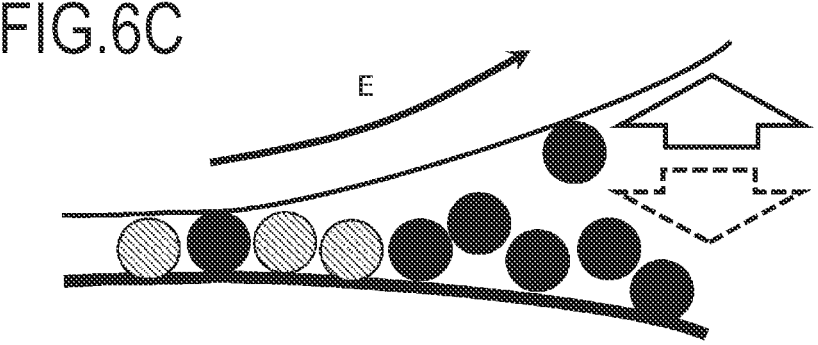
FIG. 6C is a diagram for describing a toner electron donating and static elimination sequence according to Embodiment 3.

In FIGS. 6A to 6C, circles indicate toner, and among the circles, white circles indicate excessively charged toner, black circles indicate appropriately charged toner, and meshed circles indicate toner transitioning from an excessive charging state to an appropriate charging state. As illustrated in FIG. 6A, a small gap G is formed near a contacting position between the photosensitive drum 11 and the developing sleeve 21. FIG. 6A illustrates a state in which the developing sleeve 21 and the photosensitive drum 11 are rotated without performing a static elimination sequence particularly. Therefore, as illustrated in the drawing, excessively charged toner is not statically eliminated particularly.

On the other hand, in the present embodiment, the toner on the developing sleeve 21 in the region of the gap G soars from the developing sleeve 21 toward the photosensitive drum 11 due to an electric field of the soaring bias in the direction away from the developing sleeve 21.

In an upstream region in the rotation direction E of the photosensitive drum 11 illustrated in FIG. 6B, the toner t repeats soaring (see a void arrow) from the developing sleeve 21 and colliding (see a dot arrow) with the developing sleeve 21 and is conveyed to a contacting position. As described above, since the restoring bias is larger than the soaring bias, all the toner soared toward the photosensitive drum 11 in the upstream region is restored to the developing sleeve 21.

In the downstream region illustrated in FIG. 6C, similarly, soaring from the developing sleeve 21 by the soaring bias and collision with the developing sleeve 21 by the restoring bias occur. After that, when the distance between the photosensitive drum 11 and the developing sleeve 21 increases with rotation of the developing sleeve 21, a great part of the soaring toner is conveyed in a state of being restored to the developing sleeve 21 due to the influence of the restoring bias.

In this manner, when the excessively charged toner repeats soaring and restoring, various surfaces of the toner make frictional contact with the developing sleeve 21 containing an electron donating group and an electron accepting group. As a result, static elimination is realized and the toner can be charged appropriately. Moreover, when another toner is disposed between the developing sleeve 21 and the excessively charged toner having soared once, the distance to the developing sleeve 21 increases and the image force between the excessively charged toner and the developing sleeve 21 decreases. In this state, when the toner is conveyed to a position f which is a contact portion between the developing sleeve 21 and the developing blade 23 with rotation of the developing sleeve 21, the toner can easily move and rotate, and the excessively charged toner can be statically eliminated. The application voltage, the frequency, and the like used in the description of the present embodiment are examples only.

<Verification Test>

Hereinafter, the results of a verification test on the effects of a toner electron donating and static elimination sequence in the present embodiment will be described. In the present embodiment, the humidity sensor 72 corresponds to an environment information acquisition unit that acquires the environment classification L as environment information.

Table 4 is the results of a print operation of performing a print job of two sheets under an environment of D=1.3 $g/m^3$ (15° C., 10% RH) which is the environment classification L. "O" indicates that printing has been performed normally (no abnormality), and "X" indicates that fogging in the white background associated with excessive charging of toner, which is observed in a low-humidity environment has occurred (abnormality occurred).

TABLE 4

| 2-sheet job | Number of printed sheets | Toner electron donating and static elimination sequence | Fogging/density abnormality |
| --- | --- | --- | --- |
| Embodiment 3 | 0 sheet | Performed | O (No abnormality) |
|  | 1000 sheets | Performed | O (No abnormality) |
| Comparative example 3 | 0 sheet | Not performed | O (No abnormality) |
|  | 1000 sheets | Not performed | X (Abnormality occurred) |

As illustrated in Table 4, in Comparative Example 3 (when the toner electron donating and static elimination sequence was not executed), an abnormality called fogging wherein toner is developed in the white background in association with disorder of coating on the developing sleeve 21 was observed around the time when 1000 sheets were printed. On the other hand, in Embodiment 3 (when the toner electron donating and static elimination sequence was executed during the post-processing for each job), fogging or a density abnormality was not observed even when 1000 sheets were printed.

As described above, in the case of the contact developing system, when the developing sleeve 21 containing the electron donating group A and the electron accepting group B is used and the toner electron donating and static elimination sequence is performed, excessive charging of the toner t does not occur. Therefore, a regulation defect does not occur and an image defect such as fogging and development lines can be suppressed.

In the present embodiment, in the contact developing system, similarly to during a printing period, the toner electron donating and static elimination sequence is performed in a state in which the developing sleeve 21 and the photosensitive drum 11 are in contact with each other. However, static elimination may be performed in a state in which the developing sleeve 21 and the photosensitive drum 11 are separated from each other. In this case, during a non-image forming period, the developing sleeve 21 is separated from the photosensitive drum 11 by a predetermined distance using a method of driving a separation mechanism of the image forming apparatus to press a separation rib 27, for example. After that, it is possible to perform the toner electron donating and static elimination sequence similarly by applying an AC bias capable of allowing the toner on the developing sleeve 21 to soar.

Embodiment 4

Next, Embodiment 4 will be described. The same components as those of the above-described embodiment will be denoted by the same reference numerals and the description thereof will be simplified.

<Apparatus Configuration>

Figure 8:
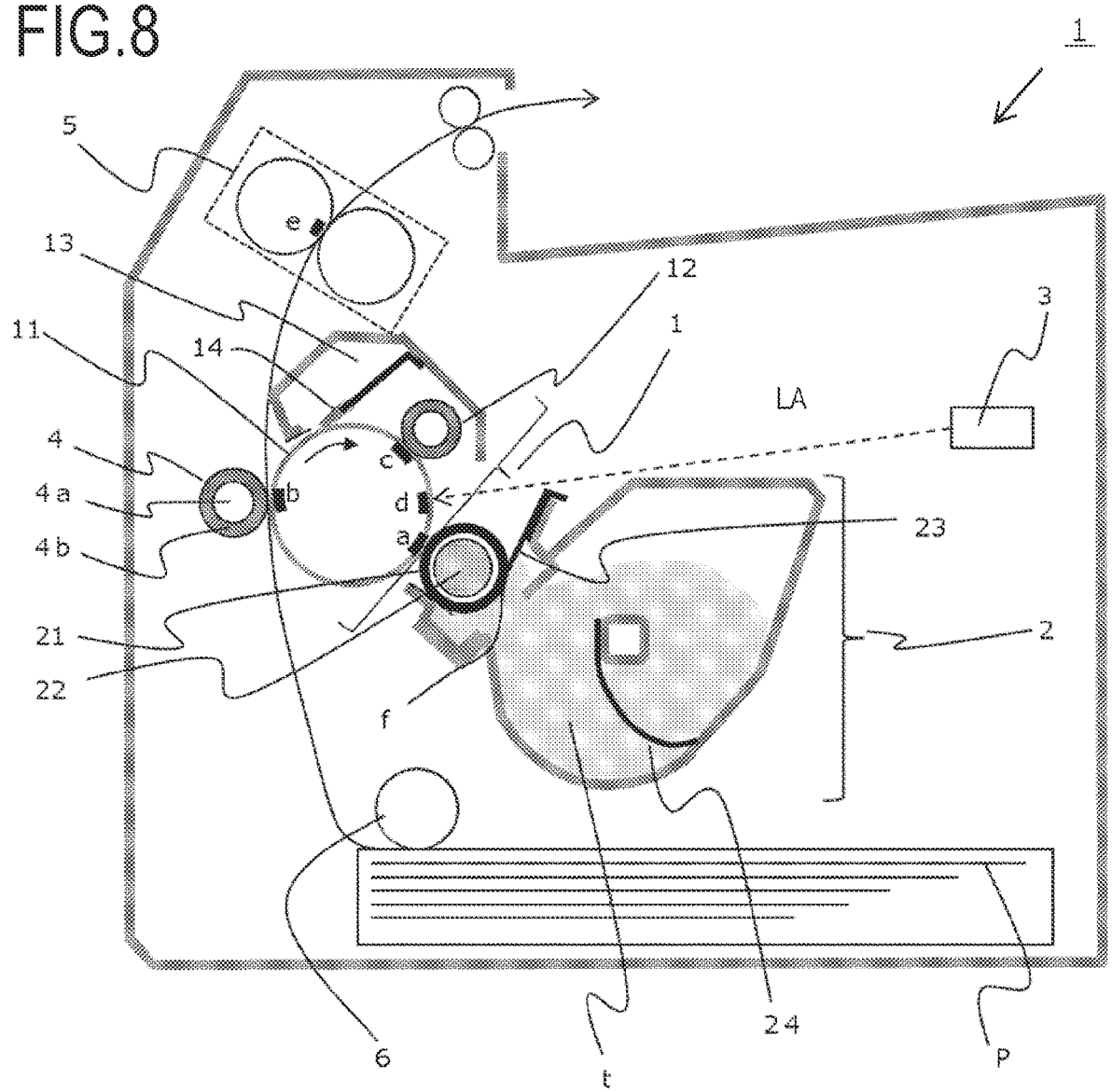
FIG. 8 is a schematic cross-sectional view of an image forming apparatus according to Embodiment 4.

In the present embodiment, the image forming apparatus 1 illustrated in FIG. 8 is used. In the present embodiment, the photosensitive drum 11 which is an image bearing member is a negatively charging OPC photosensitive member having an outer diameter of φ24 mm. The photosensitive drum 1 of the present embodiment is rotationally driven at a constant speed in a clockwise direction indicated by an arrow by an external charging apparatus driving motor (not illustrated). In this example, the circumferential speed is 150 mm/sec (a process speed PS or a printing speed). In the present embodiment, a contact DC charging system is employed, and the charging roller 12 makes contact with the photosensitive drum 11 with predetermined pressure and forms a charging nip at the position c. The DC voltage that the control portion 40 controls the charging power source 31 to apply to the charging roller 12 is set to such a value that the potential difference between the surface of the photosensitive drum 11 and the charging roller 12 is equal to or larger than a discharge start voltage, and specifically, a DC voltage of −1250 V is applied as the charging bias. In this case, the surface of the photosensitive drum 11 is uniformly contact-charged to a charging potential (dark-part potential) Vd of −600 V.

In the present embodiment, the laser beam scanner 3 including a laser diode, a polygon mirror, and the like is used as an exposure unit as means for forming an electrostatic latent image on a charged image bearing member. The laser beam scanner 3 outputs a laser beam which has been intensity-modulated according to a time-series electric digital pixel signal of desired image information and scans and exposes the uniformly charged surface of the photosensitive drum 11 with the laser beam (see symbol LA). The laser power is adjusted to a potential V1 of −100 V when the entire surface of the uniformly charged surface of the photosensitive drum 11 is exposed with a laser beam.

The developing apparatus 2 as a developing unit having a developing member supplies magnetic toner as a developer to the electrostatic latent image formed on the photosensitive drum. In the present embodiment, a developing bias (Vdc) of −400 V is applied to the developing sleeve 21 as an image carrying member from a developing power source as a voltage application unit that applies a voltage to the developing member. A developing system of the present embodiment is a contact developing system but is not limited thereto. In the above description, the size, the application voltage, the circumferential speed, and the like are examples only.

<Developing Apparatus>

Figure 9:
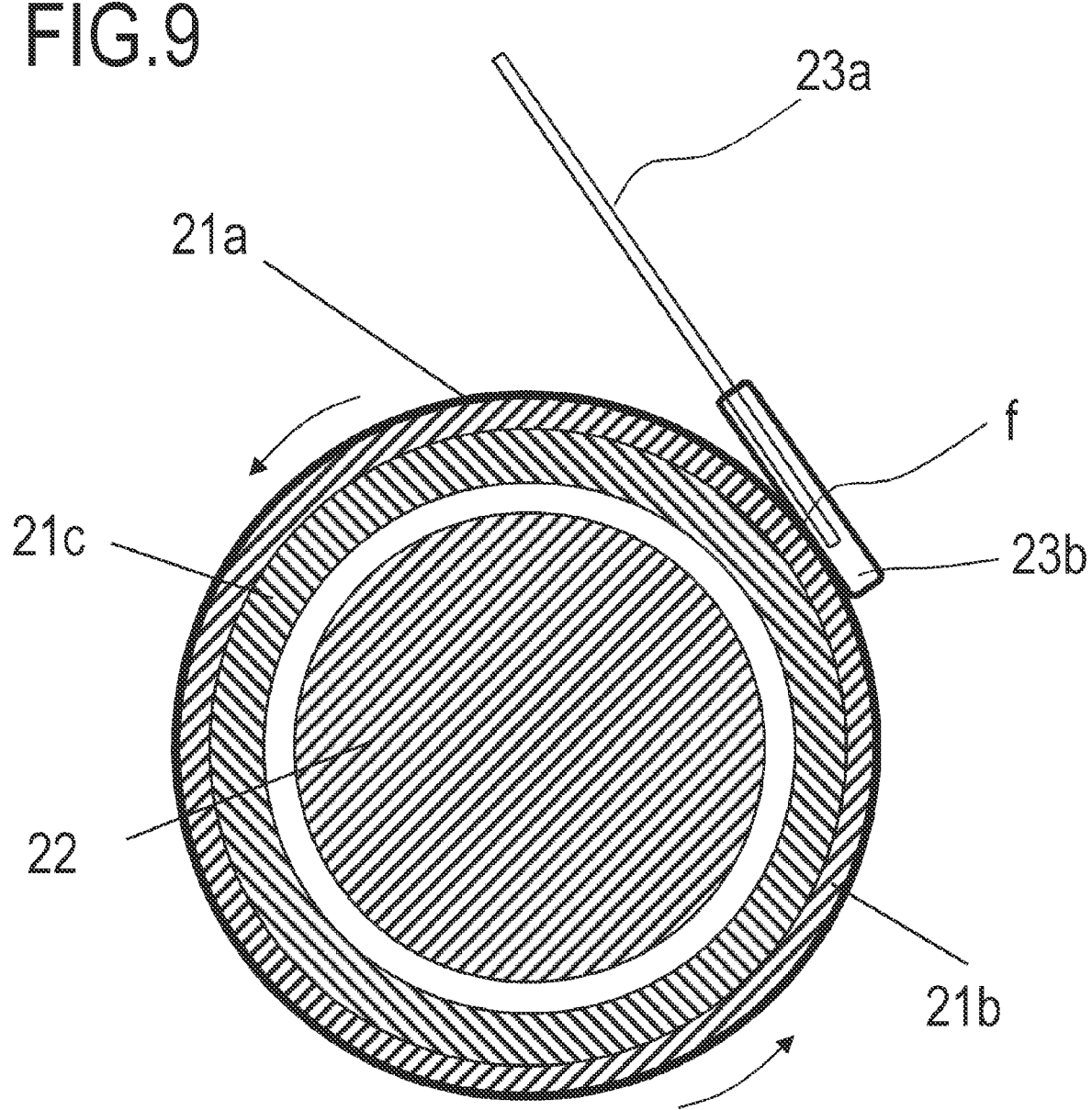
FIG. 9 is a schematic cross-sectional view of a developing sleeve according to Embodiment 4.

As illustrated in FIG. 8, the developing sleeve 21 of the present embodiment is rotatably supported by the developing apparatus 2. The developing sleeve 21 illustrated in FIG. 9 is rotationally driven independently at a circumferential speed of 140% (210 mm/sec) with respect to the photosensitive drum 11 by a developing apparatus driving motor (not illustrated). The developing sleeve 21 includes a hollow aluminum element tube (the base 21c) having an outer diameter of 11 mm and an inner diameter of 9 mm and a conductive elastic rubber layer (the elastic layer 21b) having a thickness of 500 μm formed around the tube. A structure having a surface roughness Ra of 1.0 μm to 4.0 μm is provided on the surface (the surface layer 21a) of the conductive elastic rubber layer so as to convey a developer.

The negatively charging toner t is stirred by the stirring member 24 inside the developing apparatus and is conveyed near the developing sleeve 21, and is supplied to the surface of the developing sleeve by the magnetic force of the magnet roller 22. The developer supplied to the surface of the developing sleeve passes through the regulation nip f of the developing blade 23 whereby a uniform thin layer of the toner is formed. Furthermore, the developer rotates and makes frictional contact with the developing sleeve 21 whereby the developer is charged to a negative polarity. After that, the developer is conveyed up to a developing position at which it makes contact with the photosensitive drum 11 to develop an electrostatic latent image.

The developing blade 23 of the present embodiment illustrated in FIG. 9 includes a support member 23a having a thickness of approximately 100 μm and a resin layer 23b attached to the distal end of the support member 23a. The support member 23a is an elastic member and has a base end fixed to a supporting metal plate. The resin layer 23b is a conductive resin. The resin layer 23b makes contact with the surface of the developing sleeve 21 with predetermined pressure. In this case, the contact force is approximately 20 gf/cm to 40 gf/cm (a contact load per 1 cm in the longitudinal direction of the developing sleeve 21).

In the present embodiment, SUS is used for the support member 23a so as to provide elasticity. However, the support member 23a may be formed of phosphor bronze, an aluminum alloy, or the like and may be formed of a resin having high hardness as long as it has conductivity. Moreover, in the present embodiment, the resin layer 23b is formed by coating the support member 23a with a conductive polyurethane. In addition to this, polyimide, a polyamide elastomer, polyester, a polyester elastomer, polyester terephthalate, silicone rubber, a silicone resin, and a melamine resin may be used alone or in combination of two or more. In the above description, the size, the material, the application voltage, the circumferential speed, and the like are examples only.

<Examination of Problem>

In the present embodiment, it is possible to control the charging state of toner to a certain degree by using the developing sleeve having a surface layer containing an electron donating group and an electron accepting group. However, in the present embodiment, the use of the developing sleeve cannot sufficiently suppress excessive charging of toner in a low-temperature and low-humidity environment. This will be described in detail with reference to FIGS. 10A and 10B.

Figure 10A:
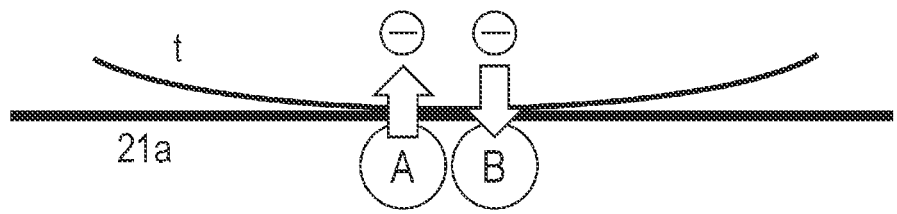
FIG. 10A is a diagram for describing a problem in a low-temperature and low-humidity environment according to Embodiment 4.
Figure 10B:
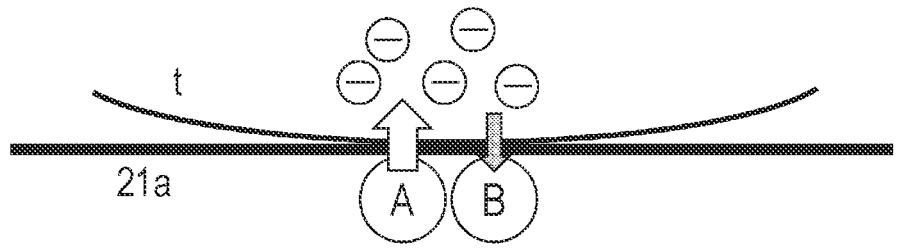
FIG. 10B is a diagram for describing a problem in a low-temperature and low-humidity environment according to Embodiment 4.

In FIGS. 10A and 10B, the size of an arrow illustrated between the toner t and the surface layer 21a of the developing sleeve indicates the movement amount of charge per unit time. In a normal environment as in FIG. 10A, since exchange of charge can be performed sufficiently between the electron donating group A and the electron accepting group B on the contact surface between the toner t and the surface layer 21a of the developing sleeve, appropriately charged toner is obtained. However, in a low-temperature and low-humidity environment as in FIG. 10B, since a toner resistance increases, charge does not easily move from the toner surface to the surface layer 21a of the developing sleeve. Therefore, since the speed of accepting charge decreases due to the frictional contact with the electron accepting group B, it may not be possible to accept the charge of the excessively charged toner sufficiently. Therefore, the excessively charged toner is strongly fixed to the developing sleeve 21 due to image force, and the fixing force exceeds the regulating force of the developing blade which is a regulating member. In this way, disorder of the toner layer on the developing sleeve 21 occurs and an image defect due to a regulation defect or the like occurs.

Therefore, in the present embodiment, a method for sufficiently accelerating movement of charge due to frictional contact between toner and the electron accepting group B in order to suppress excessively charged toner in a low-temperature environment will be examined. That is, the contact period of the toner and the surface of the developing sleeve is increased to accelerate movement of charge from toner to the electron accepting group B. That is, the rotating speed of the developing sleeve 21 is decreased so that change in movement of the contact surface between the toner t and the electron accepting group B with rotation of the toner in the regulation nip f is decreased and movement of charge due to the frictional contact between the toner and the electron accepting group B occurs sufficiently.

<Examination of Verification>

In the present embodiment, the rotating speed of the developing sleeve 21 is changed to suppress excessive charging of toner. The toner charge amount Q/M after the developing sleeve 21 was rotated 500 turns was measured using the configuration of FIGS. 8 and 9 while varying the rotating speed of the developing sleeve 21 (changing the rotating speed variously).

Figure 11:
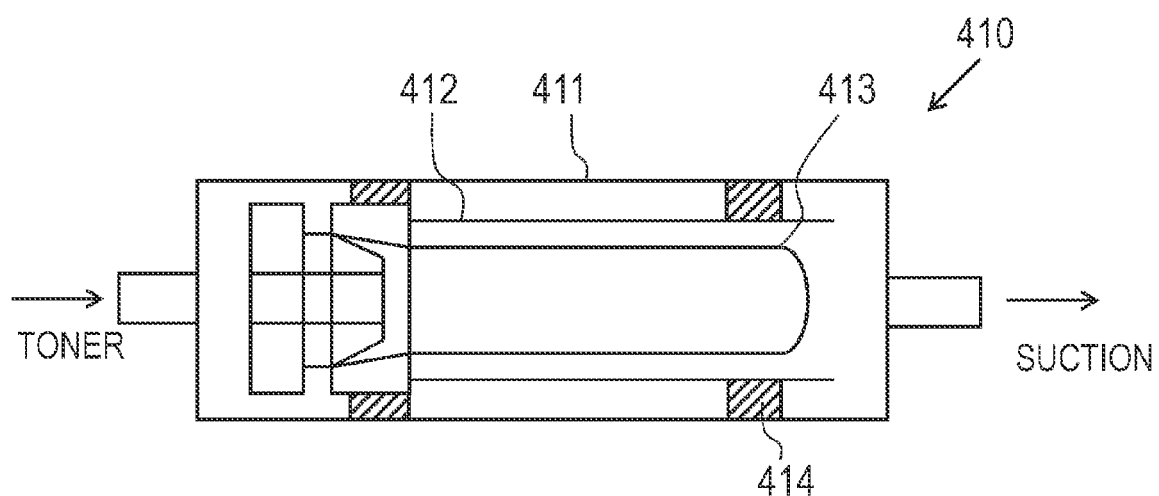
FIG. 11 is a diagram for describing a functional configuration of a Faraday cage.

As illustrated in FIG. 11, the toner charge amount Q/M was measured using a Faraday cage 410. The Faraday cage includes a double cylinder in which metal cylinders having different shaft diameters are arranged coaxially and includes a toner collecting filter 413 for taking in toner, provided in an inner cylindrical of the double cylinder. When an inner cylinder 412 and an outer cylinder 411 of the double cylinder are insulated by an insulating member 414 and charged particles having a charge amount q are put in the inner cylinder 412, it can be assumed that a metal cylinder having a charge amount q due to electrostatic induction is formed. The charge amount induced in the double cylinder was measured using "KEITHLEY 616 DIGITAL ELECTROMETER", and the toner charge amount Q/M was obtained by dividing the measured charge amount by the toner weight in the inner cylinder.

Figure 12A:
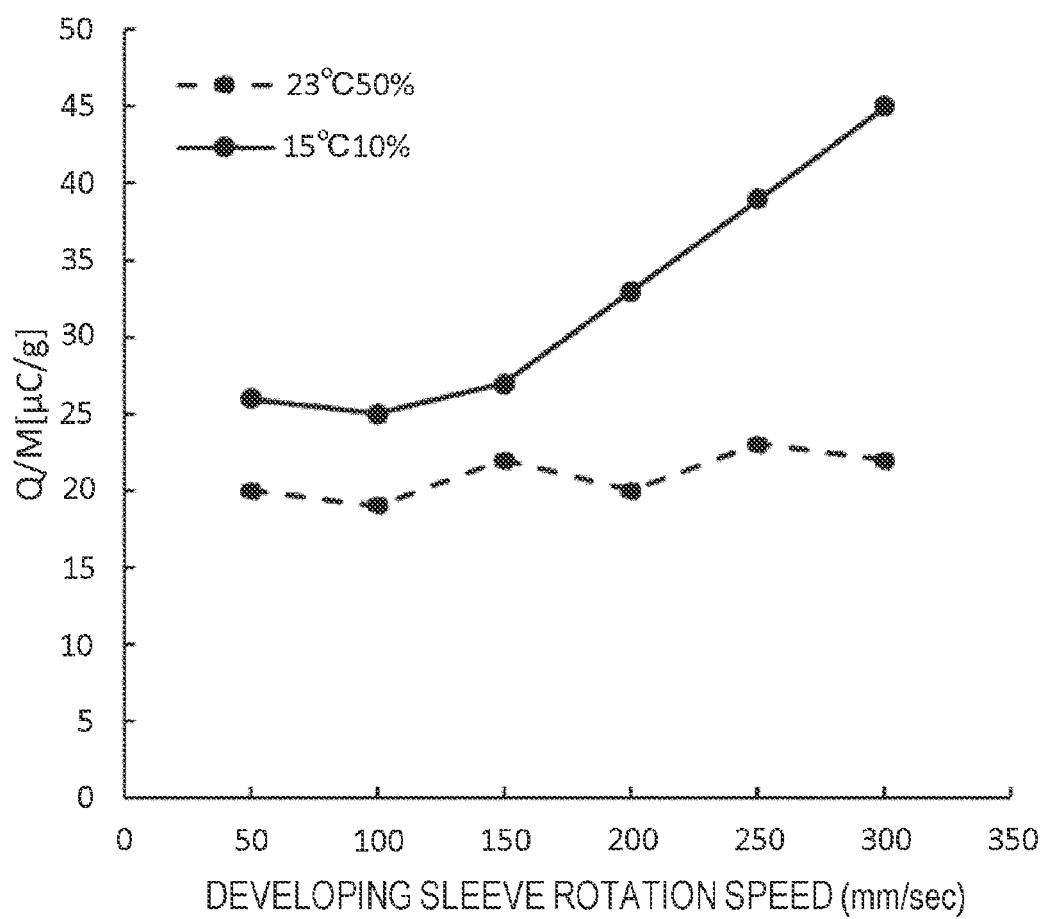
FIG. 12A is a graph illustrating verification results of Embodiment 4.

The results are illustrated in FIG. 12A. In an environment of 23° C. and 50% RH, the Q/M of the developing sleeve 21 is stable regardless of the rotating speed. On the other hand, if can be understood that, in a low-temperature and low-humidity environment of 15° C. and 10% RH, Q/M increases when the rotating speed of the developing sleeve 21 is 200 mm/sec or higher. In the configuration of the present embodiment, a regulation defect occurred when Q/M exceeded 40 μC/g.

That is, in a low-temperature and low-humidity environment, when the rotating speed of the developing sleeve 21 is 200 mm/sec or higher, the movement of the contact surface of the toner and the electron accepting group B in the surface layer 21a of the developing sleeve becomes faster due to rotation of the toner in the developing regulation nip, and the time for accepting charge becomes insufficient. As a result, it is assumed that the electron accepting group cannot accept charge sufficiently, and an image defect such as a regulation defect occurs.

In this case, the change in Q/M of the toner on the developing sleeve when the rotating speed of the developing sleeve is decreased to 150 mm/sec after the developing sleeve was rotated 500 turns at a rotating speed of 300 mm/sec is illustrated in FIG. 6B. When the rotating speed of the developing sleeve was 150 mm/sec, decreased in Q/M was observed approximately at 10 turns of the developing sleeve. It was understood that the function of the electron accepting group B was obtained sufficiently before the contact surface between the toner and the electron accepting group B in the surface layer 21a of the developing sleeve changed with rotation of the toner. In the above verification, the numbers are examples only.

<Low-Temperature Durability Comparison>

Durability evaluation was performed using the configuration of the present embodiment. FIG. 13 illustrates the rotating speed of the motor in each step of image forming according to the present embodiment. As illustrated in FIG. 13, the development rotating speed was halved during post rotation only. The durability test was performed under the following condition in a state in which the development rotating speed was 105 mm/sec and during post rotation, the developing sleeve was rotated 10 turns (for 3.2 seconds). As a Comparative Example, a durability test was performed in a state in which the development rotating speed was constant.

(Durability Conditions)
Environment: 15° C. and 10%
Toner amount: 60 g
Print mode: print percentage 2%, two-page intermittent
Number of prints: 1000 sheets
Sheet type: ZEROX Vitality 75 g paper Table 5 illustrates the results of the durability test at various numbers of prints under the conditions of the present embodiment and the conditions of the Comparative Example.

TABLE 5

| Number of prints for durability test | Image defect/regulation detect | |
|---|---|---|
| | Present embodiment | Comparative Example |
| 0 | O (No abnormality) | O (No abnormality) |
| 250 | O (No abnormality) | O (No abnormality) |
| 500 | O (No abnormality) | O (No abnormality) |
| 750 | O (No abnormality) | Δ (Minor defect) |
| 1000 | O (No abnormality) | X (defect) |

In the table, "O" indicates no abnormality, "Δ" indicates a minor regulation defect, and "X" indicates a regulation defect. In the configuration of the present embodiment, no image defect was observed through the durability test.

Figure 14:
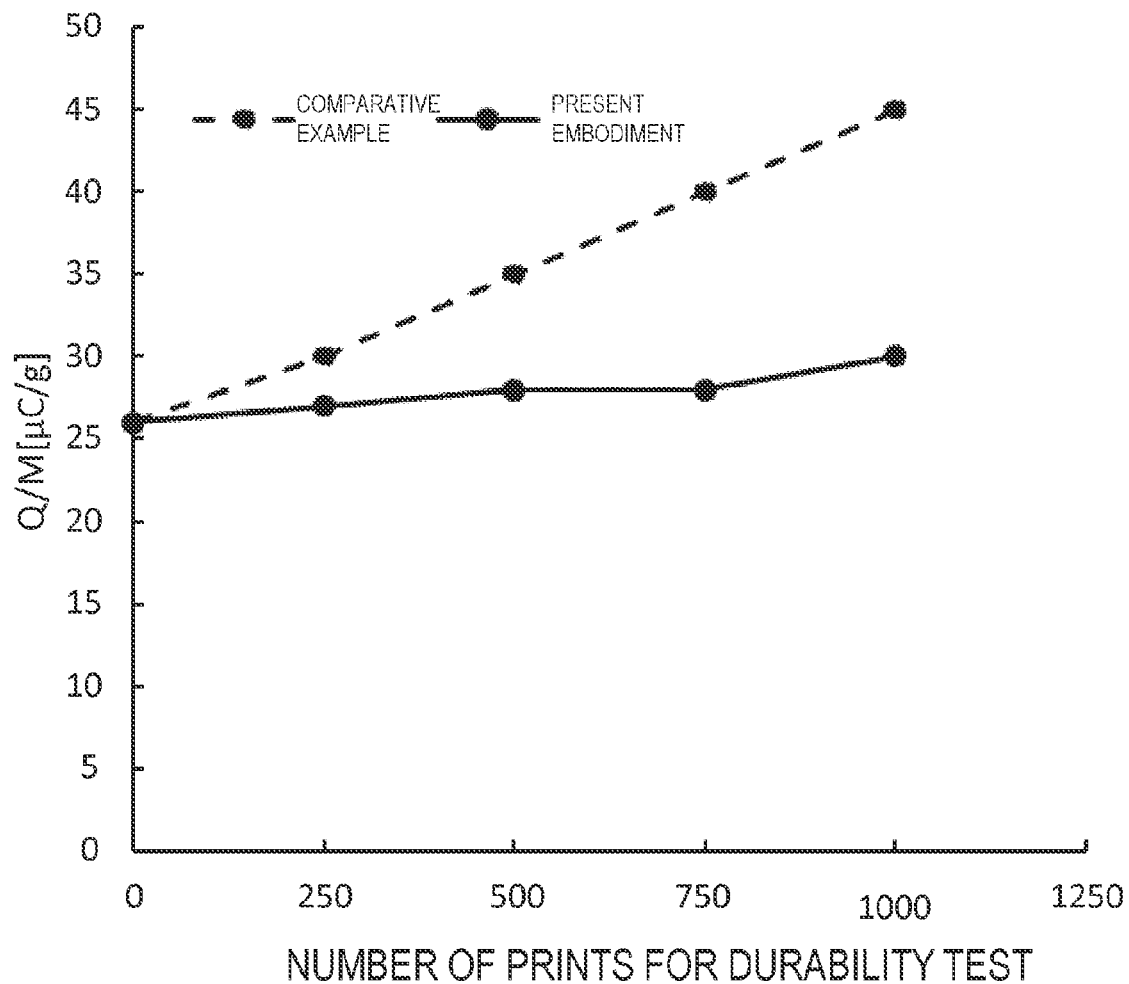
FIG. 14 is a graph illustrating the results of a durability test of Embodiment 4.

As illustrated in FIG. 14, in the configuration of the present embodiment, Q/M of toner was stable and a satisfactory image was obtained. In the Comparative Example, the toner charge amount Q/M on the developing sleeve 21 increased gradually and a regulation defect was observed at 750 sheets. Therefore, in the configuration of the present embodiment, in a low-temperature environment, by decreasing the development rotating speed, the developing sleeve 21 of the present configuration could perform its sufficient function and a stable image quality was obtained.

In the present embodiment, although the rotating speed of the developing sleeve was decreased during post rotation only, a similar effect is obtained when the rotating speed of the developing sleeve is decreased during pre-rotation or an inter-sheet period. Moreover, the developing sleeve may be slowed or rotated in idle ever predetermined number of prints or only rotated by employing a configuration in which the developing apparatus is separated to suppress fogging.

Embodiment 5

An image forming apparatus of the present embodiment further includes an environment information acquisition unit in addition to the configuration of Embodiment 4. Moreover, a drive force is input to a charging apparatus only. The present embodiment employs a configuration in which a charging apparatus and a developing apparatus are integrated, the photosensitive drum 11 is rotated at 150 mm/sec by a charging motor, and the developing sleeve 21 is rotated at 210 mm/sec in conjunction with the photosensitive drum 11. However, these numbers are examples only.

In the present embodiment, an environment classification based on an absolute humidity is set, an absolute humidity is calculated from the temperature and the relative humidity detected by temperature and humidity sensors, and the environment classification is determined according to the calculated absolute humidity. Moreover, environment correction is performed.

Table 6 illustrates an example of an environment classification based on an absolute humidity.

TABLE 6

| Environment classification | Absolute humidity D (g/m$^3$) |
|---|---|
| L | D < 5.0 |
| N | 5.0 ≤ D < 15.0 |
| H | 15.0 ≤ D |

In Table 6, an environment is classified on the basis of the levels (low/normal/high) of an absolute humidity. However, another temperature condition may be added. For example, an environment classification NN may be a normal-temperature and normal-humidity environment, an environment classification LL may be a low-temperature and low-humidity environment, and an environment classification HH may be a high-temperature and high-humidity environment. In this case, as an example of the classification, environments of 23° C. and 50% RH, 15° C. and 10% RH, and 27° C. and 80% RH may be determined as a normal-temperature and normal-humidity environment (absolute humidity D of 10.3 g/m$^3$), a low-temperature and low-humidity environment (an absolute humidity D of 1.3 g/m$^3$), and a high-temperature and high-humidity environment (an absolute humidity D of 20.6 g/m$^3$), respectively. However, these thresholds are examples only.

In the present embodiment, when the environment is determined as the LL environment, a Q/M optimization sequence is performed in such a way that, whenever 250 pages are printed, the speed of a process cartridge is halved and decreased to a process speed of 75 mm/sec, and the developing sleeve 21 is rotated 30 turns during a non-image forming period. By doing so, the apparatus can be operated in the LL environment only where the Q/M optimization sequence is necessary, the apparatus can be prevented from operating in an environment such as the NN and HH environments where the Q/M optimization sequence is not necessary, and the waste such as deterioration of toner of consumables of a process unit can be suppressed.

Figure 15:
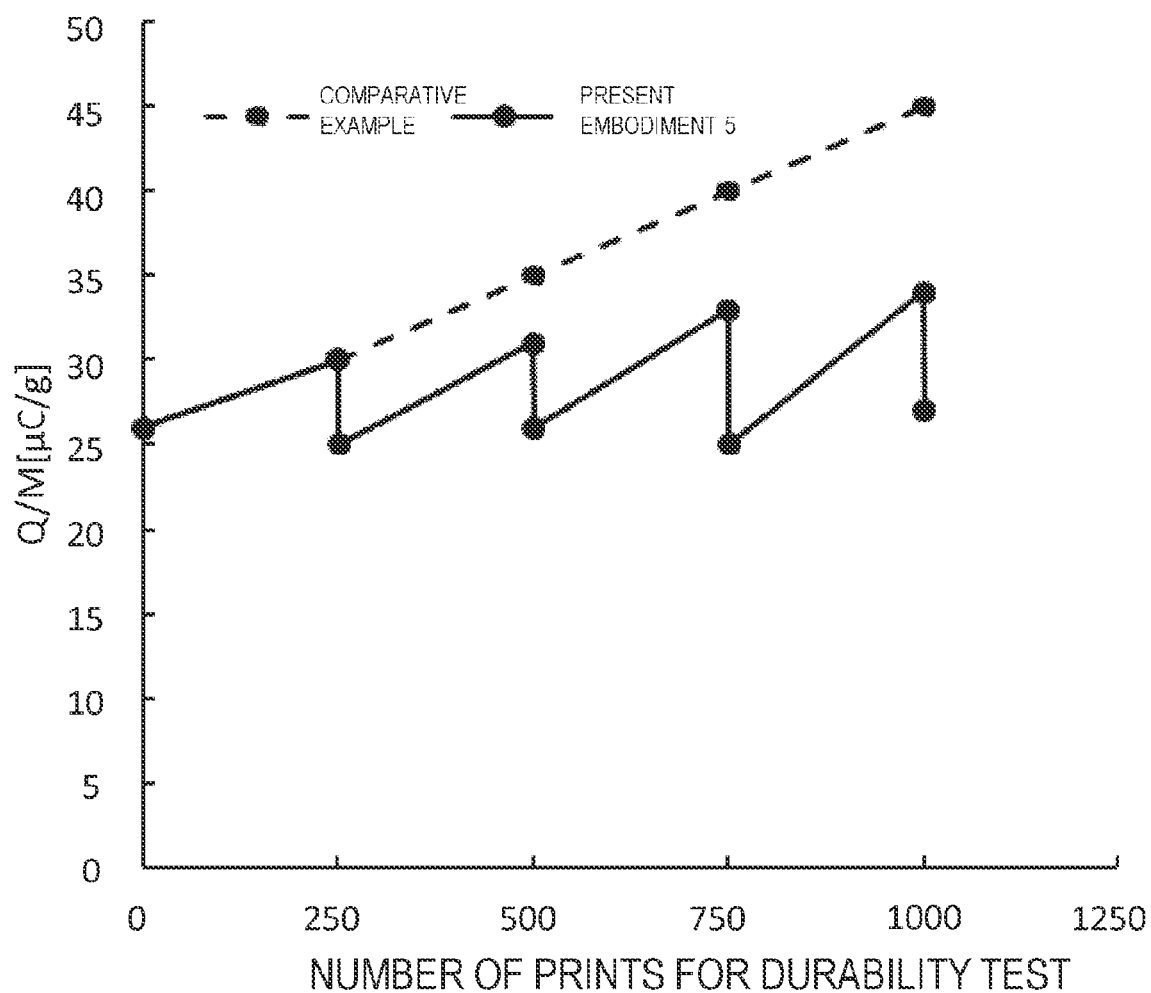
FIG. 15 is a graph illustrating the results of a durability test of Embodiment 5.

FIG. 15 illustrates the results of comparison of durability between a Comparative Example and the present embodiment similarly to Embodiment 4. In the Comparative Example, the toner charge amount Q/M on the developing sleeve 21 increased gradually, and image defect was observed at 750 prints. On the other hand, in the configuration of the present embodiment, although the Q/M on the developing sleeve 21 increased through the durability test, since the above-mentioned procedure was performed every 250 pages, it was possible to decrease the Q/M and obtain a satisfactory image through the durability test.

An environment determination method is not limited to this. For example, although the environment was determined on the basis of an absolute humidity in the present embodiment, an environment may be determined using a temperature only, a relative humidity only, or a combination thereof.

Embodiment 6

Figure 16:
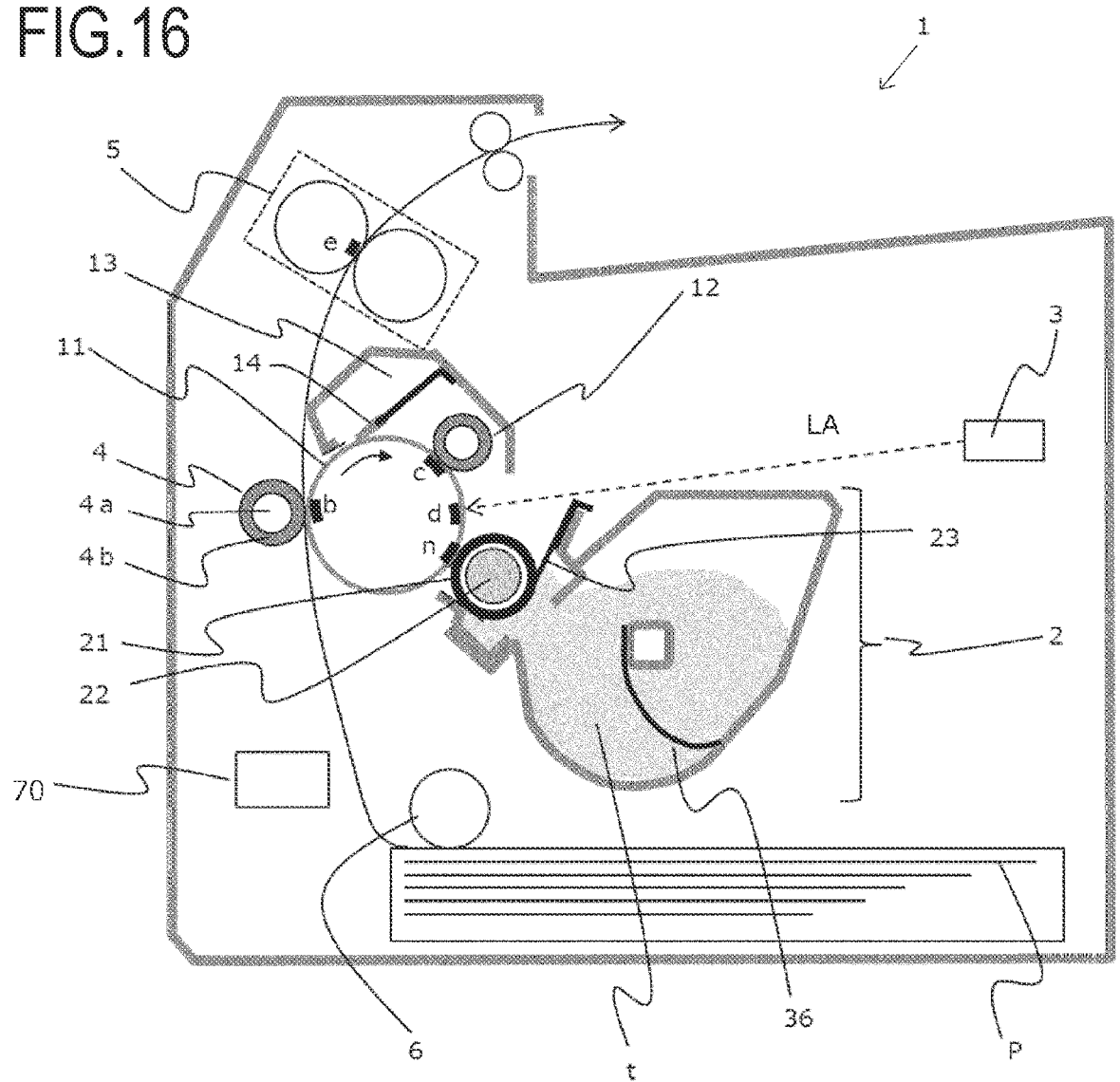
FIG. 16 is a schematic cross-sectional view of an image forming apparatus according to Embodiment 6.

Next, Embodiment 6 will be described. In the schematic cross-sectional views of the image forming apparatus 1 and the developing apparatus illustrated in FIGS. 16 and 17, the same constituent components as those of the above-described embodiments will be denoted by the same reference numerals, and the description thereof will be simplified. The image forming apparatus 1 is a monochrome laser printer which uses a transfer electrophotographic process.

Apparatus Configuration and Control>
(Image Forming Apparatus)

In the present embodiment, the photosensitive drum 11 which is an image bearing member is a negatively charging OPC photosensitive member having an outer diameter of φ24 mm. The photosensitive drum 11 is rotated at a constant circumferential speed of 150 mm/sec (a process speed PS and a printing speed) in a clockwise direction indicated by an arrow by an external charging apparatus driving motor (not illustrated). In the present embodiment, a contact DC charging system is employed, and the charging roller 12 makes contact with the photosensitive drum 11 with predetermined pressure and forms a charging nip at the position c. The DC voltage that the control portion 40 controls the charging power source 31 to apply to the charging roller 12 is set to such a value that the potential difference between the surface of the photosensitive drum 11 and the charging roller 12 is equal to or larger than a discharge start voltage. Specifically, a DC voltage of −1150 V is applied as the charging bias. In this case, the surface of the photosensitive drum 11 is uniformly contact-charged to a charging potential (dark-part potential) Vd of −600 V.

The image forming apparatus includes a laser beam scanner including a laser diode, a polygon mirror, and the like as an exposure unit as means for forming an electrostatic latent image on a charged image bearing member. The laser beam scanner 3 outputs a laser beam which has been intensity-modulated according to a time-series electric digital pixel signal of desired image information and scans and exposes the uniformly charged surface of the photosensitive drum 11 with the laser beam (see symbol LA). The laser power is adjusted so that the potential V1 is −100 V when the entire surface of the uniformly charged surface of the photosensitive drum 11 is exposed with the laser beam. In the above description, the size, the circumferential speed, the potential, and the like are examples only.

(Developing Apparatus)

Figure 17:
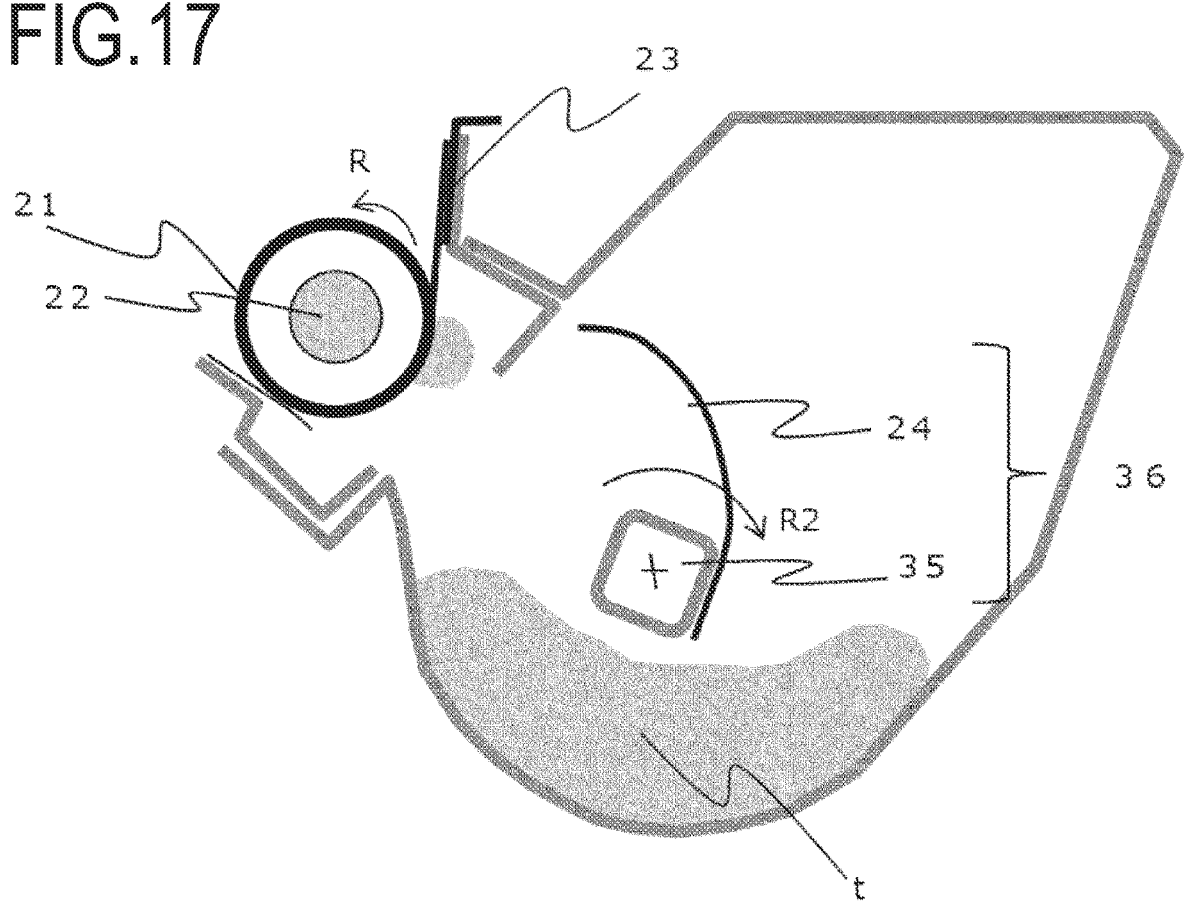
FIG. 17 is a schematic cross-sectional view of a developing apparatus according to Embodiment 6.

The developing apparatus 2 as a developing unit having a developing member, illustrated in FIG. 17 employs a contact developing system in which the developing apparatus 2 supplies toner t to the electrostatic latent image formed on the photosensitive drum 11 while making contact at the position a at which the photosensitive drum 11 and the developing sleeve 21 face each other. The developing apparatus 2 includes a container 25 that stores the negative-polarity toner t as a developer, a developing sleeve 21, a magnet roller 22, and a developing blade 23. The developing sleeve 21 has an outer diameter of φ12 mm and is rotatably attached to the developing apparatus 2. The toner t in the container 25 is attracted to the surface of the developing sleeve 21 by the magnetic force of the magnet roller 22 which is a magnetic field generation unit included in the developing sleeve 21 while being conveyed to the developing sleeve 21 by a toner conveying unit 36 including a sheet member and a shaft 35.

The toner t is triboelectrically charged to a negative polarity at the nip n formed with a predetermined width between the developing sleeve 21 and the developing blade 23, following the rotation of the developing sleeve 21. A developing bias (Vdc) of −300 V is applied to the developing sleeve 21 by a developing bias application unit (not illustrated) provided in the main body, and the toner t is supplied to the surface of the photosensitive drum 11 by the potential difference between the electrostatic latent image on the photosensitive drum 11 and the developing sleeve 21 to form a toner image. The numbers such as the size and the potential are examples only.

(Developing Sleeve and Regulating Member)

Figure 18:
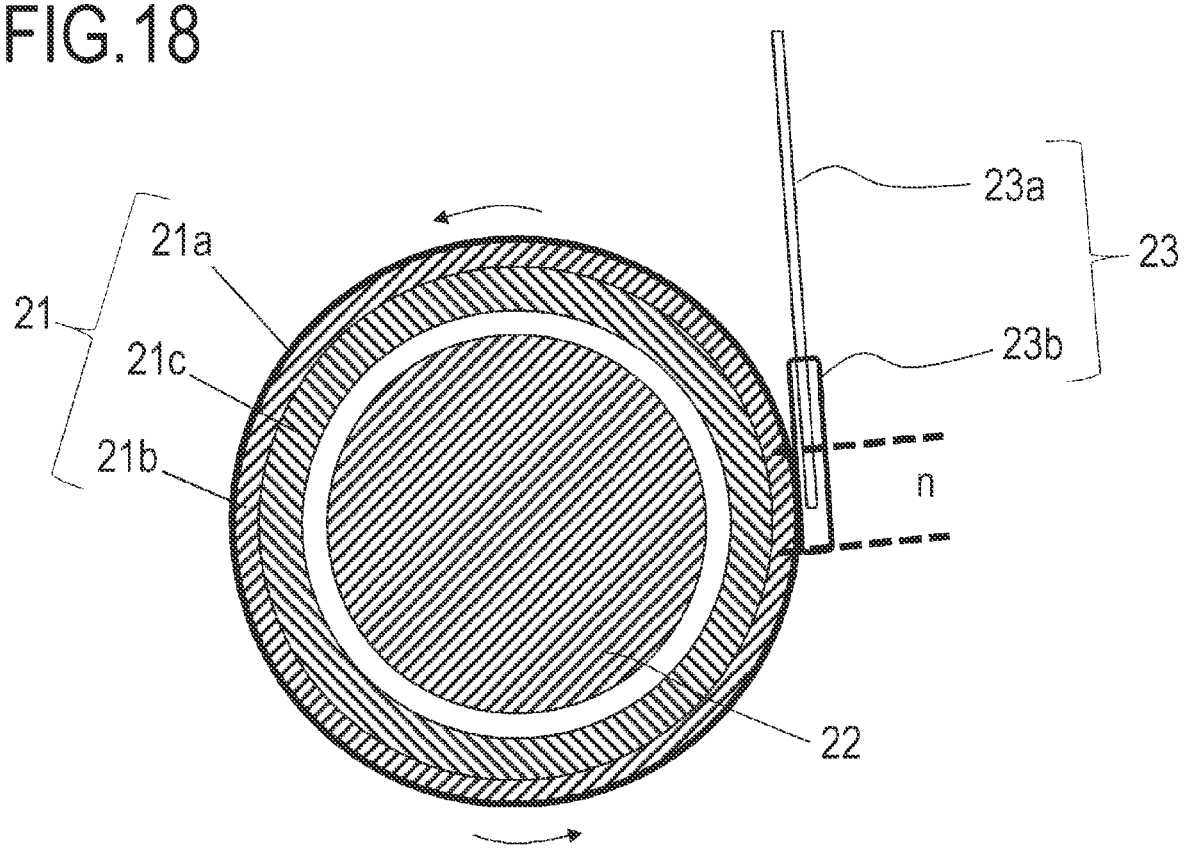
FIG. 18 is a schematic cross-sectional view of a developing sleeve according to Embodiment 6.

A configuration of the developing sleeve and the regulating member included in the developing apparatus will be described in further detail with reference to FIG. 18. FIG. 18 is a schematic cross-sectional view near the developing sleeve 21. The developing sleeve 21 is rotatably supported by the developing apparatus 2 and can be rotated independently at a circumferential speed of 140% (210 mm/sec) with respect to the photosensitive drum 11 by a developing apparatus driving motor (not illustrated). The developing sleeve 21 includes a hollow aluminum element tube (the base 21c) having an outer diameter of 11 mm and an inner diameter of 9 mm and a conductive elastic rubber layer (the elastic layer 21b) having a thickness of 500 μm formed around the tube, and a structure having a surface roughness Ra of 1.0 μm to 4.0 μm is provided on the surface (the surface layer 21a) of the conductive elastic rubber layer so as to convey a developer.

The developing blade 23 includes a support member 23a having a thickness of approximately 100 μm and a resin layer 23b attached to the distal end of the support member 23a. The support member 23a is an elastic member and has a base end fixed to a supporting metal plate. The resin layer 23b is formed of a conductive resin and makes contact with the surface of the developing sleeve 21 with predetermined pressure. In this case, the contact force is approximately 20 gf/cm to 40 gf/cm (a contact load per 1 cm in the longitudinal direction of the developing sleeve 21).

In the present embodiment, although SUS is used for the support member 23a so as to provide elasticity, the support member 23a may be formed of phosphor bronze, an aluminum alloy, or the like and may be formed of a resin having high hardness as long as it has conductivity. Moreover, in the present embodiment, the resin layer 23b is formed by coating the support member 23a with a conductive polyurethane. In addition to this, polyamide, a polyamide elastomer, polyester, a polyester elastomer, polyester terephthalate, silicone rubber, a silicone resin, and a melamine resin may be used alone or in combination of two or more. The size, the material, the contact force, and the like are examples only.

<Developing Blade Bias>

As described above, the developing blade 23 has conductive properties, and the developing blade bias application unit 33 provided in the main body of the image forming apparatus applies a rectangular AC bias (see FIG. 19, Vmax: −450 V, Vmin: −150 V, and Duty ratio: 50%) according to the control of the control portion 40. In this way, an alternative electric field is formed in the nip n between the developing sleeve 21 and the developing blade 23, and Coulomb force alternately acts on the sides of the toner t close to the developing sleeve 21 and the developing blade 23. As a result, rolling abilities of the toner t at the nip n are improved, and various surface of the toner t can make sliding contact with the developing sleeve 21. Therefore, the setting speed of the electron donating group A and the electron accepting group B toward the region of the Fermi level is improved. That is, a printed portion can quickly hold charge and a non-printed portion can donate excessive charge whereby the electrostatic properties of both portions become equal, and as a result, a development ghost can be suppressed.

Since Coulomb force is alternately applied to the toner in the course of passing through the nip, the amplitude of the frequency of the developing blade bias is preferably one wave number or more within the period of passing through the nip n as the condition of the developing blade bias. Therefore, as Embodiment 6-1, the nip n is set to 0.3 mm, and the frequency of the developing blade bias is set to 2000 Hz, which corresponds to approximately 2.8 wave numbers. Moreover, as Embodiment 6-2, the nip n is set to 0.3 mm, and the frequency of the developing blade bias is set to 4000 Hz, which corresponds to approximately 5.7 wave numbers. As Embodiment 6-3, the nip n is set to 0.2 mm, and the frequency of the developing blade bias is set to 1100 Hz, which corresponds to approximately 1.0 wave number.

As a Comparative Example, in Comparative Example 6-1, the developing sleeve of the present embodiment was used, and the potential of the developing blade bias was set to the same as that of the developing sleeve. That is, an alternative electric field was not formed between the blade and the sleeve. In Comparative Example 6-2, the developing sleeve of PTL 1 (that is, a developing sleeve that contains a tertiary amine structure functioning as the electron donating group A and does not have a polycarbonate bond functioning as the electron accepting group B) was used, and a developing blade bias applying an AC bias similar to the present embodiment was used.

Verification results using the developing apparatus 2 having the above-described configuration will be described. As a verification method, a toner charge amount of the developing sleeve 21 (after solid-black printing) immediately after printing a solid-black pattern (a 100%-print image) to a width of 150 mm and a toner charge amount of the developing sleeve 21 (after solid-white printing) immediately after printing a solid-white pattern (a 0%-print image) to a width of 150 mm were measured. Furthermore, a development ghost was observed by imaging. The toner charge amount Q/M was measured using a Faraday cage similar to that of FIG. 11. The measurement results are illustrated in Table 7.

Table 1 illustrates the charge amount of the toner on the developing sleeve 21 after white and black patterns and the result of an image defect when 1000 pages were printed. As for the level of a development ghost, "O" indicates no occurrence, "Δ" indicates occurrence within an allowable range, and "X" indicates an unallowable level.

TABLE 7

|  | Wave number during passing through nip | Q/M after white | Q/M after black | Development ghost |
|---|---|---|---|---|
| Embodiment 6-1 | 2.8 | 21 μC/g | 19 μC/g | O (Not occurred) |
| Embodiment 6-2 | 5.6 | 21 μC/g | 19 μC/g | O (Not occurred) |
| Embodiment 6-3 | 1.0 | 22 μC/g | 18 μC/g | O (Not occurred) |
| Comparative Example 6-1 | 0 | 21 μC/g | 15 μC/g | Δ (Within allowable range) |
| Comparative Example 6-2 | 2.8 | 24 μC/g | 16 μC/g | X (Non allowable) |

In Comparative Examples 1 and 2, there was a difference between the Q/Ms after white and black, and a development ghost occurred. In contrast, when the configuration of Embodiments 6-1 to 6-3 was employed, there was a small difference between the Q/Ms after white and black, and a development ghost did not occur.

From the above results, it was confirmed that, in the present embodiment, the developing sleeve 21 performed its function sufficiently and a stable image quality was obtained when the control portion 40 controlled the developing blade bias application unit 33 to apply an AC bias to the developing blade 23, set the nip n and the frequency appropriately, and set the wave number in the period of passing through the nip n to one wave number or more.

In the present embodiment, although the control portion 40 changes the nip n and the frequency to change the wave number in the period of passing through the nip ii, the wave number may be adjusted by setting the other process speed and the circumferential speed of the developing sleeve appropriately.

In the present embodiment, although a rectangular wave is used as the waveform of the developing blade bias, the waveform is not limited thereto, and a sinusoidal wave, a triangular wave, or a sawtooth wave, for example, may be used as long as it is possible to improve the rolling ability of the toner in the nip.

Moreover, although a one-component magnetic toner is used as the toner, a non-magnetic toner may be used if toner can be supplied by force other than a magnetic force by adding a supply member or changing the arrangement of the developing apparatus.

Embodiment 7

A configuration of an image forming apparatus according to the present embodiment is different in that an environment information acquisition unit is provided in the image forming apparatus of Embodiment 6. The image forming apparatus of the present embodiment is characterized in that the developing blade bias is set differently on the basis of acquired environment information. The same constituent components as those of the above-described embodiments will be denoted by the same reference numerals and the description thereof will be simplified.

<Problem>

As described above, in a low-humidity environment or the like, it may not be possible to suppress excessive charging of toner sufficiently, and a problem of a regulation defect or the like may occur. That is, in a normal case, a portion of the charge held by toner leaks through moisture which is a polar molecule included in the air. However, since the amount of moisture in the air is small in a low-humidity environment, the leaking charge amount is small. As a result, the amount of excessively charged toner increases in a low-humidity environment. Since the Fermi level of the electron accepting group B does not change in a low-humidity environment, acceptance of the charge of excessively charged toner due to a difference in Fermi level is not sufficient. Such excessively charged toner is strongly fixed by the image force working between the toner and a developer carrying member, and the fixing force exceeds the regulation force of a toner regulating member. As a result, disorder of a toner layer on the developer carrying member and a regulation defect such as image density non-uniformity or fogging occurs.

Therefore, in the present embodiment, humidity is measured as environment information, and the control portion 40 controls the developing blade bias application unit 33 to change the Coulomb force applied to toner according to the humidity. That is, in a low-humidity environment, the control portion 40 controls the Coulomb force applied from the electron accepting functional group B to the toner so as to be larger than that in a normal-humidity environment. In this way, since the amount of charge accepted from the excessively charged toner to the electron accepting functional group B increases, it is possible to prevent excessive charging.

Specifically, the image forming apparatus includes a humidity detecting unit as an environment information acquisition unit. Moreover, when a relative humidity is lower than 30%, it is determined that the humidity is a low humidity (the environment classification L). Furthermore, it is determined that a relative humidity of between 30% and 70% is a normal humidity (the environment classification N) and a humidity of 70% or higher is a high humidity (the environment classification H).

Figure 20:
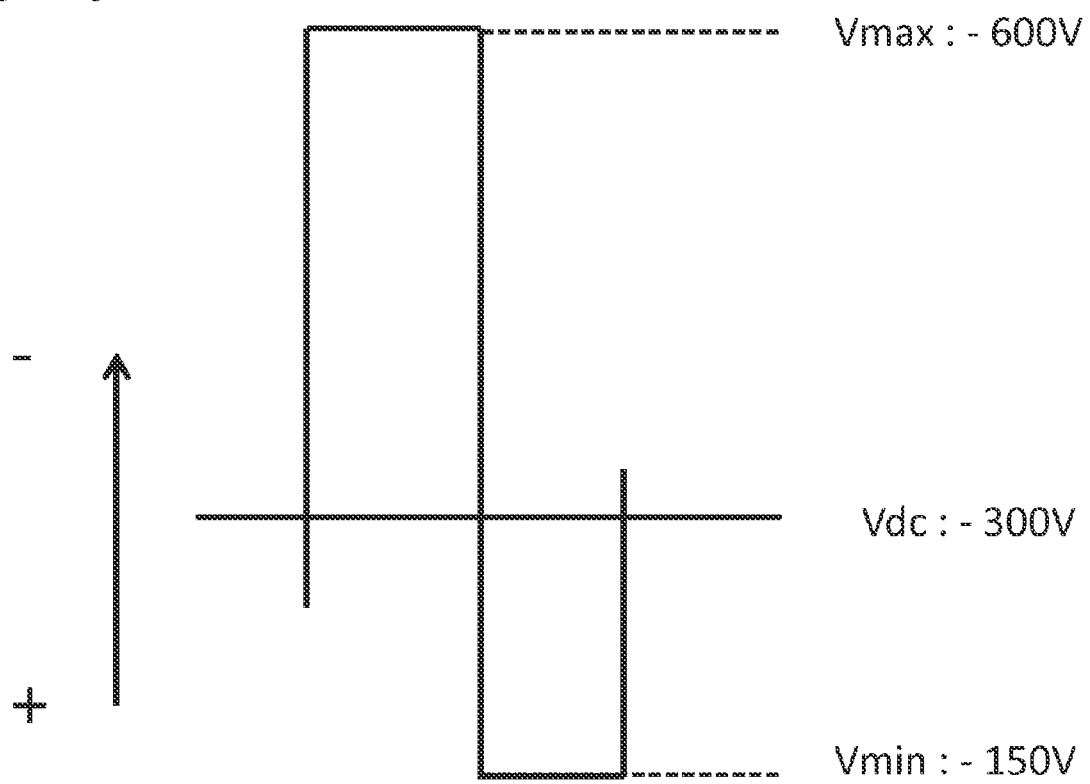
FIG. 20 is a diagram illustrating a developing blade bias according to Embodiment 7.
Figure 21:
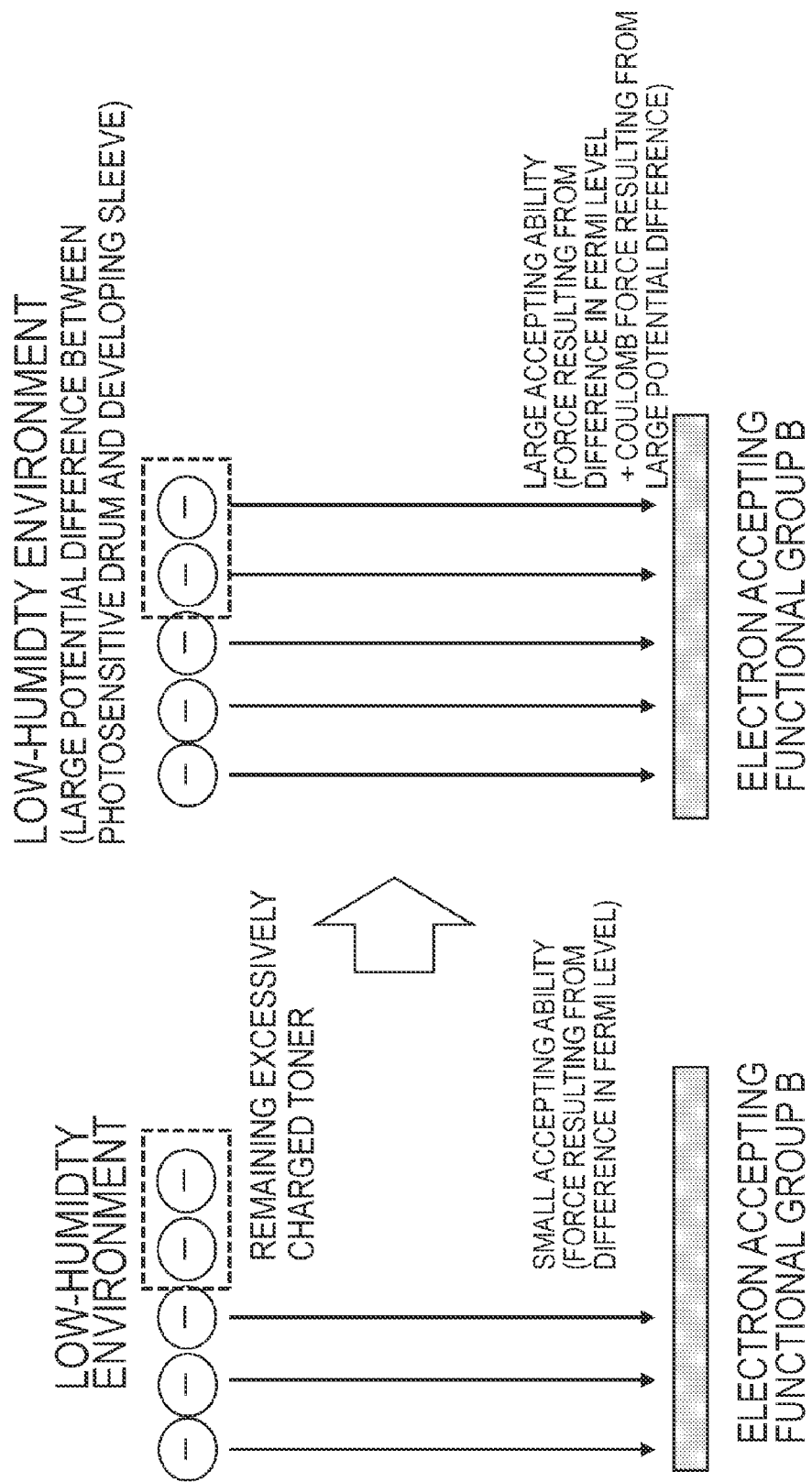
FIG. 21 is a conceptual diagram of suppression of excessive charging of toner in a low-humidity environment in a developing apparatus of Embodiment 8.

When the environment is determined to be a low-humidity environment, the control portion 40 sets the developing blade bias as illustrated in FIG. 20. That is, the developing blade bias is set to a static elimination mode bias in which the absolute value of a negative-side developing bias is increased. Specifically, Vmax was set to −600 V, and a potential difference between the developing blade bias and the developing bias Vdc was set to Δ−300 V.

Table 8 illustrates the charge amount of the toner on the developing sleeve in the present embodiment and the result of an image defect when 1000 pages were printed. Comparative Example 7-1 is a case where a static elimination mode bias is not set (that is, Vmax is set to −300 V (a potential difference from Vdc is Δ−1.50 V)).

TABLE 8

| | Ambient environment | Difference between Vdc and Vmax | Q/M after white | Q/M after black | Image defect |
|---|---|---|---|---|---|
| Embodiment 7-1 | 15% | Δ300 V | 22 μC/g | 18 μC/g | ○ (No abnormality) |
| Comparative Example 7-1 | 15% | Δ150 V | 27 μC/g | 19 μC/g | Fogging |
| Reference Example 7-1 | 55% | Δ300 V | 21 μC/g | 16 μC/g | Fogging |

As illustrated in Table 8, when the control portion 40 set the potential difference between the developing sleeve and the developing blade to 150 V in a normal-humidity environment, the Q/M after white was 21 μC/g whereas the Q/M after white increased to 27 μC/g in a low-humidity environment, and an image defect resulting from a regulation defect occurred. However, when the potential difference between the developing sleeve and the developing blade was increased to 300 V, the Q/M after white was suppressed to 22 μC/g and the Q/M after black was maintained.

As illustrated in Reference Example 7-1 of Table 8, when the control portion 40 controlled the developing blade bias application unit 33 so that the potential difference increased to 300 V similarly to a normal-humidity environment, since the charge became easy to move toward the electron accepting group B due to Coulomb force, the Q/M after black decreased and minor fogging occurred. Therefore, as in the present embodiment, it is preferable that the control portion controls the developing blade bias application unit 33 to change the developing blade bias only when the relative humidity is lower than 30%.

In the present embodiment, the control portion 40 increased the Coulomb force applied to toner by increasing the absolute value of Vmax so that charge became easy to move from the excessively charged toner to the electron accepting group B. However, there is no limitation thereto, and the control portion 40 may set the absolute values of Vmax and Vmin and the percentage of the application periods thereof appropriately simultaneously.

Another Embodiment

The configurations of the above-described embodiments may be used in combinations unless such combinations incur technical contradictions. For example, the configuration of Embodiment 4 and/or Embodiment 6 may be combined with the configuration of Embodiment 1. When the configuration of Embodiment 4 is combined with the configuration of Embodiment 1, the configuration of Embodiment 5 may be further combined. When the configuration of Embodiment 6 is combined with the configuration of Embodiment 1, the configuration of Embodiment 7 may be further combined. Moreover, in these combinations, the configuration of Embodiment 2 may be further combined.

Moreover, the configuration of Embodiment 4 and/or Embodiment 6 may be combined with the configuration of Embodiment 3. When the configuration of Embodiment 4 is combined with the configuration of Embodiment 3, the configuration of Embodiment 5 may be further combined. When the configuration of Embodiment 6 is combined with the configuration of Embodiment 3, the configuration of Embodiment 7 may be further combined. Moreover, in these combinations, the configuration of Embodiment 2 may be further combined.

Embodiment 8

Figure 23:
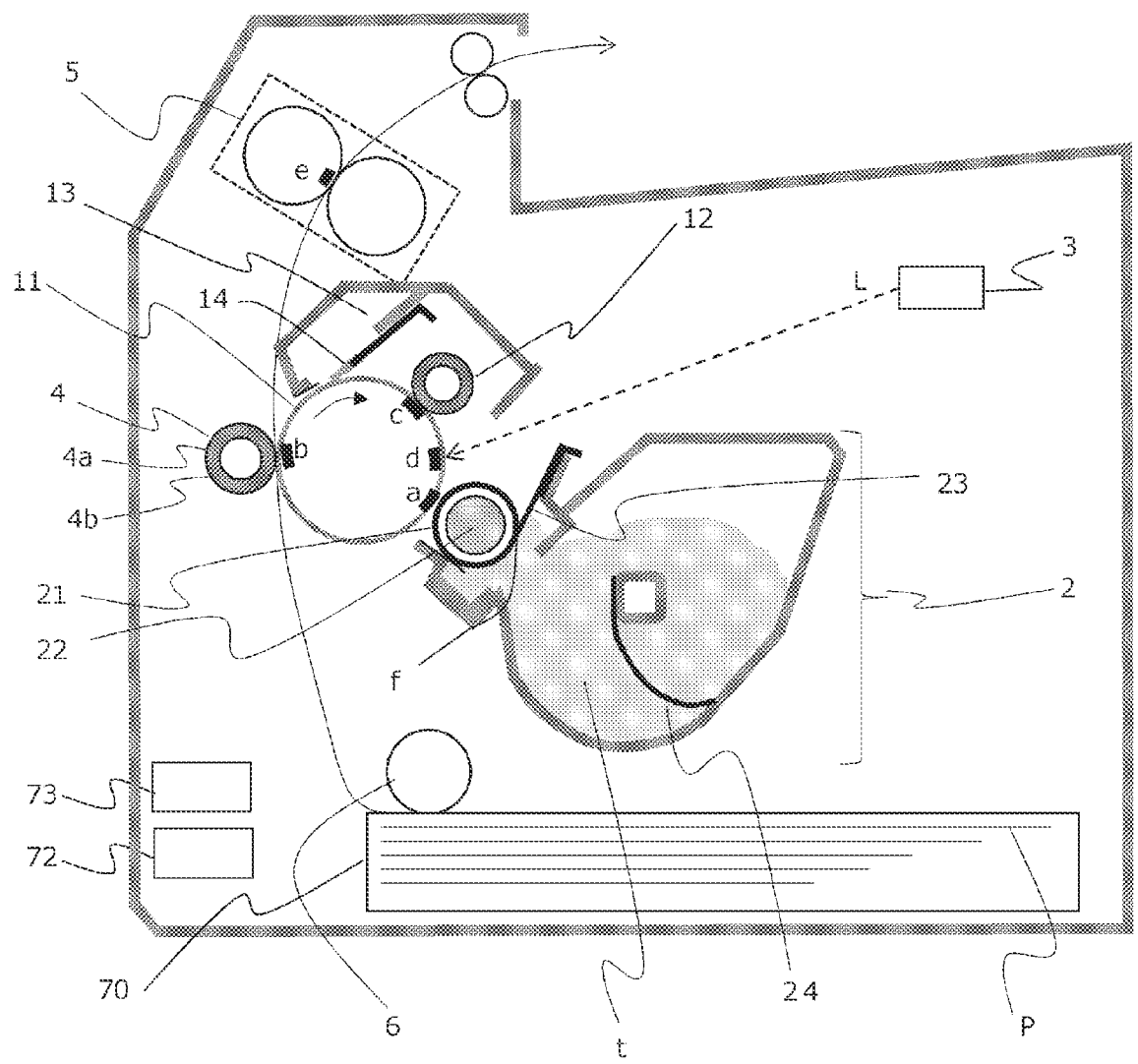
FIG. 23 is a schematic cross-sectional view of an image forming apparatus according to Embodiment 8.

FIG. 23 is a schematic cross-sectional view illustrating a schematic configuration of an electrophotographic image forming apparatus (hereinafter an image forming apparatus) according to an embodiment of the present invention. In Embodiments 8 to 15, the same constituent components as those of Embodiments 1 to 7 will be denoted by the same reference numerals, and the description thereof will be omitted. Matters that are not particularly described in Embodiments 8 to 15 are similar to those of Embodiments 1 to 7. Similarly, the matters which are described in Embodiments 8 to 15 and which are not particularly described in Embodiments 1 to 7 may be applied to Embodiments 1 to 7 unless such combinations incur technical contradictions. Moreover, an image firming apparatus according to the present embodiment employs a so-called process cartridge system and includes a charging apparatus and a developing apparatus which are independently detachably attached to a main body of the image forming apparatus as process cartridges. As a configuration of the process cartridge, the charging apparatus and the developing apparatus may be integrated with each other, and an appropriate configuration may be employed within a range where the effects of the present invention are obtained, and there is no limitation to a specific configuration.

<Image Forming Process>

When a print signal is input to a control portion 300 (FIG. 26) of an image forming apparatus body, the control portion 300 starts an image forming process operation, drives respective driving portions at predetermined timings, and starts, applying voltages. Although the details of the specific control configuration (FIG. 26) of the image forming apparatus according to the present embodiment will be described later, the operations of respective constituent components of the apparatus are controlled by the control portion 300 provided in the apparatus body in an integrated manner.

A photosensitive drum (an electrophotographic photosensitive member) 11 rotated by a motor driving portion (FIG. 26: a charging apparatus driving motor 51) by the control of the control portion 300 is uniformly charged by a charging roller 12 to which a charging bias is applied from a high-voltage power source (FIG. 26: a charging bias application portion 401) by the control of the control portion 300.

In the present embodiment, a contact DC charging system is employed, and the charging roller 12 makes contact with the photosensitive drum 11 with predetermined pressure and forms a charging nip c. The DC voltage applied to the charging roller 12 as a charging bias from the high-voltage power source by the control of the control portion 300 is set such that a potential difference between the charging roller 12 and the surface of the photosensitive drum 11 is equal to or larger than a discharge start voltage.

The photosensitive drum 11 charged uniformly is exposed with a laser beam L from a scanner unit 3 which is an exposure unit controlled by the control portion 300, and an electrostatic latent image is formed on the surface in an exposure portion d.

The scanner unit 3 includes a laser diode, a polygon mirror, and the like, outputs a laser beam L which has been intensity-modulated according to a time-series electric digital pixel signal of desired image information, and scans and exposes the uniformly charged surface of the photosensitive drum 11 with the laser beam L. The laser power of the laser beam L is adjusted so that the potential V1 is −100 V when the entire surface of the uniformly charged surface of the photosensitive drum 11 is exposed with the laser beam L.

After that, the toner (developer) t is supplied to the electrostatic latent image by the developing apparatus 2 at a portion a at which the photosensitive drum 11 and the developing sleeve 21 face each other, and the electrostatic latent image is visualized (developed) as a toner image (developer image).

On the other hand, a recording material P is separated and fed from a recording material container 70 by a recording material supply unit 6 by the control of the control portion 300 and is delivered to a portion (a transfer portion) at which the transfer roller 4 which is a transfer unit and the photosensitive drum 11 face each other in synchronization with the timing at which a toner image is formed on the photosensitive drum 11. The visualized toner image on the photosensitive drum 11 is transferred to the recording material P by a bias applied from a high-voltage power source (not illustrated) to the transfer roller 4 by the control of the control portion 300 at a timing at which the recording material P passes through the transfer portion.

A medium-resistance transfer roller 4 as a contact transfer unit is used as a transfer unit that transfers the developer image developed by the developing unit to a transfer medium. The transfer roller 4 is brought into pressure-contact with the photosensitive drum 11 with predetermined pressure to form a transfer nip b. The transfer roller 4 used in the present embodiment has a core 4a and a medium-resistance foam layer 4b formed on the core 4a and has a roller resistance of $5 \times 10^8 \Omega$. A voltage of +2.0 kV is applied to the core 4a to perform a transfer operation.

The recording material P to which the toner image has been transferred is separated from the surface of the photosensitive drum 11 and is conveyed to a fixing unit 5 by a conveying unit such as a conveying roller provided in a recording material conveying path in the image forming apparatus body controlled by the control portion 300. Here, non-fixed toner image on the recording material P is heated and pressurized at a fixing nip e in the fixing unit 5 controlled by the control portion 300 and is permanently fixed to the recording material P.

After that, the recording material P to which the toner image has been fixed is discharged outside the apparatus by a discharge roller or the like controlled by the control portion 300 as an image forming matter (a print copy).

On the other hand, a transfer-residual toner as a transfer-residual developer remaining on the photosensitive drum 11 after the toner image was transferred is removed by a cleaning member 14 and is stored in a waste toner chamber 13.

In the present embodiment, the photosensitive drum 11 as an image bearing member is a negatively charging OPC photosensitive member having an outer diameter of φ24 mm. The photosensitive drum 11 is rotationally driven at a constant circumferential speed of 150 mm/sec (a process speed PS and a printing speed) in a clockwise direction indicated by an arrow by an external charging apparatus driving motor 51 (see FIG. 26) controlled by the control portion 300.

A temperature sensor 73 as a temperature detecting portion detects the temperature of an ambient environment of the image forming apparatus. A humidity sensor 72 as a humidity detecting portion is a resistance-varying humidity sensor and detects the amount of moisture per unit volume of the ambient environment of the image forming apparatus. The detected temperature and moisture amount are used for controlling the operations of the developing apparatus and the image forming apparatus by the control portion 300.

In the image forming apparatus according to the present embodiment, in an image forming process, a pre-rotation step and a post rotation step as an operation during a non-image forming period, and an inter-sheet step during continuous printing in addition to the image forming operation are performed appropriately by the control of the control portion 300. In the pre-rotation step and the post rotation step, an operation of adjusting respective portions is performed at the start and the end of the image forming operation. In the inter-sheet step during continuous printing, a conveying interval when a plurality of recording materials P are continuously conveyed at predetermined intervals, and continuous printing performed on the plurality of recording materials P is adjusted.

<Description of Developing Apparatus>

Figure 22:
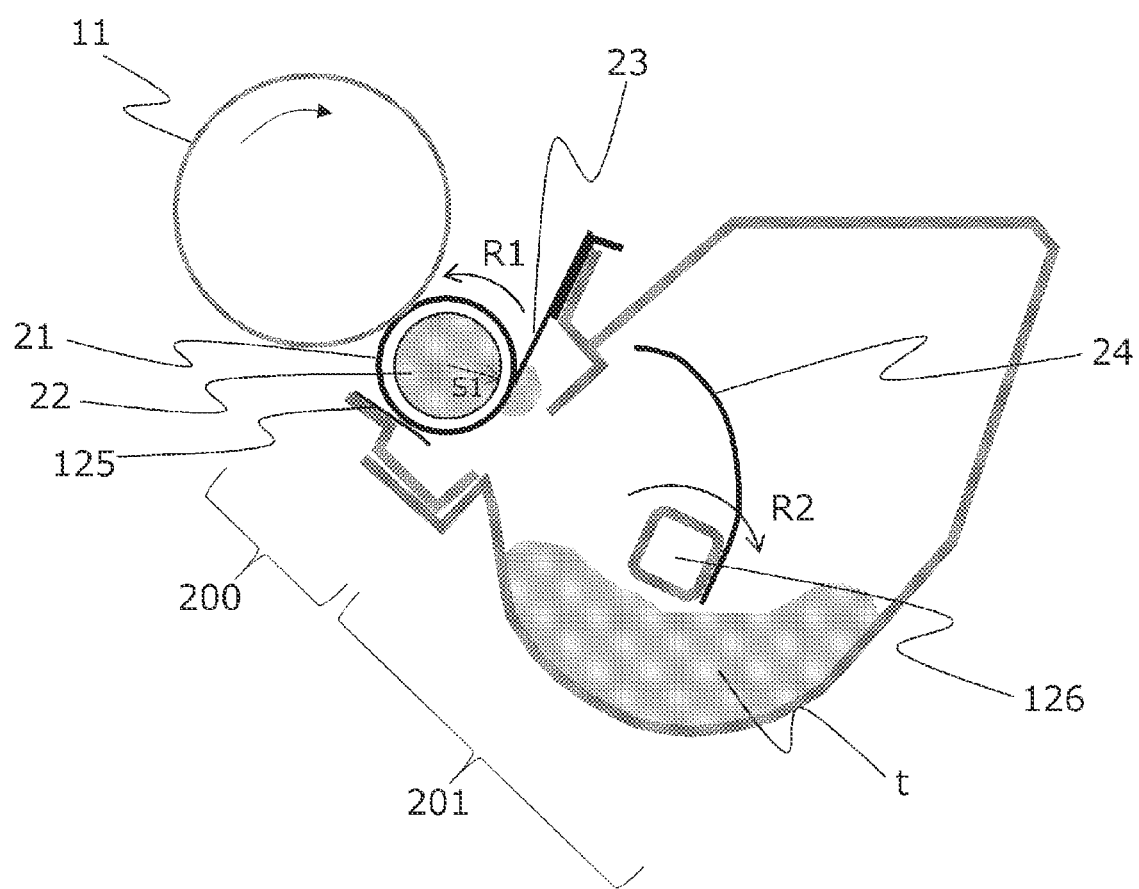
FIG. 22 is a schematic cross-sectional view of a developing apparatus of Embodiment 8.

FIG. 22 is a schematic cross-sectional view illustrating a configuration of a developing apparatus according to the present embodiment. The developing apparatus according to the present embodiment employs a so-called magnetic contact developing system in which a developing sleeve as a developer carrying member is brought into contact with the photosensitive drum 11 to develop an electrostatic latent image.

The developing apparatus 2 includes a developer container 200 and a toner container 201 that stores the toner t. The toner t is toner of which the normal charging polarity is negative, as a magnetic single-component developer. The inside of the toner container 201 is connected to the inside of a developing chamber of the developer container 200 via an opening.

A developing sleeve 21 and a developing blade 23 are provided in the developer container 200. A stirring sheet 24 is provided in the toner container 201.

The developing sleeve 21 is configured such that an elastic layer having a thickness of approximately 500 μm is formed on the periphery of a nonmagnetic sleeve as a base. A surface layer having a thickness of approximately 10 μm is formed on the surface of the elastic layer and performs a role of charging toner by making contact with the toner. The developing sleeve 21 will be described in detail in the section <Developing sleeve> below. The developing sleeve 21 is supported by the developer container 200 so as to be rotatable in a direction indicated by arrow R1 by a developing apparatus driving motor 52 (FIG. 26) controlled by the control portion 300 and has an outer diameter of approximately 11 mm. The developing sleeve 21 rotates at a circumferential speed of 100% with respect to the photosensitive drum 11 (that is, at a rotating speed such that the surfaces of both move in the same direction at the contact portion between the photosensitive drum 11 and the developing sleeve 21 and the moving speeds of the circumferential surfaces of both are the same).

Here, the image forming process of the developing apparatus according to the present embodiment will be described.

The developing apparatus 2 is pressed toward the photosensitive drum 11 so that the developing sleeve 21 makes contact with the photosensitive drum 11.

Figure 26:
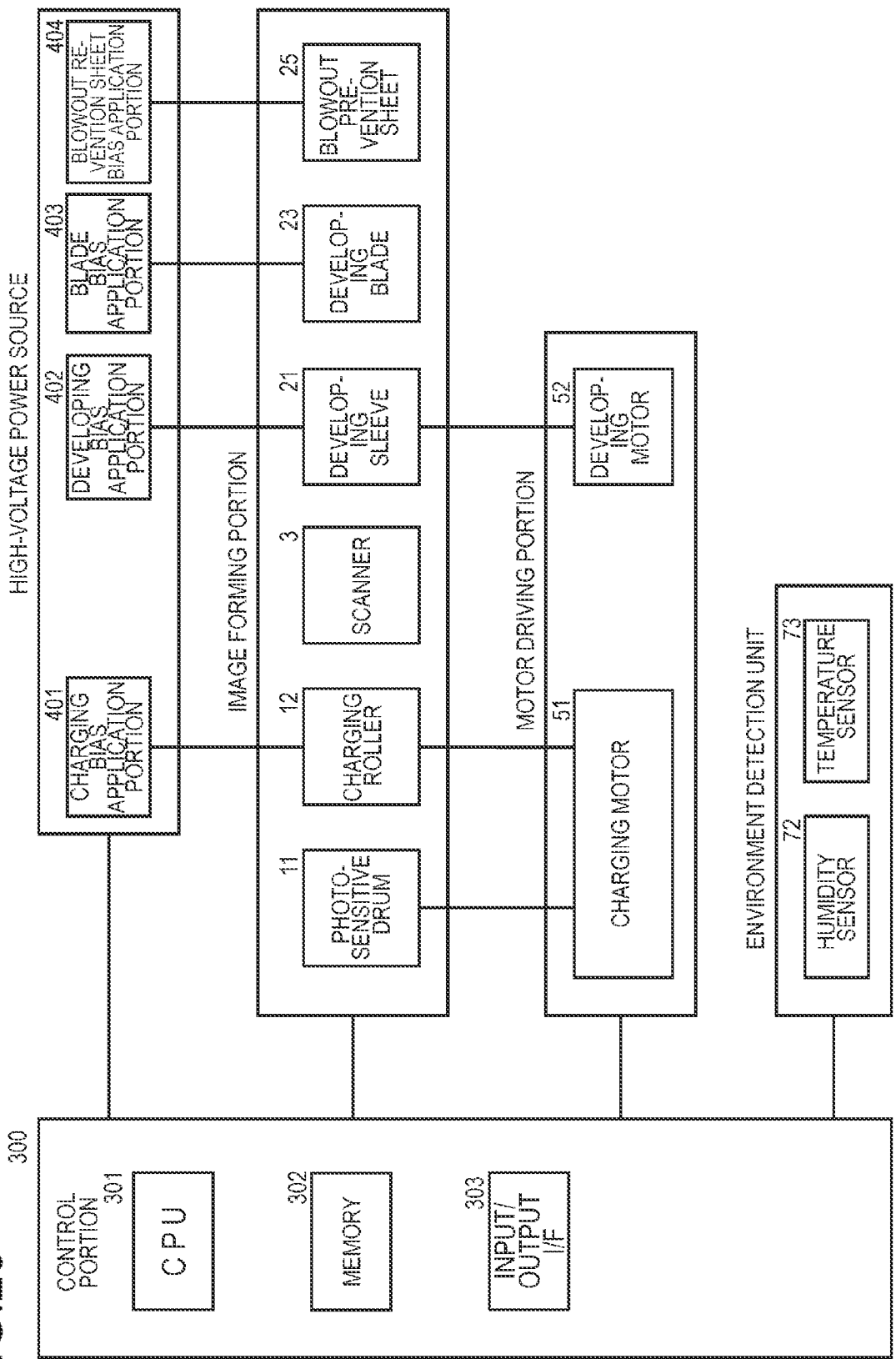
FIG. 26 is a control block diagram of an image forming apparatus of an embodiment.

A charging bias application portion 401 and a developing bias application portion 402 as a power source capable of applying a DC bias are connected to the charging roller 12 and the developing sleeve 21, respectively (see FIG. 26). The photosensitive drum 11 is charged uniformly by the charging roller 12 to which the DC bias is applied from the charging bias application portion 401 by the control of the control portion 300.

A print portion of the uniformly charged photosensitive drum 11 is exposed with the laser beam L from the scanner unit 3 which is an exposure unit as means for forming an electrostatic latent image on a charged image bearing member, and an electrostatic latent image is formed on the surface.

A print portion of the surface of the photosensitive drum 11 after the laser exposure process is set to a potential closer to the plus side than the surface potential of the developing sleeve 21, and a non-print portion is set to a minus-side potential. In a developing region where the photosensitive drum 11 and the developing sleeve 21 make contact with each other, a Coulomb force acts on the toner having a negative polarity in a direction in which the toner moves toward a print portion on the surface of the photosensitive drum 11, whereas a Coulomb force acts on the toner in the non-print portion so that the toner remains on the surface of the developing sleeve 21. As a result, the toner having a negative polarity is supplied to only a print portion on the surface of the photosensitive drum 11, and a print image is visualized as a toner image.

In the present embodiment, the surface potential of the photosensitive drum 11 uniformly charged by the charging roller 12 is −500 V, the bias applied to the developing sleeve 21 is −300 V, and the surface potential of the photosensitive drum 11 after being exposed with the laser beam L is −100 V.

The developing blade (regulating blade) 23 which is a toner layer thickness regulating member has one end attached to the developer container 200 and the other end (free end) making sliding contact (rubbing contact) with the peripheral surface of the developing sleeve 21 disposed in the opening of the developer container 200. A direction in which the developing blade 23 extends from one end to the other end is a reverse direction (counter direction) to the rotation direction of the developing sleeve 21. The developing blade 23 regulates the toner amount on the developing sleeve 21 to an appropriate amount by regulating the toner on the developing sleeve 21 with appropriate pressure.

The developing blade 23 is a blade member in which a urethane rubber is attached to a metal portion which is a support member. The contact pressure is approximately 20 gf/cm (a computer load in the longitudinal direction of the developing sleeve 21). In the present embodiment, although a urethane rubber is used, a material having elastic properties may be used, and a metal plate such as SUS and a member coated with a resin may be used.

The magnet roller 22 is fixedly arranged inside the developing sleeve 21, and the magnet roller 22 has a magnetic pole in the direction S1. The S1 pole adsorbs the toner in the developer container 200 and the toner container 201 toward the developing sleeve 21.

An end sealing member (not illustrated) is disposed at both ends of the developing sleeve 21. The end sealing member and the surface of the developing sleeve 21 make close-contact with each other to secure sealing of the toner so that the toner does not leak outside the developer container 200.

A blowoff prevention sheet 125 which is a developer sealing member is a sheet-like elastic member formed of a material such as polyethylene terephthalate. The blowoff prevention sheet 125 has one end attached to the developer container 200 and the other end (free end) making sliding contact with the peripheral surface of the developing sleeve 21 disposed in an opening of the developer container 200 to prevent toner from leaking outside the developer container 200. A direction in which the blowoff prevention sheet 125 extends from one end to the other end is a forward direction with respect to the rotation direction of the developing sleeve 21.

The stirring sheet 24 has flexibility and is fixed to a stirring shaft 126. The stirring shaft 126 is rotated by a developing apparatus driving motor 52 controlled by the control portion 300. The stirring sheet 24 rotates inside the toner container 201 when the stirring shaft 126 rotates.

The stirring sheet 24 rotating inside the toner container 201 makes contact with the inner wall of the toner container 201 with a predetermined entrance amount and looses the toner t in the container. Furthermore, the stirring sheet 24 conveys the toner t while rotating and rubbing the inner wall of the toner container 201.

Moreover, the stirring sheet 24 having conveyed the toner t brings the toner t attracted by the magnetic force of the magnet roller 22 toward the surface of the developing sleeve 21 back to the toner container 201 to facilitate circulation of the toner t between the toner container 301 and the developing chamber of the developer container 200.

The developing apparatus 2 as a developing unit having a developing member supplies a developer to an electrostatic latent image formed on the photosensitive drum 11. In the present embodiment, a negative-polarity polymerized magnetic toner similar to that used in Embodiments 1 to 7 is used as a developer.

A magnetic toner can be developed by the developing sleeve 21 as an image carrying member to which a developing bias (Vdc) of −300 V is applied from a developing bias power source as a voltage application unit that applies a voltage to a developing member. In the present embodiment, since a contact developing system is employed, the developing sleeve 21 is in contact with the photosensitive drum 11.

<Developing Sleeve>

The configurations of the developing sleeve 21 as a developer carrying member and the magnet roller 22 as a magnetic force generation member (a magnetic field generation unit) are the same as the configurations which are shown in FIG. 2.

The developing sleeve 21 includes a hollow aluminum element tube (the base 21c) having an outer diameter of 11 mm and an inner diameter of 9 mm and a conductive elastic rubber layer (the elastic layer 21b) having a thickness of 500 µm formed around the tube as illustrated in FIG. 2, and a structure having a surface roughness Ra of 1.0 µm to 4.0 µm is provided on the surface (the surface layer 21a) of the conductive elastic rubber layer so as to convey a developer. A magnetic single-component black developer T (having negatively charging properties) as a developer in the developing apparatus is stirred by the stirring sheet 24 inside the developing apparatus and is conveyed up to the vicinity of the developing sleeve 21. The conveyed developer T is supplied to the surface of the developing sleeve by the magnetic force of the magnet roller 22 fixedly arranged inside the developing sleeve 21. The developer supplied to the surface of the developing sleeve forms a uniform thin layer by passing through the regulation nip f of the developing blade 23, and the developer rotates and makes triboelectric charging with the developing sleeve 21 whereby the developer is charged to a negative polarity. After that, the developer is conveyed up to a developing position at which the developer makes contact with the photosensitive drum 11, and an electrostatic latent image is developed.

<Base>

The base 21c functions as an electrode of the developing sleeve 21 and a support member. The base 21c is formed of a conductive material such as metal, an alloy, or a conductive synthetic resin.

<Elastic Layer>

The elastic layer 21b forms a nip having a predetermined width at a contact portion between the developing sleeve 21 and the photosensitive drum 11.

<Surface Layer>

The surface layer 21a is formed of a material capable of suppressing excessively charged toner while charging uncharged toner quickly and increasing the amount of appropriately charged toner. In the present embodiment, the surface layer 21a is formed of a urethane resin composed of two molecular structures: (A) a functional group having electron donating properties (hereinafter, an electron donating functional group A) and (B) a functional group having electron accepting properties (hereinafter, an electron accepting functional group B).

<Electron Donating Functional Group A>

The electron donating functional group A functioning as a charge donating portion that mainly donates charge to the toner t in the surface layer 21a of the developing sleeve 21 contains a tertiary amine group (a tertiary amine structure) having an unshared electron pair. Since an unshared electron pair is rich in electrons, it acts as an electron donating group A. As a result, it is possible to provide sufficient charge to uncharged toner and positive-polarity toner.

<Electron Accepting Functional Group B>

The electron accepting functional group B functioning as a charge accepting portion that accepts charge from the toner in the surface layer 21a of the developing sleeve 21 has a carbonate bond in which one atmosphere bonds with three oxygen atoms. Since an oxygen atom has a larger electronegativity than a carbon atom, an electron density in the carbon atom is low, the carbonate bond can easily accept electrons, and it is possible to accept the charge of the excessively charged toner.

Figure 24:
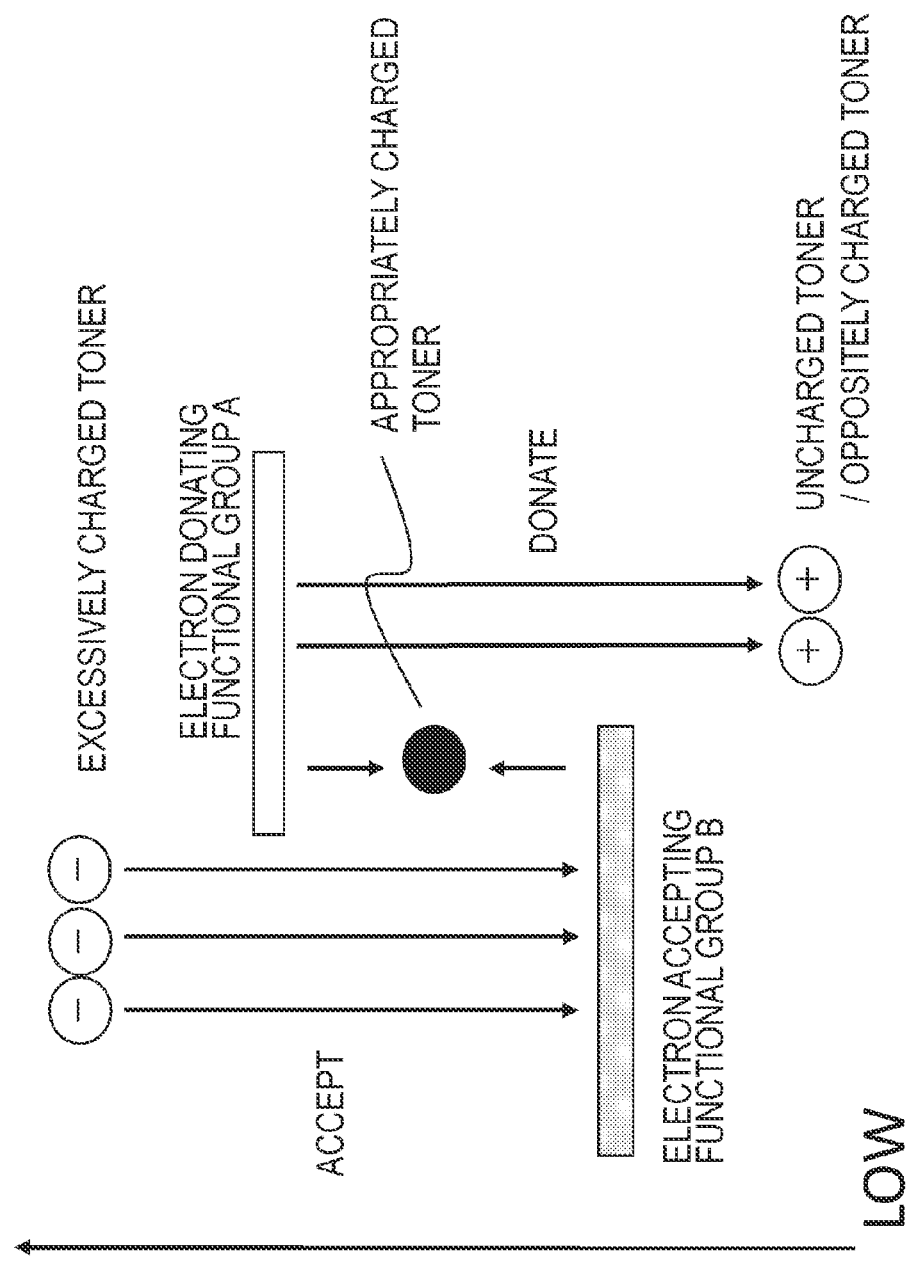
FIG. 24 is a conceptual diagram of toner charging characteristics of a developing sleeve of a developing apparatus of Embodiment 8.

FIG. 24 is a schematic diagram illustrating the Fermi levels of the electron donating functional group A, the electron accepting functional group B, uncharged or opposite-polarity toner, excessively charged toner, and appropriately charged toner. The function of the surface layer 21a will be described using the concept of a Fermi level. Here, the electron donating functional group A corresponds to an electron donating portion that mainly donates electrons to toner when toner and the surface layer 21a make frictional contact with each other to exchange charge. Contacting target toner of the frictional contact includes excessively charged toner, appropriately charged toner, uncharged toner, and oppositely charged toner. Moreover, the expression "mainly" means that an electron donating function of donating electrons to the electron (charge) exchange target toner works stronger than an electron accepting function. Moreover, the electron accepting functional group B corresponds to an electron accepting portion that mainly accepts charge when toner and the surface layer 21a make frictional contact with each other to exchange charge. Similarly to the above, the contacting target toner includes excessively charged toner, appropriately charged toner, uncharged toner, and oppositely charged toner. Moreover, the expression "mainly" means that an electron accepting function of accepting electrons from the electron (charge) exchange target toner works stronger than an electron donating function.

A vertical axis represents the energy level of electrons and indicates that electrons have higher energy as it goes upward. When substances having two different energy levels make frictional contact, electrons move from a substance having a higher energy level to a substance having a lower energy level and the substances are charged to positive and negative polarities, respectively. The developer bearing member (the developing sleeve 21) has the base 21c connected to a power source and a constant bias is applied thereto. Therefore, since the same amount of electrons as the electrons donated or accepted in association with frictional contact are donated or accepted from a power source, the Fermi level is maintained at a certain height. On the other hand, since electrons of toner having moved in association with frictional contact are immovable, the charging state thereof is maintained. Therefore, the Fermi level of the charged toner increases when it has accepted electrons and the Fermi level thereof decreases when it has donated electrons.

In the present embodiment, a negatively charging toner is used as toner, and uncharged toner in FIG. 24 has a lower Fermi level than the other toners and is likely to accept electrons from the other member. The uncharged toner is charged to a negative polarity by making frictional contact with the electron donating functional group A or the electron accepting functional group B that forms the surface layer 21a of the developing sleeve 21 and the Fermi level thereof increases according to the charge amount thereof. The larger difference in Fermi levels during frictional contact, the faster exchange of electrons is performed. Since the electron donating functional group A contains a tertiary amine group and the difference in the Fermi level between the electron donating functional group and the uncharged toner is large, it is possible to quickly provide a charge amount necessary for image forming.

Similarly, the excessively charged toner has a higher Fermi level than the other toner and donates electrons to the other member. Since the electron accepting functional group B has a carbonate bond, the difference in the Fermi level between the electron accepting functional group and the excessively charged toner is large, and it is possible to accept electrons quickly from toner having an excessive charge amount. When the toner repeats the frictional contact with the electron donating functional group A and the electron accepting functional group B, the Fermi level of the toner settles down to a region between the Fermi levels of the electron donating functional group A and the electron accepting functional group B. As a result, it is possible to suppress excessively charged toner while charging uncharged toner quickly and to develop a high-quality image by increasing the amount of appropriately charged toner.

In this present embodiment, a region created by the partial bond A and the carbonate bond is appropriate for image forming. However, the electron donating functional group A and the electron accepting functional group B are not limited to this combination, and toner, the electron donating functional group A, and the electron accepting functional group B may form a similar Fermi level relation. For example, when a positive-polarity toner is used, it can be easily understood that the electron donating functional group A and the electron accepting functional group B are different materials.

<Production of Developer Carrying Member>

(Production of Elastic Roller)

A primer (trade name, DY35-051; produced by Dow Corning Toray Co., Ltd.) was applied to an aluminum cylindrical tube grinded to an outer diameter of 10 mm and an arithmetic mean roughness Ra of 0.2 μm and was baked to obtain a base 21c. The base 21c was arranged in a mold, and an addition type silicone rubber composition in which the following materials were mixed was injected to a cavity formed in the mold.

Liquid silicone rubber material (trade name, SE6724A/B; produced by Dow Corning Toray Co., Ltd.): 100 parts by mass, Carbon black (trade name, Tokablack #4300; produced by Tokai Carbon Co., Ltd.): 15 parts by mass, Silica powder as heat resistance-imparting agent: 0.2 parts by mass, and Platinum catalyst: 0.1 parts by mass.

Subsequently, the mold was heated to vulcanize and cure the silicone rubber at a temperature of 150° C. for 15 minutes. The base 21c having the cured silicone rubber layer formed on the periphery surface thereof was released from the mold, and then, the base 21c was further heated at a temperature of 180° C. for 1 hour to complete a curing reaction of the silicone rubber layer. In this way, an elastic roller was produced in which the elastic layer 21b of the silicone rubber having a diameter of 11.4 mm and a thickness of 0.7 mm was formed on the outer periphery of the base 21c.

(Production of Surface Layer)

In the present embodiment, the surface layer of the developing sleeve 21 contains a urethane resin, the urethane resin has a carbonate bond in molecules thereof and a partial structure derived from a reaction of a compound represented by Structural Formula (1) mentioned above and a polyisocyanate:

Next, a production example for obtaining a surface layer of the present embodiment will be described.

(Synthesis of Isocyanate-Terminated Prepolymer)

Hereinafter, a synthesis example of an isocyanate-terminated prepolymer which is one of raw materials for synthesizing a urethane resin of the surface layer 21a will be described.

Polytetramethylene glycol-based polyol (trade name: PTG-850, produced by Hodogaya Chemical Co., Ltd.) (100.0 parts by mass) was gradually dropped to 30.8 parts by mass of isocyanate (pure-MDI, trade name: Millionate MT, produced by Tosoh Corporation) was dissolved in methyl ethyl ketone (hereinafter MEK) in a reaction vessel under a nitrogen atmosphere so that a final solid content was 50%. After that, 100.0 parts by mass of Nippollan 982 (produced by Tosoh Corporation) were gradually dropped while maintaining the temperature in the reaction vessel at 65° C.

After completion of the dropping, the resultant was reacted at a temperature of 65° C. for 2 hours. The obtained reaction mixture was cooled to a room temperature to obtain an isocyanate-terminated prepolymer (a polyisocyanate) having a solid content of 50% and an isocyanate group content of 4.7% by weight.

(Synthesis of Amino Compound)

10.0 g (0.11 mol) of 1,4-diaminobutane as an amino compound serving as a raw material and 200 ml of pure water as a reaction solution were heated to 40° C. while being stirred in a reaction vessel to which a stirring apparatus, a thermometer, a dropping apparatus, and a temperature regulating apparatus were attached. Subsequently, 38.3 g (0.66 mol) of propylene oxide as an additive raw material was gradually dropped over 30 minutes while maintaining the reaction temperature at 40° C. or lower. The resultant was further stirred for 2 hours and reacted to obtain a reaction mixture. The obtained reaction mixture was heated under reduced pressure to distill water to obtain an amino compound (Tetrakis(2-hydroxypropyl)butylenediamine).

(Production of Surface Layer)

The following materials were stirred and mixed as the materials of the surface layer 21a.

Isocyanate-terminated prepolymer: 84.8 parts by mass,

Amino compound (Tetrakis(2-hydroxypropyl)butylenediamine): 15.2 parts by mass,

Carbon black (trade name, MA-230; produced by Mitsubishi Chemical Co., Ltd.): 10.0 parts by mass, and Urethane resin fine particles (trade name: Art Pearl C-400; produced by Negami Chemical Industrial Co., Ltd.): 30.0 parts by mass.

Subsequently, MEK was added so that the total solid content ratio was 30% by mass, and then mixed by a sand mill. Furthermore, the viscosity of the resultant was adjusted to 10 to 13 cps by MEK to prepare a surface layer forming coating material.

The elastic roller produced in advance was dipped in the surface layer forming coating material to form a coating film of the coating material on the surface of the elastic layer 21b of the elastic roller and the elastic roller was dried. Furthermore, the resultant was subjected to a heat treatment at a temperature of 160° C. for 1 hour to produce the surface layer 21a having a film thickness of approximately 15 μm on the outer periphery of the elastic layer 21b and to produce the developer bearing member according to Embodiment 8.

<Block Diagram>

A control configuration of the image forming apparatus according to the embodiment of the present invention will be described with reference to FIG. 26. FIG. 26 is a control block diagram of the image forming apparatus.

The control portion 300 includes a CPU (central processing unit) 301 which is a central element that performs an arithmetic process, a memory 302 such as a ROM or a RAM which is a storage unit, and an input/output I/F 303 that inputs and outputs information from and to a peripheral device. Sensor detection results, computations results, and the like are stored in the RAM, and a control program, a data table obtained in advance, and the like are stored in the ROM. The control portion 300 is a controller for controlling the operation of the image forming apparatus in an integrated manner, and respective control targets of the image forming apparatus are connected thereto via the input/output I/F 303. The control portion 300 controls exchange of various electrical information signals, driving timings, and the like and performs the processes of the flowcharts to be described later.

A motor driving portion indicates various motors including a motor 51 for driving a charging apparatus and a motor 52 for driving a developing apparatus and is a driving source for rotating the photosensitive drum 11, the developing sleeve 21, and the like and operates on the basis of a control signal from the control portion 300. A high-voltage power source is a power source that applies a high voltage to the photosensitive drum 11, the charging roller 12, the developing sleeve 21, the transfer roller 4, the fixing apparatus 5, and the like. Moreover, the control portion 300 is connected to an environment sensor such as a humidity sensor 72 and a temperature sensor 73 as an environment detection unit that detects environment information in which the image forming apparatus is used.

<Suppression of Excessively Charged Toner in Low-Humidity Environment>

However, even when the developing sleeve 21 is used, in a low-humidity environment or the like where the relative humidity around the image forming apparatus is low, the excessively charged toner may be strongly fixed to the developing sleeve 21 by the image force, and the fixing force may exceed the regulation force of the developing blade 23. Due to this, a problem such as a regulation defect in which the disorder of the toner layer on the developing sleeve 21 occurs may occur.

Figure 25:
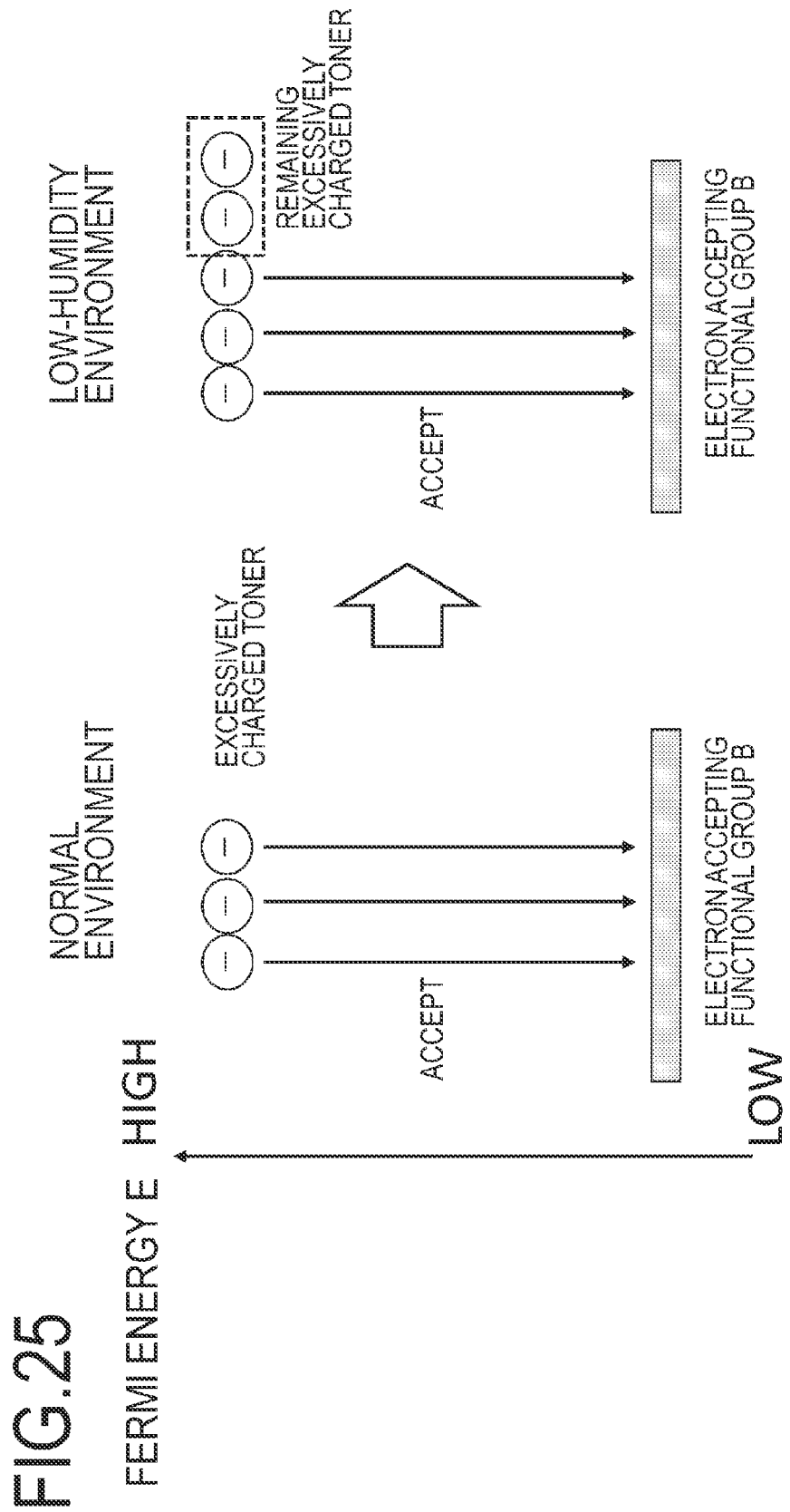
FIG. 25 is a conceptual diagram of change in charging properties of toner on a developing sleeve of a developing apparatus of Embodiment 8.

The reason therefor is that although the amount of excessively charged toner increases in a low-humidity environment, the Fermi level of the electron accepting functional group B does not change. In a normal case, a portion of the charge held by toner leaks through moisture which is a polar molecule included in the air. However, since the amount of moisture in the air is small in a low-humidity environment, the leaking charge amount is small. As a result, as illustrated in FIG. 25, the amount of excessively charged toner increases in a low-humidity environment. Since the Fermi level of the electron accepting functional group B does not change in a low-humidity environment, acceptance of the charge of excessively charged toner due to a difference in Fermi level is not sufficient, which results in the problem such as a regulation defect. Therefore, the present embodiment solved the above-mentioned problem by increasing the Coulomb force of charge of the toner with respect to the electron accepting functional group B to thereby increase the amount of charge accepted from the excessively charged toner to the electron accepting functional group B. Hereinafter, the mechanism thereof will be described in detail.

In a contact developing system employed in the image forming apparatus of the present embodiment, the toner on the surface of the developing sleeve 21 passes through a contact portion between the developing sleeve 21 and the photosensitive drum 11 while making contact with the photosensitive drum 11. The toner in a non-print portion that is not used for developing is regulated again by the developing blade 23 and reaches the contact portion between the developing sleeve 21 and the photosensitive drum 11. Excessively charged toner is generated when this process is repeated.

In a non-print portion, a potential difference of 200 V in absolute value is applied between the photosensitive drum 11 and the developing sleeve 21. Since the surface potential of the photosensitive drum 11 is −500 V and the bias applied to the developing sleeve 21 is −300 V, a Coulomb force directed to the developing sleeve 21 acts on the charge of the negative-polarity toner.

Here, in the present embodiment, the humidity sensor 72 and the temperature sensor 73 as an environment detection unit disposed in the image forming apparatus detect the relative humidity of the ambient environment of the image forming apparatus. When it was determined that the ambient environment was a low-humidity environment as a predetermined environment state on the basis of the detection result, the control portion 300 changed the absolute value of the potential difference at the contact portion between the photosensitive drum 11 and the developing sleeve 21 to a value larger than 200 V during an image forming period and rotation was performed for 2 seconds in a post rotation step of the image forming operation process.

In the present embodiment, the control portion 300 detects the amount of moisture per volume around the image forming apparatus using the humidity sensor 72 and calculates a relative humidity from the relation with the amount of saturated moisture at the temperature measured by the temperature sensor 73. The control portion 300 determines that the ambient environment is a low-humidity environment when the relative humidity is lower than 30%. Although the relative humidity serving as a predetermined threshold for the control portion 300 to determining that the ambient environment is a low-humidity environment is 30% in the present embodiment, there is no limitation thereto.

In a low-humidity environment, the surface potential of the photosensitive drum 11 in a post rotation step was set to −600 V so that the absolute value of the potential difference between the surface of the photosensitive drum 11 and the developing sleeve was changed to 300 V. By doing so, a larger Coulomb force is applied to the charge of the excessively charged toner, and the amount of the charge accepted by the electron accepting functional group B increases. As a result, it is possible to suppress the amount of the excessively charged toner illustrated in FIG. 25.

That is, by increasing the potential difference at the contact portion between the photosensitive drum 11 and the developing sleeve 21 in the low-humidity environment only, it is possible to suppress generation of excessively charged toner in a low-humidity environment without changing the charge amount of the toner in a normal-humidity environment.

Table 9 below illustrates the results of actual examination of the present embodiment.

In the image forming apparatus illustrated in FIG. 23, a distribution of a charge amount of toner on the developing sleeve 21 was measured after an operation of performing a print job of two sheets once every 20 seconds was performed on 100 sheets. In the measurement, E-SPART analyzer (EST-G; produced by Hosokawa M Corporation) was used. The E-SPART analyzer is a measuring apparatus that detects a particle motion in an air vibration field in an electric field using a laser Doppler method to obtain data and measures the charge amounts of individual particles and particle sizes from the data. By computing the mass of toner from the particle size and the density of toner, it is possible to calculate the charge amount of toner per unit mass. The used toner is a single-component magnetic toner having an average grain size of 8 µm, and the density is 1.5 g/cm³. The examination environment is a temperature of 15° C. and a relative humidity of 10%. The toner used in this examination is negatively charged toner and the charge amount indicates a negative-polarity charge amount unless particularly stated otherwise. Moreover, toner having a charge amount of 15 µC/g or more is defined as excessively charged toner which may cause an image defect, toner having a charging nip of at least 2 µC/g and not more than 15 µC/g is defined as appropriately charged toner, and toner having a charge amount smaller than 2 µC/g is defined as uncharged toner which may have an adverse effect on developing properties.

From Table 9, it was confirmed that, when the potential difference between the photosensitive drum and the developing sleeve in a normal humidity state was set to 200 V, excessively charged toner was present in 5% in a normal humidity environment (a relative humidity of 30% or higher).

However, in a low-humidity environment, excessively charged toner having a charge amount of 15 µC/g was increased to 15%, and an image defect such as a regulation defect occurred sometimes. However, when the potential difference was set to 300 V, the amount of excessively charged toner decreased, and the amount of appropriately charged toner having a charge amount of between 2 and 15 µC/g increased.

TABLE 9

Relation between toner charge amount and potential difference between photosensitive drum and developing sleeve in Embodiment 8

| Examination result | Ambient environment | Potential difference between photosensitive drum and developing sleeve | Excessively charged toner (15 μC/g or more) | Appropriately charged toner (2 μC/g or more and smaller than 15 μC/g) | Uncharged toner (smaller than 2 μC/g) |
|---|---|---|---|---|---|
| a | 23° C. 50% | Δ200 V | 5% | 90% | 5% |
| b | 15° C. 10% | Δ200 V | 15% | 80% | 5% |
| c | 15° C. 10% | Δ300 V | 10% | 85% | 5% |

Table 10 illustrates verification results in which a configuration using the conventional developing sleeve proposed in PTL 1 is Comparative Example 8. In Comparative Example 8, the surface layer of the developing sleeve contains an electron donating functional group only in order to enhance an ability to donate triboelectric charge to toner. Although the developing sleeve of Comparative Example 8 can quickly charge toner in a normal environment, since the developing sleeve does not contain an electron accepting functional group B, the percentage of excessively charged toner in a low-humidity environment was increased as compared to Embodiment 8. Moreover, since the surface layer does not contain the electron accepting functional group, the amount of excessively charged toner did not decrease even when the potential difference between the photosensitive drum and the developing sleeve was increased.

TABLE 10

Developing sleeve of Comparative Example 8

| Examination result | Ambient environment | Potential difference between photosensitive drum and developing sleeve | Excessively charged toner (15 μC/g or more) | Appropriately charged toner (2 μC/g or more and smaller than 15 μC/g) | Uncharged toner (smaller than 2 μC/g) |
|---|---|---|---|---|---|
| d | 23° C. 50% | Δ200 V | 5% | 90% | 5% |
| e | 15° C. 10% | Δ200 V | 20% | 75% | 5% |
| f | 15° C. 10% | Δ300 V | 20% | 75% | 5% |

Table 11 illustrates evaluation results when the configuration of the present embodiment was used. The results are obtained after an operation of performing a print job of two sheets once every 20 seconds was performed on 300 sheets in a low-temperature and low-humidity environment of 15° C. and 10% as an ambient environment. In this evaluation, in a post rotation step after image forming, the absolute value of the potential difference between the photosensitive drum and the developing sleeve was increased to 300 V, and a post rotation operation was performed for 2 seconds. Moreover, as Comparative Example 8, the absolute value of the potential difference between the photosensitive drum and the developing sleeve was increased to 300 V during post rotation after image forming using the developing sleeve disclosed in PTL 1. Furthermore, as Comparative Example 9, a durability test was performed in a state in which the absolute value of the potential difference between the photosensitive drum and the developing sleeve during post rotation was maintained to 200 V in the configuration of Embodiment 8.

"○" indicates no abnormality, "Δ" indicates a minor regulation defect in which a density abnormality such as a halftone density occurs, and "X" indicates a regulation defect in which toner is printed on a white background.

TABLE 11

Evaluation results

|  | Evaluation |
|---|---|
| Embodiment 8 | ○ |
| Comparative Example 8 | X |
| Comparative Example 9 | Δ |

In the configuration of the present embodiment, in a low-temperature environment, by increasing the potential difference between the photosensitive drum and the developing sleeve, the developing sleeve 21 of the present configuration could perform its sufficient function and a stable image quality was obtained.

In the present embodiment, although an operation of increasing the potential difference is performed in a post rotation step which is performed every two sheets, there is no limitation thereto. For example, the potential difference may be changed in another non-image informing period such as a pre-rotation step or an inter-sheet step, the potential difference may be increased during an image forming operation within a range where it has no influence on image forming, and a plurality of steps may be performed in combination. Moreover, the number of sheets is not limited thereto, and the percentage of excessively charged toner can be suppressed by performing the operation every predetermined number of sheets.

In Embodiment 8, a relative humidity calculated from the temperature and the amount of moisture in a unit volume is used as a reference for the control portion 300 to determine whether the ambient environment is a low-humidity environment. However, it may be determined whether the ambient environment is a low-humidity environment using environment information indicating the amount of moisture around the apparatus such as the amount of moisture in a unit volume, a moisture partial pressure, and an absolute humidity other than the relative humidity as an index as long as it has a relation with increase in the amount of excessively charged toner.

In Embodiment 8, the surface potential of the photosensitive drum 11 was changed to change the potential difference between the photosensitive drum 11 and the developing sleeve 21. That is, the control portion 300 changed the magnitude of the charging bias to change the surface potential of the photosensitive drum 11. A method of changing the potential difference between the photosensitive drum 11 and the developing sleeve 21 is not limited to this, and the potential of the developing sleeve 21, for example, may be changed. That is, the control portion 300 may change the potential difference by controlling the magnitude of the developing bias. Alternatively, the control portion 300 may change the potential difference by controlling the magnitudes of both the charging bias and the developing bias. Furthermore, a method of changing the surface potential of the photosensitive drum 11 by performing exposure may be combined.

In Embodiment 8, although a single-component magnetic toner is used as the toner, a non-magnetic toner may be used if toner can be supplied by force other than a magnetic force by adding a supply member or changing the arrangement of the developing apparatus.

Embodiment 9

A characteristic configuration of Embodiment 9 of the present invention is that a control timing of the potential difference between the photosensitive drum and the developing sleeve by the control portion 300 is controlled on the basis of the number of continuous prints. As for the other portions, the constituent components having the same or similar functions and configurations as those of Embodiment 8 will be denoted by the same reference numerals, and the description thereof will be omitted.

In Embodiment 8, although the potential difference between the photosensitive drum 11 and the developing sleeve 21 was changed during an image forming operation in a low-humidity environment, the amount of excessively charged toner may increase in a normal environment. As described above, the toner in a non-print portion on the developing sleeve, which is not used for developing, is subjected to repeat triboelectric charging by the developing blade.

When a print operation ends, some of the charge of the charged toner leaks into the air. However, when a continuous printing operation was performed with a short waiting period, the charge amount resulting from the repeated triboelectric charging by the developing blade is larger than the amount of charge leaking into the air, and the amount of excessively charged toner increases.

Therefore, in Embodiment 9, the control portion 300 performed a print stopping operation whenever the number of continuously printed recording materials reaches a predetermined number (specifically, every 20 continuous prints) and increased the absolute value of the potential difference between the photosensitive drum and the developing sleeve during the stopping operation to Δ300 V, and the apparatus was operated for 2 seconds.

As Comparative Example 10, a similar stopping operation was performed in a state in which the absolute value of the potential difference was not increased but was left at Δ200 V.

The operations and the evaluation results when the present configuration was applied are described below, in evaluation, under a normal temperature and humidity environment of 23° C. and 50% as an ambient environment, 500 sheets of an image sample were printed using an image having a print percentage of 4% as a print pattern, and the images were evaluated. Moreover, a distribution of a toner charge amount on the developing sleeve 21 immediately after printing 500 sheets was measured.

As illustrated in Table 12, in a normal environment, in the case of Comparative Example 10, the amount of excessively charged toner having a charge amount of 15 μC/g exceeded 15% (g). However, as in Embodiment 9, when the absolute value of the potential difference between the photosensitive drum and the developing sleeve was changed to 300V, the amount of excessively charged toner decreased, and the amount of toner having an appropriate charge amount of 2 to 15 μC/g increased (h).

TABLE 12

Influence of number of passages in normal environment

| Examination result | Potential difference between photosensitive drum and developing sleeve | Excessively charged toner (15 μC/g or more) | Appropriately charged toner (2 μC/g or more and smaller than 15 μC/g) | Uncharged toner (smaller than 2 μC/g) |
|---|---|---|---|---|
| g | Δ200 V | 15% | 85% | 5% |
| h | Δ300 V | 10% | 85% | 5% |

Table 13 illustrates image evaluation results. "O", "Δ", and "X" in the table indicate evaluation results to Embodiment 8.

TABLE 13

Evaluation results of Embodiment 9

| | Evaluation |
|---|---|
| Embodiment 9 | O |
| Comparative Example 10 | X |

In the configuration of the present embodiment, it was found that no image defect was observed through a durability test, and a satisfactory image was obtained. However, fogging resulting from a regulation defect was observed in Comparative Example 10. Therefore, in the configuration of the present embodiment, by increasing the potential difference between the photosensitive drum and the developing sleeve in a continuous printing operation, the developing sleeve 21 of the present configuration could perform its sufficient function and a stable image quality was obtained.

In the present embodiment, although a rotation operation with an increased potential difference is performed according to a continuous printing operation, there is no limitation thereto. When a print percentage is low, toner may stay on the developing sleeve for a long period, and the percentage of excessively charged toner may increase. Therefore, when it is detected that printing with a low print percentage is repeated, an operation of increasing the potential difference may be performed. The excessively charged toner may be suppressed when the number of times the toner on the developing sleeve passing through the developing sleeve per unit time is equal to or larger than a predetermined number of times.

A use state is not limited to the number of images formed recording materials, and the necessity of potential difference control may be determined on the basis of toner consumption per unit time and the number of rotations of the developing sleeve, for example. In this case, the control portion 300 functions as a developer consumption speed detecting unit or a continuous operation detecting unit.

Embodiment 10

A characteristic configuration of Embodiment 10 of the present invention is a developing apparatus and is that the potential difference between the developing sleeve and the developing blade is controlled. As for the other portions, the constituent components having the same or similar functions and configurations as those of Embodiment 8 will be denoted by the same reference numerals, and the description thereof will be omitted.
<Developing Apparatus>
In Embodiment 8, the developing blade which is a toner layer thickness regulating member is connected to a power source (FIG. 26: a blade bias application portion 403) and an electric field is formed between the developing blade 23 and the developing sleeve 21 in order to control a toner charge amount. As for the other configuration, the configuration of the developing apparatus illustrated in FIG. 22 is used similarly to Embodiment 8. The description of the same constituent components as those of Embodiment 8 will be omitted.

The developing blade 23 which is a toner layer thickness regulating member regulates the toner amount on the developing sleeve 21 to an appropriate amount by regulating the toner on the developing sleeve 21 with appropriate pressure. As a material that forms the developing blade of the present embodiment, a blade in which a conductive urethane resin having a thickness of 0.5 mm is attached to the surface of a stainless steel (SUS) plate is used in order to control the charging of toner. Moreover, a power source capable of applying a DC bias is connected to the SUS plate. In the present embodiment, −300 V is applied to the developing sleeve and −500 V is applied to the developing blade.
<Suppression of Excessively Charged Toner in Low-Humidity Environment>
Suppression of excessively charged toner in the present embodiment will be described.

In the developing apparatus 2 employed in the present embodiment, since −300 V is applied to the developing sleeve 21 and −500 V is applied to the developing blade 23, a potential difference having an absolute value of 200 V is applied. A Coulomb force directed to the developing sleeve 21 acts on toner having negative-polarity charge.

In the present embodiment, when the control portion 300 determined that the ambient environment is a low-humidity environment using the humidity sensor 72 and the temperature sensor 73 as an environment detection unit disposed in the image forming apparatus, the control portion 300 charged the absolute value of the potential difference between the developing sleeve and the developing blade to a value larger than 200 V. Since the determination of a low-humidity environment is the same as that of Embodiment 8, the description thereof will be omitted.

In a low-humidity environment, the voltage applied to the developing blade was changed to −600 V so that the potential difference was changed to 300 V. By doing so, a larger Coulomb force is applied to the excessively charged toner and the amount of charge accepted by the electron accepting functional group B increases. As a result, it is possible to suppress the amount of excessively charged toner illustrated in FIG. 25. Table 14 illustrates a charge amount of toner on the developing sleeve when Embodiment 10 was used.

TABLE 14

Relation between toner charge amount and potential difference between developing sleeve and developing blade in Embodiment 10

| Examination result | Ambient environment | Potential difference between developing sleeve and developing blade | Excessively charged toner (15 µC/g or more) | Appropriately charged toner (2 µC/g or more and smaller than 15 µC/g) | Uncharged toner (smaller than 2 µC/g) |
|---|---|---|---|---|---|
| i | 23° C. 50% | Δ200 V | 5% | 90% | 5% |
| j | 20° C. 50% | Δ300 V | 0% | 90% | 10% |
| k | 15° C. 10% | Δ200 V | 15% | 80% | 5% |
| l | 15° C. 10% | Δ300 V | 10% | 85% | 5% |

As illustrated in FIG. 14, when the absolute value of the potential difference between the developing sleeve and the developing blade in a normal-humidity environment was set to 200 V, the percentage of excessively charged toner was 5% (i). However, in a low-humidity environment, the percentage of excessively charged toner increased to 15% and an image defect resulting from a regulation defect occurred (k). However, when the potential difference between the developing sleeve and the developing blade was increased to 300 V, the percentage of excessively charged toner was suppressed and the percentage of appropriately charged toner increased (l). When the potential difference is increased to 300 V similarly in a normal-humidity environment, since the amount of charge accepted by the electron accepting functional group B, it is possible to suppress the percentage of excessively charged toner. However, the percentage of uncharged toner increased and a decrease in developing ability occurred (j).

Table 15 illustrates evaluation results when the present configuration was used. Evaluation was performed, in a similar manner to Embodiment 8, by performing an operation of performing a print job of two sheets once every 20 seconds on 300 sheets under a low-temperature and low-humidity environment of 15° C. and 10%. In the present embodiment, in a low-humidity environment, the absolute value of the potential difference between the developing sleeve and the developing blade was increased to 300 V and the apparatus was operated. As Comparative Example 11, a print operation was performed while maintaining the potential difference at 200 V.

"O", "Δ", and "X" in the table indicate evaluation results similar to Embodiment 8.

TABLE 15

Evaluation results

| | Evaluation |
|---|---|
| Embodiment 10 | O |
| Comparative Example 11 | Δ |

In the configuration of the present embodiment, by increasing the potential difference between the developing blade and the developing sleeve in a continuous printing operation, the developing sleeve 21 of the present configuration could perform its sufficient function and a stable image quality was obtained.

As described above, in the present embodiment, it is possible to provide a stable image quality in all environments by controlling the function of the electron accepting functional group B when the environment changes to a low-humidity environment using the bias applied to the developing blade while maintaining the performance of the developing sleeve in a normal-humidity environment.

In the present embodiment, although a magnetic contact developing system was used as a developing system, there is no limitation thereto. The developing system may be a non-contact developing system in which an interval maintaining member is attached to both ends of a developing sleeve, and the interval maintaining member and a photosensitive drum make contact with each other so that the developing sleeve is held with a very small gap between the developing sleeve and the photosensitive drum. In this case, the magnetic force and the magnetic polarity arrangement of the magnet roller fixedly arranged inside the developing sleeve are preferably appropriately changed.

The bias applied to the developing sleeve is not limited to the DC bias but an AC bias may be used. In this case, AC periods are synchronized so that the potential difference between the developing sleeve and the developing blade can be maintained.

In Embodiment 10, similarly to Embodiment 9, the control of increasing the potential difference may be performed on the basis of a toner consumption amount per unit time and the number of rotations of the developing sleeve as a predetermined use state.

Embodiment 11

A characteristic configuration of Embodiment 11 of the present invention is a developing apparatus and is that the potential difference between the developing sleeve and the surface of the blowoff prevention sheet is created. As for the other portions, the constituent components having the same or similar functions and configurations as those of Embodiment 8 will be denoted by the same reference numerals, and the description thereof will be omitted.

<Developing Apparatus>

Embodiment 11 employs a magnetic contact developing system and uses the configuration of a developing apparatus similar to that of Embodiment 8, and the description of the same constituent components as those of Embodiment 8 will be omitted.

In Embodiment 11, a sheet of which the surface making rubbing contact with the developer carrying member is deposited with aluminum is used as the blowoff prevention sheet 125 as a developer sealing member.

Moreover, a power source (FIG. 26: a blowoff prevention sheet bias application portion 404) capable of applying a DC bias is connected to the surface of the blowoff prevention sheet 125. In the present embodiment, a bias of −300 V is applied to the developing sleeve and a bias of −500 V is applied to the surface 125a of the blowoff prevention sheet 125. Therefore, a potential difference having an absolute value of 200 V is applied to the nip between the developing sleeve and the blowoff prevention sheet.

Therefore, a Coulomb force directed to the developing sleeve acts on the toner having negative-polarity charge at the nip portion between the blowoff prevention sheet and the developing sleeve.

During printing with a low print percentage, the residual toner on the developing sleeve after developing tends to contain a larger amount of strong-negative-polarity toner having strong image force. Therefore, the strong-negative-polarity developing-residual toner has a strong Coulomb force such that the toner is pressed toward the developing sleeve at the nip between the developing sleeve and the blowoff prevention sheet, and the amount of charge accepted by the electron accepting functional group B increases. As a result, it is possible to decrease the charge amount of the excessively charged toner remaining on the sleeve after developing.

Table 16 illustrates a toner charge amount on the developing sleeve after solid-black development (after black) and after 100 turns of the sleeve after the solid-black development (after black) when the present embodiment was used and when the potential difference between the developing sleeve and the surface of the blowoff prevention sheet was set to 0 V as Comparative Example 12.

TABLE 16

Relation between toner charge amount and potential difference between developing sleeve and blowoff prevention sheet in Embodiment 11

| | Measurement timing | Potential difference between developing sleeve and blowoff prevention sheet | Excessively charged toner (15 μC/g or more) | Appropriately charged toner (2 μC/g or more and smaller than 15 μC/g) | Uncharged toner (smaller than 2 μC/g) |
|---|---|---|---|---|---|
| Comparative Example 12 | After white | Δ0 V | 5% | 90% | 5% |
| | After black | Δ0 V | 2% | 93% | 5% |
| Embodiment 11 | After white | Δ200 V | 2% | 93% | 5% |
| | After black | Δ200 V | 2% | 93% | 5% |

Table 17 illustrates evaluation results when the image forming apparatuses having the developing apparatuses of Embodiment 11 and Comparative Example 12 were used. In evaluation, under a normal environment as an ambient environment, a print operation similar to that of Embodiment 8 was performed on 300 sheets, and the images were evaluated. As in Comparative Example 12, when there was no potential difference between the developing sleeve and the blowoff prevention sheet, the toner charge amount on the developing sleeve after white was larger than that after black. On the other hand, as in Embodiment 11, when the potential difference between the developing sleeve and the blowoff prevention sheet was set to 200 V, it was possible to suppress the percentage of excessively charged toner after white and increase the percentage of appropriately charged toner.

O indicates no occurrence of ghost in the period of the developing sleeve (the period of the circumferential length of the developing sleeve), and X indicates occurrence of ghost in the period of the developing sleeve.

TABLE 17

Evaluation results

| | Evaluation |
|---|---|
| Embodiment 11 | ○ |
| Comparative Example 12 | X |

That is, in Embodiment 11, a bias is applied to the blowoff prevention sheet so that a difference is formed between the DC component of the bias applied to the developing sleeve and the DC component of the bias applied to the surface of the blowoff prevention sheet. By doing so, the developing sleeve having the electron accepting functional group B can exhibit its performance more effectively. In this way, it is possible to provide a high-quality image with little ghost by decreasing the difference in the toner charge amount on the developing sleeve after white and black.

The control portion 300 may control the biases applied to the blowoff prevention sheet and the developing sleeve according to an environment, the number of prints for durability test, a toner consumption amount, the number of rotations of the developing sleeve as a predetermined use state as in Embodiments 8 and 9 and may increase the potential difference between the blowoff prevention sheet and the developing sleeve so as to be larger than that during a non-image forming period in a low-temperature and low-humidity environment, for example. In this way, it is possible to provide a high-quality image stably for a long period regardless of a use state.

The configuration of the blowoff prevention sheet is not particularly limited to such a configuration as the aluminum-deposited surface of the present embodiment as long as it is possible to create a potential difference at the nip between the developing sleeve and the blowoff prevention sheet.

Moreover, the configuration of creating a potential difference between the blowoff prevention sheet and the developing sleeve is not limited to the configuration of Embodiment 11. For example, a Zener diode may be provided between the developing sleeve and the blowoff prevention sheet so that the developing sleeve and the blowoff prevention sheet share the same DC bias and a potential difference is created.

Furthermore, in the present embodiment, although a single-component magnetic toner is used as the toner, a non-magnetic toner may be used if toner can be supplied by force other than a magnetic force by adding a supply member or changing the arrangement of the developing apparatus.

Embodiment 12

An image forming apparatus according to Embodiment 12 of the present invention will be described. In Embodiment 12, portions different from those of the above-described embodiments will be described, the same constituent components as those of the above-described embodiments will be denoted by the same reference numerals, and the description thereof will be omitted. Matters that are not particularly described in Embodiment 12 are similar to those of the above-described embodiments.

In Embodiment 12, a DC voltage of −1250 V as a charging bias is applied to the charging roller 12. In this way, the surface of the photosensitive drum 11 is uniformly contact-charged to a charging potential (a dark-part potential) Vd of −600 V.

In Embodiment 12, −400 V is applied to the developing sleeve 21 as a developing bias (Vdc).

In Embodiment 12, the developing sleeve 21 can be rotationally driven at a circumferential speed of 140% (210 mm/sec) with respect to the photosensitive drum 11.

The configuration of the developing blade 23 is the same as the configuration which is shown in FIG. 9, and the developing blade 23 has a support member 23a having a thickness of approximately 100 μm and a resin layer 23b attached to a distal end of the support member 23a. The support member 23a is an elastic member and has a base end fixed to a supporting metal plate. The resin layer 23b is formed of a conductive resin and makes contact with the surface of the developing sleeve 21 with predetermined pressure. The contact force is approximately 20 gf/cm to 40 gf/cm (a contact load per 1 cm in the longitudinal direction of the developing sleeve 21). In the present embodiment, although SUS is used for the support member 23a so as to provide elasticity, the support member 23a may be formed of phosphor bronze, an aluminum alloy, or the like and may be formed of a resin having high hardness as long as it has conductivity. Moreover, in the present embodiment, the resin layer 23b is formed by coating the support member 23a with a conductive polyurethane. In addition to this, polyamide, a polyamide elastomer, polyester, a polyester elastomer, polyester terephthalate, silicone rubber, a silicone resin, and a melamine resin may be used alone or in combination of two or more.

The mechanism of a case where it is not possible to sufficiently suppress excessive charging of toner in a low-temperature and low-humidity environment will be described with reference to FIGS. 10A and 10B. In FIGS. 10A and 10B, the size of an arrow illustrated between the toner t and the surface layer 21a of the developing sleeve indicates the movement amount of charge per unit time.

As illustrated in FIG. 10A, in a normal environment, since the electron donating group A and the electron accepting group B can sufficiently exchange charge on the contact surface between the toner t and the developing sleeve surface layer 21a, appropriately charged toner in FIG. 24 is obtained.

However, in a low-temperature and low-humidity environment, as in FIG. 10B, since a toner resistance increases, charge does not easily move from the toner surface to the surface layer 21a of the developing sleeve. Therefore, since the speed of accepting charge decreases due to the frictional contact with the electron accepting group B, it may not be possible to accept the charge of the excessively charged toner sufficiently. Therefore, the excessively charged toner is strongly fixed to the developing sleeve 21 due to image force, and the fixing force exceeds the regulating force of the developing blade 23. In this way, disorder of the toner layer on the developing sleeve 21 occurs and an image defect due to a regulation defect or the like occurs.

Therefore, it is necessary to sufficiently accelerate movement of charge due to frictional contact between toner and the electron accepting group B in order to suppress excessively charged toner in a low-temperature environment. In Embodiment 12, the contact period of the toner and the surface of the developing sleeve is increased to accelerate movement of charge from toner to the electron accepting group B. That is, the rotating speed of the developing sleeve 21 is decreased so that change in movement of the contact surface between the toner t and the electron accepting group B with rotation of the toner in the regulation nip f is decreased and movement of charge due to the frictional contact between the toner and the electron accepting group B occurs sufficiently.

<Examination of Verification>

The toner charge amount Q/M after the developing sleeve 21 was rotated 500 turns was measured using the developing apparatus having the above-described configuration while varying the rotating speed of the developing sleeve 21 in different environments. As illustrated in FIG. 11, the toner charge amount Q/M was measured using a Faraday cage. The Faraday cage includes a double cylinder in which metal cylinders having different shaft diameters are arranged coaxially and includes a toner collecting filter 33 for taking in toner, provided in an inner cylindrical of the double cylinder. When an inner cylinder 32 and an outer cylinder 31 of the double cylinder are insulated by an insulating member 34 and charged particles having a charge amount q are put in the inner cylinder 32, it can be assumed that a metal cylinder having a charge amount q due to electrostatic induction is formed. The charge amount induced in the double cylinder was measured using KEITHLEY 616 DIGITAL ELECTROMETER, and the toner charge amount Q/M was obtained by dividing the measured charge amount by the toner weight in the inner cylinder.

The results are the same as what are illustrated in FIG. 12A. It can be understood that, in an environment of 23° C. and 50%, the Q/M of the developing sleeve 21 is stable regardless of the rotating speed, whereas, in an environment of 15° C. and 10%, Q/M increases when the rotating speed of the developing sleeve 21 is 200 mm/sec or higher. In the configuration of the present embodiment, a regulation defect occurred when Q/M exceeded 40 µC/g.

That is, it is assumed that, in a low-temperature and low-humidity environment, when the rotating speed of the developing sleeve 21 is 200 mm/sec or higher, the movement of the contact surface of the toner and the electron accepting group B in the surface layer 21a of the developing sleeve becomes faster due to rotation of the toner in the developing regulation nip, and the time for accepting charge becomes insufficient, the electron accepting group cannot accept charge sufficiently, and an image defect such as a regulation defect occurs.

Figure 12B:
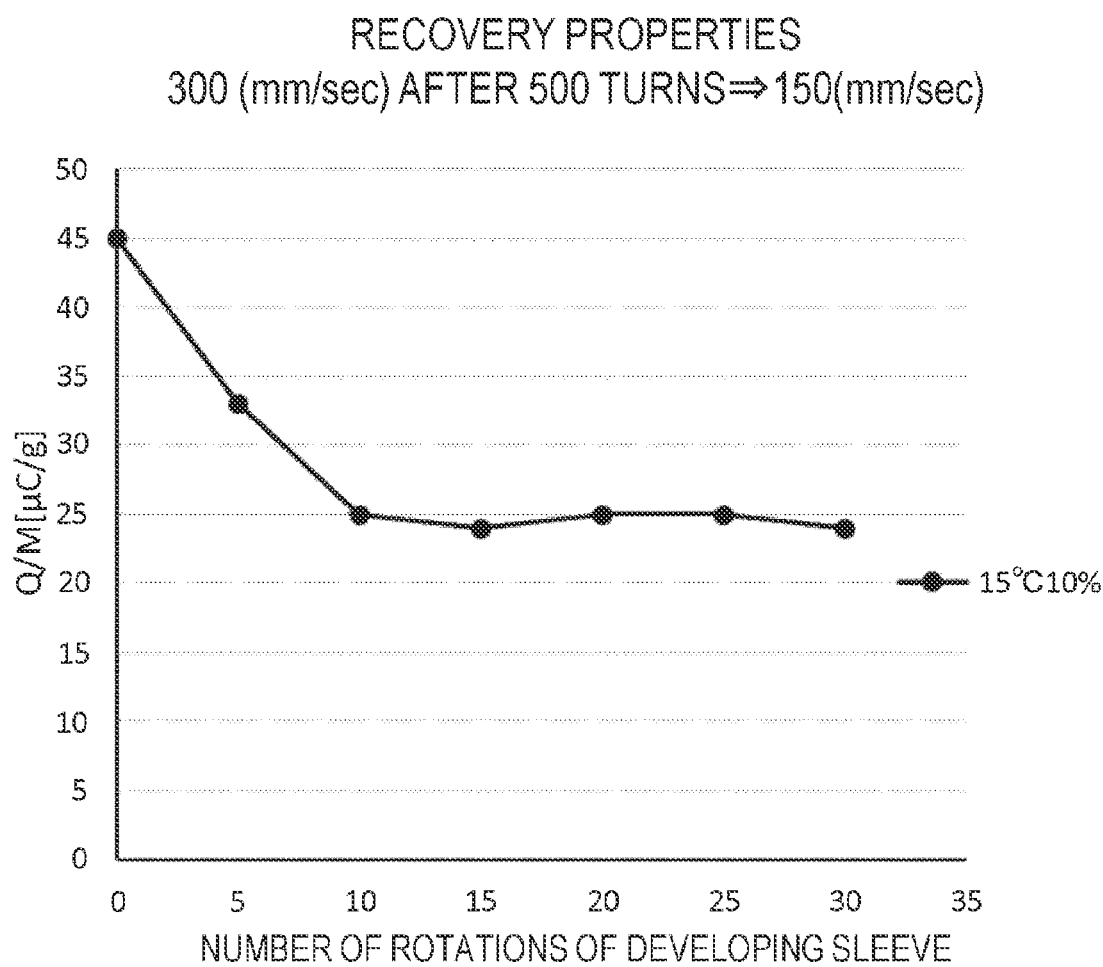
FIG. 12B is a graph illustrating verification results of Embodiment 4.

In this case, the change in Q/M of the toner on the developing sleeve when the rotating speed of the developing sleeve 21 is decreased to 150 mm/sec after the developing sleeve 21 was rotated 500 turns at a rotating speed of 300 mm/sec is the same as what is illustrated in FIG. 12B. When the rotating speed of the developing sleeve 21 was 150 mm/sec, decreased Q/M was observed approximately at 10 turns of the developing sleeve 21. It was understood that the function of the electron accepting group B was obtained sufficiently before the contact surface between the toner and the electron accepting group B in the surface layer 21a of the developing sleeve 21 changed with rotation of the toner.

<Low-Temperature Durability Comparison>

Durability evaluation was performed using the above-described image forming apparatus and process cartridge. As illustrated in FIG. 13, in the configuration of the present embodiment, the rotating speed of the developing sleeve was halved during post rotation only. The durability test was performed under the following condition in a state in which the development rotating speed was 105 min/sec and during post rotation, the developing sleeve was rotated 10 turns (for 3.2 seconds). As a Comparative Example, a durability test was performed in a state in which the development rotating speed was constant.

(Durability Conditions)
  Environment: 15° C. and 10%
  Toner amount: 60 g
  Print mode: print percentage 2%, two-page intermittent
  Number of prints: 1000 sheets
  Sheet type: ZEROX Vitality 75 g paper

TABLE 18

| Number of prints for durability test | Image defect/regulation defect | |
|---|---|---|
| | Present embodiment | Comparative Example |
| 0 | ○ | ○ |
| 250 | ○ | ○ |
| 500 | ○ | ○ |
| 750 | ○ | Δ |
| 1000 | ○ | X |

Table 18 illustrates durability results. "O" indicates no abnormality, "Δ" indicates a minor regulation defect, and "X" indicates a regulation defect.

In the configuration of the present embodiment, the results are the same as what are illustrated in FIG. 14. That is, an image defect was not observed through the durability test, and Q/M of toner was stable and a satisfactory image was obtained. In the Comparative Example, the toner charge amount Q/M on the developing sleeve 21 increased gradually and a regulation defect was observed at 750 sheets. Therefore, in the configuration of the present embodiment, in a low-temperature environment, by decreasing the development rotating speed, the developing sleeve 21 of the present configuration could perform its sufficient function and a stable image quality was obtained. In the present embodiment, although the rotating speed of the developing sleeve 21 was decreased during post rotation only, a similar effect is obtained when the rotating speed of the developing sleeve 21 is decreased during pre-rotation or an inter-sheet period. Moreover, the developing sleeve 21 may be slowed or rotated in idle every predetermined number of prints or only rotated by employing a configuration in which the developing apparatus is separated to suppress fogging.

Embodiment 13

An image forming apparatus according to Embodiment 13 of the present invention will be described. In Embodiment 13, portions different from those of the above-described embodiments will be described, the same constituent components as those of Embodiment 12 will be denoted by the same reference numerals, and the description thereof will be omitted. Matters that are not particularly described in Embodiment 13 are similar to those of Embodiment 12.

The image forming apparatus according to Embodiment 13 has an environment detection unit, and a driving force is input to a charging apparatus only. The present embodiment employs a configuration in which a charging apparatus and a developing apparatus are integrated, the photosensitive drum 11 is rotated at 150 mm/sec by a charging motor 51, and the developing sleeve 21 is rotated at 210 mm/sec in conjunction with the photosensitive drum 11.

Environment correction is performed in such a way that an environment classification based on an absolute humidity is set, an absolute humidity is calculated from the temperature and the relative humidity detected by temperature and humidity sensors, and the environment classification is determined according to the calculated absolute humidity.

Table 19 illustrates an example of an environment classification based on an absolute humidity. NN is a normal environment (a normal-temperature and normal-humidity environment), LL is a low-temperature environment (a low-temperature and low-humidity environment), and HH is a high-temperature environment (a high-temperature and high-humidity environment). For example, environments of 23° C. and 50% RH, 15° C. and 10% RH, and 27° C. and 80% RH are determined as a normal-temperature and normal-humidity environment (absolute humidity D of 10.3 g/m$^3$), a low-temperature and low-humidity environment (an absolute humidity D of 1.3 g/m$^3$), and a high-temperature and high-humidity environment (an absolute humidity D of 20.6 g/m$^3$), respectively.

TABLE 19

| Environment classification | Absolute humidity D (g/m3) |
|---|---|
| L | D < 5.0 |
| N | 5.0 ≤ D < 15.0 |
| H | 15.0 ≤ D |

In Embodiment 13, when the environment is determined as the LL environment, a Q/M optimization sequence is performed in such a way that, whenever 250 pages are printed, the speed of a process cartridge is halved and decreased to a process speed of 75 mm/sec, and the developing sleeve 21 is rotated 30 turns during a non-image forming period. By doing so, the apparatus can be operated in the LL environment only where the Q/M optimization sequence is necessary, the apparatus can be prevented from operating in an environment such as the NN and HH environments where the Q/M optimization sequence is not necessary, and the waste such as deterioration of toner of consumables of a process unit can be suppressed.

The results of comparison of durability between Embodiment 13 and the Comparative Example similar to Embodiment 12 are the same as what are illustrated in FIG. 15. In the Comparative Example, the toner charge amount Q/M on the developing sleeve 21 increased gradually, and image defect was observed at 750 prints. In the configuration of Embodiment 13, although the Q/M on the developing sleeve 21 increased through the durability test, since the above-mentioned procedure was performed every 250 pages, it was possible to decrease the Q/M and obtain a satisfactory image through the durability test. An environment determination method is not limited to this, and although the environment was determined on the basis of an absolute humidity in the present embodiment in Embodiment 13, an environment may be determined using a temperature only, a relative humidity only, or a combination thereof.

Embodiment 14

An image forming apparatus according to Embodiment 14 of the present invention will be described. In Embodiment 14, portions different from those of the above-described embodiments will be described, the same constituent components as those of the above-described embodiments will be denoted by the same reference numerals, and the description thereof will be omitted. Matters that are not particularly described in Embodiment 14 are similar to those of the above-described embodiments.

In Embodiment 14, a DC voltage of −1150 V as a charging bias is applied to the charging roller 12. In this way, the surface of the photosensitive drum 11 is uniformly contact-charged to a charging potential (a dark-part potential) Vd of −600 V.

In Embodiment 14, the developing sleeve 21 having an outer diameter of φ2 mm is used.

In Embodiment 14, the developing sleeve 21 can be rotationally driven at a circumferential speed of 140% (210 mm/sec) with respect to the photosensitive drum 11.

Moreover, in Embodiment 14, in production of the developing sleeve 21, an elastic roller was produced in which the elastic layer 21b of the silicone rubber having a diameter of 12 mm and a thickness of 0.5 mm was formed on the outer periphery of the base 21c.

The configuration of the developing blade 23 is the same as the configuration which is shown in FIG. 18, and the developing blade 23 has a support member 23a having a thickness of approximately 100 µm and a resin layer 23b attached to a distal end of the support member 23a. The support member 23a is an elastic member and has a base end fixed to a supporting metal plate. The resin layer 23b is formed of a conductive resin and makes contact with the surface of the developing sleeve 21 with predetermined pressure. The contact force is approximately 20 gf/cm to 40 gf/cm (a contact load per 1 cm in the longitudinal direction of the developing sleeve 21). In the present embodiment, although SUS is used for the support member 23a so as to provide elasticity, the support member 23a may be formed of phosphor bronze, an aluminum alloy, or the like and may be formed of a resin having high hardness as long as it has conductivity. Moreover, in the present embodiment, the resin layer 23b is formed by coating the support member 23a with a conductive polyurethane. In addition to this, polyamide, a polyamide elastomer, polyester, a polyester elastomer, polyester terephthalate, silicone rubber, a silicone resin, and a melamine resin may be used alone or in combination of two or more.

Figure 19:
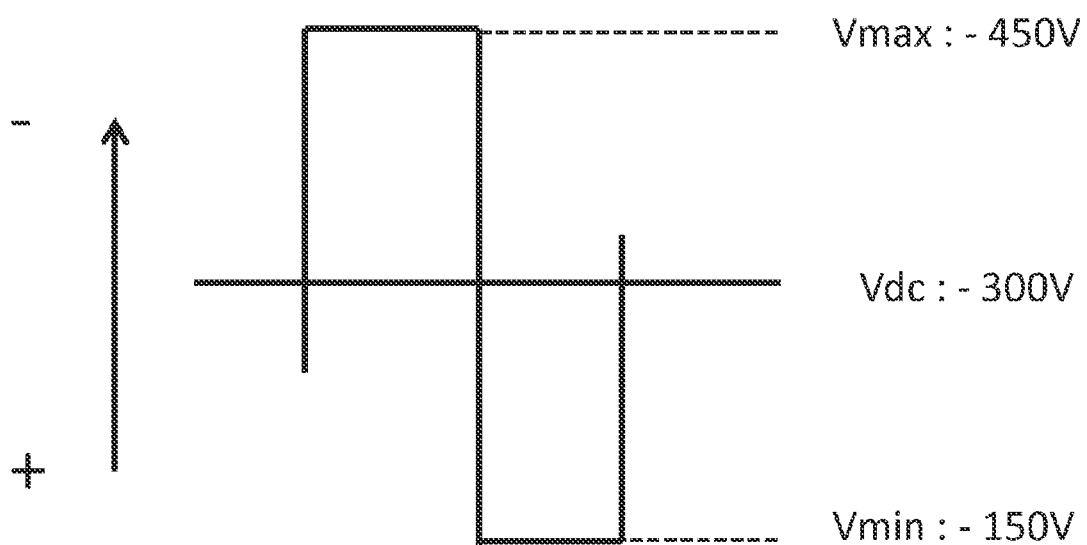
FIG. 19 is a diagram illustrating a developing blade bias according to Embodiment 6.

The developing blade 23 has conductive properties, and a developing blade bias application unit 403 provided in the main body of the image forming apparatus applies a rectangular AC bias (see FIG. 19, Vmax: −450 V, Vmin: −150 V, and Duty ratio: 50%). In this way, an alternative electric field is formed in the nip n between the developing sleeve 21 and the developing blade 23, and Coulomb force alternately acts on the sides of the toner t close to the developing sleeve 21 and the developing blade 23. As a result, rolling abilities of the toner t at the nip n are improved, and various surfaces of the toner t can make sliding contact with the developing sleeve 21. Therefore, the setting speed of the electron donating group A and the electron accepting group B toward the region of the Fermi level is improved. That is, a printed portion can quickly hold charge and a non-printed portion can donate excessive charge whereby the electrostatic properties of both portions become equal, and as a result, a development ghost can be suppressed. Since Coulomb force is alternately applied to the toner in the course of passing through the nip, the frequency of the developing blade bias is preferably set such that the amplitude of the frequency is one wave number or more within the period in which toner (or one piece of toner on the circumferential surface of the developing sleeve) passes through the nip n as the condition of the developing blade bias.

<Examination of Verification>

The present embodiment was verified using a Comparative Example. As Embodiment 14-1, the nip n is set to 0.3 mm, and the frequency of the developing blade bias is set to 2000 Hz, which corresponds to approximately 2.8 wave numbers during passage through the nip n. Moreover, as Embodiment 14-2, the nip n is set to 0.3 mm, and the frequency of the developing blade bias is set to 4000 Hz, which corresponds to approximately 5.7 wave numbers during passage through the nip n. Moreover, as Embodiment 14-3, the nip n is set to 0.2 mm, and the frequency of the developing blade bias is set to 1100 Hz, which corresponds to approximately 1.0 wave numbers during passage through the nip n. As the Comparative Example, in Comparative Example 14-1, the developing sleeve of the present embodiment was used, and the potential of the developing blade bias was set to the same as that of the developing sleeve. That is, an alternative electric field was not formed between the blade and the sleeve. In Comparative Example 14-2, the developing sleeve of PTL 1 (that is, a developing sleeve that contains a tertiary amine structure functioning as the electron donating group A and does not have a polycarbonate bond functioning as the electron accepting group B) was used. Moreover, in Comparative Example 14-2, a developing blade bias applying an AC bias similar to the present embodiment was used.

Verification results using the developing apparatus 2 having the above-described configuration will be described. As a verification method, a toner charge amount of the developing sleeve 21 (after solid-black printing) immediately after printing a black pattern (a 100%-print image) to a width of 150 mm and a toner charge amount of the developing sleeve 21 (after solid-white printing) immediately after printing a white pattern (a 0%-print image) to a width of 150 mm were measured. Furthermore, a development ghost was observed by imaging. The toner charge amount Q/M was measured using a Faraday cage similar to that of FIG. 11. The Faraday cage includes a double cylinder in which metal cylinders having different shaft diameters are arranged coaxially and includes a toner collecting filter 33 for taking in toner, provided in an inner cylindrical of the double cylinder. When an inner cylinder 32 and an outer cylinder 31 of the double cylinder are insulated by an insulating member 34 and charged particles having a charge amount q are put in the inner cylinder 32, it can be assumed that a metal cylinder having a charge amount q due to electrostatic induction is formed. The charge amount induced in the double cylinder was measured using KEITHLEY 616 DIGITAL ELECTROMETER, and the toner charge amount Q/M was obtained by dividing the measured charge amount by the toner weight in the inner cylinder.

The measurement results are illustrated in Table 20. Table 20 illustrates the charge amount of the toner on the developing sleeve 21 after white and black patterns and the result of an image defect when 1000 pages were printed. As for the level of a development ghost, "O" indicates no occurrence, "Δ" indicates occurrence within an allowable range, and "X" indicates an unallowable level.

TABLE 20

|  | Wave number during passing through nip | Q/M after white | Q/M after black | Development ghost |
| --- | --- | --- | --- | --- |
| Embodiment 14-1 | 2.8 | 21 µC/g | 19 µC/g | O |
| Embodiment 14-2 | 5.6 | 21 µC/g | 19 µC/g | O |
| Embodiment 14-3 | 1.0 | 21 µC/g | 18 µC/g | O |
| Comparative Example 14-1 | 0 | 21 µC/g | 15 µC/g | Δ |
| Comparative Example 14-2 | 2.8 | 24 µC/g | 16 µC/g | X |

In Comparative Examples 14-1 and 14-2, there was a difference between the Q/Ms after white and black, and a development ghost occurred. In contrast, when the configuration of Embodiments 14-1, 14-2, and 14-3 was employed, there was a small difference between the Q/Ms after white and black, and a development ghost did not occur.

From the above results, it was confirmed that, in the present embodiment, the developing sleeve 21 performed its function sufficiently and a stable image quality was obtained when an AC bias was applied to the developing blade 23, the nip n and the frequency are set appropriately, and the wave number in the period of passing through the nip n was set to one wave number or more.

In the present embodiment, although the nip n and the frequency are changed to change the wave number in the period of passing through the nip n, the wave number may be adjusted by setting the other process speed and the circumferential speed of the developing sleeve appropriately.

In the present embodiment, although a rectangular wave is used as the waveform of the developing blade bias, the waveform is not limited thereto, and a sinusoidal wave, a triangular wave, or a sawtooth wave, for example, may be used as long as it is possible to improve the rolling ability of the toner in the nip.

Moreover, although a one-component magnetic toner is used as the toner, a non-magnetic toner may be used if toner can be supplied by force other than a magnetic force by adding a supply member or changing the arrangement of the developing apparatus.

Embodiment 15

A configuration of an image forming apparatus according to Embodiment 15 is similar to the configuration of the image forming apparatus of Embodiment 14 except that an environment detection unit (the humidity sensor 72 and the temperature sensor 73) are provided and the control portion 300 sets the developing blade differently on the basis of the detection results. In Embodiment 15, portions different from those of Embodiment 14 will be described, the same constituent components as those of Embodiment 14 will be denoted by the same reference numerals, and the description thereof will be omitted. Matters that are not particularly described in Embodiment 15 are similar to those of Embodiment 14.

In a low-humidity environment or the like, it may not be possible to suppress excessive charging of toner sufficiently, and a problem of a regulation defect or the like may occur. That is, in a normal case, a portion of the charge held by toner leaks through moisture which is a polar molecule included in the air. However, since the amount of moisture in the air is small in a low-humidity environment, the leaking charge amount is small, and the amount of excessively charged toner increases in a low-humidity environment. Since the Fermi level of the electron accepting group B does not change in a low-humidity environment, acceptance of the charge of excessively charged toner due to a difference in Fermi level is not sufficient. Such excessively charged toner is strongly fixed by the image force working between the toner and a developer carrying member, and the fixing force exceeds the regulation force of a toner regulating member. As a result, disorder of a toner layer on the developer carrying member and a regulation defect such as image density non-uniformity or fogging occurs.

Therefore, the present embodiment solved the problem by increasing the amount of charge accepted from excessively charged toner to the electron accepting functional group B by increasing the Coulomb force applied to toner from the electron accepting functional group B so as to be larger than that in a normal humidity environment. In Embodiment 15, the control portion 300 detects the amount of moisture around the image forming apparatus using a humidity detecting unit, calculates the relative humidity from a relation with the amount of saturated moisture at the temperature measured by a temperature detecting unit, and determines that the ambient environment is a low-humidity environment when the relative humidity is lower than 30%. Moreover, it is determined that a relative humidity of between 30% and 70% is a normal humidity environment and a humidity of 70% or higher is a high humidity environment. When the environment is determined to be a low-humidity environment, the control portion 300 sets the developing blade bias to a static elimination mode bias in which the absolute value of a negative-side developing bias is increased as illustrated in FIG. 20. Specifically, Vmax was set to −600 V, and a potential difference between the developing blade bias and the developing bias Vdc was set to Δ−300 V. That is, an absolute value of a peak voltage of an applied bias having the same polarity as the normal charging polarity of toner is increased so as to be larger than that before a low-humidity environment as a predetermined state is detected.

Table 21 illustrates the charge amount of the toner on the developing sleeve when Embodiment 15 was used and the result of an image defect when 1000 pages were printed. Comparative Example 15 is a case where a static elimination mode bias is not set (that is, Vmax is set to −300 V (a potential difference from Vdc is Δ−150 V)).

TABLE 21

| | Ambient environment | Difference between Vdc and Vmax | Q/M after white | Q/M after black | Image defect |
|---|---|---|---|---|---|
| Embodiment 15 | 15% | Δ300 V | 22 μC/g | 18 μC/g | ○ |
| Comparative Example 15 | 15% | Δ150 V | 27 μC/g | 19 μC/g | Fogging |
| Reference Example 1 | 55% | Δ300 V | 21 μC/g | 16 μC/g | Fogging |

As illustrated in Table 21, when the potential difference between the developing sleeve and the developing blade was set to 150 V in a normal-humidity environment, the Q/M after white was 21 μC/g whereas the Q/M after white increased to 27 μC/g in a low-humidity environment, and an image defect resulting from a regulation defect occurred. However, when the potential difference between the developing sleeve and the developing blade was increased to 300 V, the Q/M after white was suppressed to 22 μC/g and the Q/M after black was maintained. As illustrated in Reference Example 1 of Table 21, when the potential difference was increased to 300 V similarly to a normal-humidity environment, since the charge became easy to move toward the electron accepting group B due to Coulomb force, the Q/M after black decreased and minor fogging occurred. Therefore, as in the present embodiment, it is preferable to change the developing blade bias only when the relative humidity is lower than 30%.

In the present embodiment, the Coulomb force applied to toner was increased by increasing the absolute value of Vmax so that charge became easy to move from the excessively charged toner to the electron accepting group B. However, there is no limitation thereto, and the absolute values of Vmax and Vmin and the percentage of the application periods thereof may be set appropriately simultaneously.

The configurations of the above-described embodiments may be used in combinations as much as possible. For example, the configurations of Embodiments 12 and 14 may be combined arbitrarily with arbitrary combinations of the configurations of Embodiments 8, 10, and 11. Moreover, the configuration of Embodiment 9 may be combined with the configuration of Embodiment 8, the configuration of Embodiment 13 may be combined with the configuration of Embodiment 12, and the configuration of Embodiment 15 may be combined with the configuration of Embodiment 14.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-044320, filed on Mar. 11, 2019, and No. 2019-044321, filed on Mar. 11, 2019, which are hereby incorporated by reference herein in their entirety.

REFERENCE SIGNS LIST

11: Photosensitive drum
12: Charging roller
2: Developing apparatus
21: Developing sleeve
21a: Surface layer
21c: Base
23: Developing blade
40: Control portion

The invention claimed is:
1. An image forming apparatus comprising:
an image bearing member that forms an electrostatic latent image;
a developer container that stores a developer;
a developer carrying member that bears and conveys the developer;
a regulating member that makes contact with the developer carrying member to regulate a layer thickness of the developer borne by the developer carrying member;
an interval maintaining member that maintains a distance between the image bearing member and the developer carrying member;
a power source that applies a voltage to the developer carrying member; and
a controller that controls the power source, wherein
the developer carrying member has at least a base and a surface layer,
the surface layer has an electron donating portion that mainly donates charge to the developer when the developer and the surface layer make frictional contact to exchange charge and an electron accepting portion that mainly accepts charge from the developer when the developer and the surface layer makes frictional contact to exchange charge,
the controller applies an AC voltage to the developer carrying member during a period in which an image forming operation is not performed and the developer carrying member is driven, the AC voltage being different from that applied during an image forming period, and a rotating speed of the developer carrying member during a non-image forming period is slower than that during an image forming period.

2. The image forming apparatus according to claim 1, wherein the controller applies a soaring bias to the developer carrying member to move the developer to the image bearing member and applies an AC voltage having a smaller soaring bias to the developer carrying member during a period in which the image forming operation is not performed and the developer carrying member is driven prior to the image forming operation than that during an image forming period.

3. The image forming apparatus according to claim 1, wherein the controller applies a soaring bias to the developer carrying member to move the developer to the image bearing member and applies an AC voltage having a larger soaring bias to the developer carrying member during a period in which the image forming operation is not performed and the developer carrying member is driven after the image forming operation than that during an image forming period.

4. The image forming apparatus according to claim 2, further comprising:

an environment information acquisition unit that acquires environment information, wherein the controller changes a difference between a soaring bias during an image forming period and a soaring bias during a non-image forming period according to the environment information.

5. The image forming apparatus according to claim 2, further comprising:

an environment information acquisition unit that acquires environment information, wherein the controller changes an application time of the soaring bias during a non-image forming period according to the environment information.

6. The image forming apparatus according to claim 1, wherein the controller applies a bias to the developer carrying member and the regulating member, an AC bias is applied to the regulating member, and a wave number of the AC bias is one wave number or more within a period in which the developer passes through a contact portion between the regulating member and the developer carrying member.

7. An image forming apparatus comprising:

an image bearing member that forms an electrostatic latent image;

a developer container that stores a developer;

a developer carrying member that bears and conveys the developer;

a regulating member that makes contact with the developer carrying member to regulate a layer thickness of the developer borne by the developer carrying member;

an interval maintaining member that maintains a distance between the image bearing member and the developer carrying member;

a power source that applies a voltage to the developer carrying member; and a controller that controls the power source, wherein the developer carrying member has at least a base and a surface layer, the surface layer contains a urethane resin having a carbonate bond and containing a tertiary amine structure, the controller applies an AC voltage to the developer carrying member during a period in which an image forming operation is not performed and the developer carrying member is driven, the AC voltage being different from that applied during an image forming period, and a rotating speed of the developer carrying member during a non-image forming period is slower than that during an image forming period.

8. The image forming apparatus according to claim 7, wherein the controller applies a soaring bias to the developer carrying member to move the developer to the image bearing member and applies an AC voltage having a smaller soaring bias to the developer carrying member during a period in which the image forming operation is not performed and the developer carrying member is driven prior to the image forming operation than that during an image forming period.

9. The image forming apparatus according to claim 7, wherein the controller applies a soaring bias to the developer carrying member to move the developer to the image bearing member and applies an AC voltage having a larger soaring bias to the developer carrying member during a period in which the image forming operation is not performed and the developer carrying member is driven after the image forming operation than that during an image forming period.

10. The image forming apparatus according to claim 8, further comprising:

an environment information acquisition unit that acquires environment information, wherein the controller changes a difference between a soaring bias during an image forming period and a soaring bias during a non-image forming period according to the environment information.

11. The image forming apparatus according to claim 8, further comprising:

an environment information acquisition unit that acquires environment information, wherein the controller changes an application time of the soaring bias during a non-image forming period according to the environment information.

12. The image forming apparatus according to claim 7, wherein the controller applies a bias to the developer carrying member and the regulating member, an AC bias is applied to the regulating member, and a wave number of the AC bias is one wave number or more within a period in which the developer passes through a contact portion between the regulating member and the developer carrying member.

13. An image forming apparatus comprising:

an image bearing member that forms an electrostatic latent image;

a developer container that stores a developer;

a developer carrying member that makes contact with the image bearing member, and bears and conveys the developer;

a regulating member that makes contact with the developer carrying member to regulate a layer thickness of the developer borne by the developer carrying member;

a power source that applies a voltage to the developer carrying member; and
a controller that controls the power source, wherein
the developer bearing member has at least a base and a surface layer,
the surface layer has an electron donating portion that mainly donates charge to the developer when the developer and the surface layer make frictional contact to exchange charge and an electron accepting portion that mainly accepts charge from the developer when the developer and the surface layer makes frictional contact to exchange charge,
the controller applies an AC voltage to the developer carrying member during a period in which an image forming operation is not performed and the developer carrying member is driven, and
a rotating speed of the developer carrying member during a non-image forming period is slower than that during an image forming period.

14. The image forming apparatus according to claim 13, wherein
the controller applies an AC voltage to the developer carrying member during a period in which the image forming operation is not performed and the developer carrying member is driven after the image forming operation.

15. The image forming apparatus according to claim 13, further comprising:
a separation mechanism that separates the developer carrying member from the image bearing member, wherein
the controller applies an AC voltage to the developer carrying member during a period in which an image forming operation is not performed and after the separation mechanism separates the developer carrying member from the image bearing member.

16. The image forming apparatus according to claim 13, wherein
the controller applies a bias to the developer carrying member and the regulating member, an AC bias is applied to the regulating member, and a wave number of the AC bias is one wave number or more within a period in which the developer passes through a contact portion between the regulating member and the developer carrying member.

17. An image forming apparatus comprising:
an image bearing member that forms an electrostatic latent image;
a developer container that stores a developer;
a developer bearing member that makes contact with the image bearing member, and bears and conveys the developer;
a regulating member that makes contact with the developer carrying member to regulate a layer thickness of the developer borne by the developer carrying member;
a power source that applies a voltage to the developer carrying member; and
a controller that controls the power source, wherein
the developer carrying member has at least a base and a surface layer,
the surface layer contains a urethane resin having a carbonate bond and containing a tertiary amine structure,
the controller applies an AC voltage to the developer carrying member during a period in which an image forming operation is not performed and the developer carrying member is driven, and
a rotating speed of the developer carrying member during a non-image forming period is slower than that during an image forming period.

18. The image forming apparatus according to claim 17, wherein
the controller applies an AC voltage to the developer carrying member during a period in which the image forming operation is not performed and the developer carrying member is driven after the image forming operation.

19. The image forming apparatus according to claim 17, further comprising:
a separation mechanism that separates the developer carrying member from the image bearing member, wherein
the controller applies an AC voltage to the developer carrying member during a period in which an image forming operation is not performed and after the separation mechanism separates the developer carrying member from the image bearing member.

20. The image forming apparatus according to claim 17, wherein
the controller applies a bias to the developer carrying member and the regulating member, an AC bias is applied to the regulating member, and a wave number of the AC bias is one wave number or more within a period in which the developer passes through a contact portion between the regulating member and the developer carrying member.

21. An image forming apparatus comprising:
an image bearing member;
a developer carrying member that makes contact with the image bearing member and conveys a developer to the image bearing member;
a control portion that controls a potential difference between the image bearing member and the developer carrying member; and
a detecting portion that detects a state in which the image forming apparatus is used, wherein
the developer carrying member has at least a base and a surface layer,
the surface layer has (A) a charge donating portion that mainly donates charge to the developer when the developer and the surface layer make frictional contact to exchange charge and (B) a charge accepting portion that mainly accepts charge from the developer when the developer and the surface layer makes frictional contact to exchange charge, and
when the detecting portion detects a predetermined state, the control portion increases an absolute value of the potential difference at a predetermined timing so as to be larger than that before the predetermined state is detected.

22. An image forming apparatus comprising:
an image bearing member;
a developer carrying member that makes contact with the image bearing member and conveys a developer to the image bearing member;
a layer thickness regulating member that makes contact with the developer carrying member to regulate a layer thickness of the developer borne by the developer carrying member;
a control portion that controls a potential difference between the developer bearing member and the layer thickness regulating member; and
a detecting portion that detects a state in which the image forming apparatus is used, wherein the developer carrying member has at least a base and a surface layer, the surface layer has (A) a charge donating portion that mainly donates charge to the developer when the developer and the surface layer make frictional contact to exchange charge and (B) a charge accepting portion that mainly accepts charge from the developer when the developer and the surface layer makes frictional contact to exchange charge, and when the detecting portion detects a predetermined state, the control portion increases an absolute value of the potential difference at a predetermined timing so as to be larger than that before the predetermined state is detected.

23. The image forming apparatus according to claim 21, wherein the predetermined timing is a non-image forming period.

24. The image forming apparatus according to claim 21, wherein the detecting portion is an environment detection unit that detects environment information indicating an amount of moisture around the image forming apparatus, and when the environment detection unit determines that an ambient environment of the image forming apparatus is a low-humidity environment, the control portion increases an absolute value of the potential difference.

25. The image forming apparatus according to claim 21, wherein the detecting portion is a detector that detects the number of rotations of the developer carrying member per unit time, and when the detector determines that the image forming apparatus operates continuously, the control portion increases the absolute value of the potential difference.

26. The image forming apparatus according to claim 21, wherein the detecting portion is a detector that detects the amount of consumption of the developer per unit time in the image forming apparatus, and when the detector determines that the rate of consumption of the developer is slow, the control portion increases the absolute value of the potential difference.

27. An image forming apparatus comprising:

an image bearing member;

a developer container that stores a developer;

a developer carrying member that is disposed in an opening of the developer container to make contact with the image bearing member and convey the developer to the image bearing member;

a developer sealing member having one end fixed to the developer container and the other end which is a free end making sliding contact with the developer carrying member;

a first bias application portion that applies a bias to the developer bearing member; and a second bias application portion that applies a bias to the developer sealing member, wherein the developer carrying member has at least a base and a surface layer, the surface layer has (A) a charge donating portion that mainly donates charge to the developer when the developer and the surface layer make frictional contact to exchange charge and (B) a charge accepting portion that mainly accepts charge from the developer when the developer and the surface layer makes frictional contact to exchange charge, a surface of the developer sealing member has conductive properties, and the first bias application portion applies a bias to the developer carrying member and the second bias application portion applies a bias to the developer sealing member so that a difference between a DC component of the bias applied to the developer carrying member and a DC component of the bias on the surface of the developer sealing member is formed.

28. The image forming apparatus according to claim 27, further comprising:

a detecting portion that detects a state in which the image forming apparatus is used, wherein when the detecting portion detects a predetermined state, the first and second bias application portions apply biases at a predetermined timing so that the difference is larger than that before the predetermined state is detected.

29. The image forming apparatus according to claim 28, wherein the predetermined timing is a non-image forming period.

30. The image forming apparatus according to claim 28, wherein the detecting portion is an environment detection unit that detects environment information indicating an amount of moisture around the image forming apparatus, and when the environment detection unit determines that an ambient environment of the image forming apparatus is a low-humidity environment, the first and second bias application portions apply biases at a predetermined timing so that the difference is larger than that before the predetermined state is detected.

31. The image forming apparatus according to claim 28, wherein the detecting portion is a detector that detects the number of rotations of the developer carrying member per unit time, and when the detector determines that the image forming apparatus operates continuously, the first and second bias application portions apply biases at a predetermined timing so that the difference is larger than that before the predetermined state is detected.

32. The image forming apparatus according to claim 28, wherein the detecting portion is a detector that detects the amount of consumption of the developer per unit time in the image forming apparatus, and when the detector determines that the rate of consumption of the developer is slow, the first and second bias application portions apply biases at a predetermined timing so that the difference is larger than that before the predetermined state is detected.

33. An image forming apparatus comprising:

an image bearing member;

a developer carrying member that makes contact with the image bearing member and conveys a developer to the image bearing member; and a control portion that controls a rotating speed of the developer carrying member; and a detecting portion that detects a state in which the image forming apparatus is used, wherein the developer carrying member has at least a base and a surface layer, the surface layer has (A) a charge donating portion that mainly donates charge to the developer when the developer and the surface layer make frictional contact to exchange charge and (B) a charge accepting portion that mainly accepts charge from the developer when the developer and the surface layer makes frictional contact to exchange charge, the control portion decreases the rotating speed of the developer carrying member during a non-image forming period so as to be slower than the rotating speed during an image forming period, and when the detecting portion detects a predetermined state, the control portion decreases the rotating speed of the developer carrying member during a non-image forming period so as to be slower than the rotating speed during an image forming period.

34. The image forming apparatus according to claim 33, wherein
the detecting portion is an environment detection unit that detects environment information indicating an amount of moisture around the image forming apparatus, and
when the environment detection unit determines that an ambient environment of the image forming apparatus is a low-humidity environment, the control portion decreases the rotating speed of the developer carrying member during a non-image forming period so as to be slower than the rotating speed during an image forming period.

35. The image forming apparatus according to claim 33, wherein
the detecting portion is a detector that detects the number of rotations of the developer bearing member per unit time, and
when the detector determines that the image forming apparatus operates continuously, the control portion decreases the rotating speed of the developer carrying member during a non-image forming period so as to be slower than the rotating speed during an image forming period.

36. The image forming apparatus according to claim 33, wherein
the detecting portion is a detector that detects the amount of consumption of the developer per unit time in the image forming apparatus, and
when the detector determines that the rate of consumption of the developer is slow, the control portion decreases the rotating speed of the developer carrying member during a non-image forming period so as to be slower than the rotating speed during an image forming period.

37. An image forming apparatus comprising:
an image bearing member;
a developer carrying member that makes contact with the image bearing member and conveys a developer to the image bearing member; and
a layer thickness regulating member that makes contact with the developer carrying member to regulate a layer thickness of the developer borne by the developer carrying member;
a first bias application portion that applies a bias to the developer carrying member; and
a third bias application portion that applies a bias to the layer thickness regulating member, wherein
the developer carrying member has at least a base and a surface layer,
the surface layer has (A) a charge donating portion that mainly donates charge to the developer when the developer and the surface layer make frictional contact to exchange charge and (B) a charge accepting portion that mainly accepts charge from the developer when the developer and the surface layer makes frictional contact to exchange charge,
the third bias application portion applies an AC bias to the layer thickness regulating member, and
a wave number of the AC bias is one wave number or more within a period in which the developer passes through a nip at which the developer carrying member and the layer thickness regulating member make contact with each other.

38. The image forming apparatus according to claim 37, further comprising:
a detecting portion that detects a state in which the image forming apparatus is used, wherein
when the detecting portion detects a predetermined state, the third bias application portion increases an absolute value of a peak voltage of the applied bias having the same polarity as a normal charging polarity of the developer so as to be larger than that before the predetermined state is detected.

39. The image forming apparatus according to claim 38, wherein
the detecting portion is an environment detection unit that detects environment information indicating an amount of moisture around the image forming apparatus, and
when the environment detection unit determines that an ambient environment of the image forming apparatus is a low-humidity environment, the third bias application portion increases an absolute value of a peak voltage of the applied bias having the same polarity as a normal charging polarity of the developer so as to be larger than that before the predetermined state is detected.

40. The image forming apparatus according to claim 38, wherein
the detecting portion is a detector that detects the number of rotations of the developer carrying member per unit time, and
when the detector determines that the image forming apparatus operates continuously, the third bias application portion increases an absolute value of a peak voltage of the applied bias having the same polarity as a normal charging polarity of the developer so as to be larger than that before the predetermined state is detected.

41. The image forming apparatus according to claim 38, wherein
the detecting portion is a detector that detects the amount of consumption of the developer per unit time in the image forming apparatus, and
when the detector determines that the rate of consumption of the developer is slow, the third bias application portion increases an absolute value of a peak voltage of the applied bias having the same polarity as a normal charging polarity of the developer so as to be larger than that before the predetermined state is detected.

42. The image forming apparatus according to claim 21, wherein
the surface layer is formed of a urethane resin including a molecular structure of an electron donating functional group as the charge donating portion and an electron accepting functional group as the charge accepting portion.

43. An image forming apparatus comprising:
an image bearing member;
a developer carrying member that makes contact with the image bearing member and conveys a developer to the image bearing member;
a control portion that controls a potential difference between the image bearing member and the developer carrying member; and a detecting portion that detects a state in which the image forming apparatus is used, wherein the developer carrying member has at least a base and a surface layer, the surface layer contains a urethane resin, the urethane resin has a carbonate bond and contains a tertiary amine structure, and when the detecting portion detects a predetermined state, the control portion increases an absolute value of the potential difference at a predetermined timing so as to be larger than that before the predetermined state is detected.

44. An image forming apparatus comprising:

an image bearing member;

a developer carrying member that makes contact with the image bearing member and conveys a developer to the image bearing member;

a layer thickness regulating member that makes contact with the developer bearing member to regulate a layer thickness of the developer borne by the developer carrying member;

a control portion that controls a potential difference between the developer bearing member and the layer thickness regulating member; and a detecting portion that detects a state in which the image forming apparatus is used, wherein the developer carrying member has at least a base and a surface layer, the surface layer contains a urethane resin, the urethane resin has a carbonate bond and contains a tertiary amine structure, and when the detecting portion detects a predetermined state, the control portion increases an absolute value of the potential difference at a predetermined timing so as to be larger than that before the predetermined state is detected.

45. The image forming apparatus according to claim 43, wherein the predetermined timing is a non-image forming period.

46. The image forming apparatus according to claim 43, wherein the detecting portion is an environment detection unit that detects environment information indicating an amount of moisture around the image forming apparatus, and when the environment detection unit determines that an ambient environment of the image forming apparatus is a low-humidity environment, the control portion increases an absolute value of the potential difference.

47. The image forming apparatus according to claim 43, wherein the detecting portion is a detector that detects the number of rotations of the developer carrying member per unit time, and when the detector determines that the image forming apparatus operates continuously, the control portion increases the absolute value of the potential difference.

48. The image forming apparatus according to claim 43, wherein the detecting portion is a detector that detects the amount of consumption of the developer per unit time in the image forming apparatus, and when the detector determines that the rate of consumption of the developer is slow, the control portion increases the absolute value of the potential difference.

49. An image forming apparatus comprising:

an image bearing member;

a developer container that stores a developer;

a developer carrying member that is disposed in an opening of the developer container to make contact with the image bearing member and convey the developer to the image bearing member;

a developer sealing member having one end fixed to the developer container and the other end which is a free end making sliding contact with the developer carrying member;

a first bias application portion that applies a bias to the developer carrying member; and a second bias application portion that applies a bias to the developer sealing member, wherein the developer carrying member has at least a base and a surface layer, the surface layer contains a urethane resin, the urethane resin has a carbonate bond and contains a tertiary amine structure, a surface of the developer sealing member has conductive properties, and the first bias application portion applies a bias to the developer carrying member and the second bias application portion applies a bias to the developer sealing member so that a difference between a DC component of the bias applied to the developer carrying member and a DC component of the bias on the surface of the developer sealing member is formed.

50. The image forming apparatus according to claim 49, further comprising:

a detecting portion that detects a state in which the image forming apparatus is used, wherein when the detecting portion detects a predetermined state, the first and second bias application portions apply biases at a predetermined timing so that the difference is larger than that before the predetermined state is detected.

51. The image forming apparatus according to claim 50, wherein the predetermined timing is a non-image forming period.

52. The image forming apparatus according to claim 50, wherein the detecting portion is an environment detection unit that detects environment information indicating an amount of moisture around the image forming apparatus, and when the environment detection unit determines that an ambient environment of the image forming apparatus is a low-humidity environment, the first and second bias application portions apply biases at a predetermined timing so that the difference is larger than that before the predetermined state is detected.

53. The image forming apparatus according to claim 50, wherein the detecting portion is a detector that detects the number of rotations of the developer carrying member per unit time, and when the detector determines that the image forming apparatus operates continuously, the first and second bias application portions apply biases at a predetermined timing so that the difference is larger than that before the predetermined state is detected.

54. The image forming apparatus according to claim 50, wherein the detecting portion is a detector that detects the amount of consumption of the developer per unit time in the image forming apparatus, and when the detector determines that the rate of consumption of the developer is slow, the first and second bias application portions apply biases at a predetermined timing so that the difference is larger than that before the predetermined state is detected.

55. An image forming apparatus comprising:
an image bearing member;
a developer carrying member that makes contact with the image bearing member and conveys a developer to the image bearing member; and
a control portion that controls a rotating speed of the developer carrying member; and
a detecting portion that detects a state in which the image forming apparatus is used, wherein
the developer carrying member has at least a base and a surface layer,
the surface layer contains a urethane resin,
the urethane resin has a carbonate bond and contains a tertiary amine structure, and
the control portion decreases the rotating speed of the developer carrying member during a non-image forming period so as to be slower than the rotating speed during an image forming period, and
when the detecting portion detects a predetermined state, the control portion decreases the rotating speed of the developer carrying member during a non-image forming period so as to be slower than the rotating speed during an image forming period.

56. The image forming apparatus according to claim 55, wherein
the detecting portion is an environment detection unit that detects environment information indicating an amount of moisture around the image forming apparatus, and
when the environment detection unit determines that an ambient environment of the image forming apparatus is a low-humidity environment, the control portion decreases the rotating speed of the developer carrying member during a non-image forming period so as to be slower than the rotating speed during an image forming period.

57. The image forming apparatus according to claim 55, wherein
the detecting portion is a detector that detects the number of rotations of the developer bearing member per unit time, and
when the detector determines that the image forming apparatus operates continuously, the control portion decreases the rotating speed of the developer carrying member during a non-image forming period so as to be slower than the rotating speed during an image forming period.

58. The image forming apparatus according to claim 55, wherein
the detecting portion is a detector that detects the amount of consumption of the developer per unit time in the image forming apparatus, and
when the detector determines that the rate of consumption of the developer is slow, the control portion decreases the rotating speed of the developer carrying member during a non-image forming period so as to be slower than the rotating speed during an image forming period.

59. An image forming apparatus comprising:
an image bearing member;
a developer carrying member that makes contact with the image bearing member and conveys a developer to the image bearing member; and
a layer thickness regulating member that makes contact with the developer carrying member to regulate a layer thickness of the developer borne by the developer carrying member;
a first bias application portion that applies a bias to the developer carrying member; and
a third bias application portion that applies a bias to the layer thickness regulating member, wherein
the developer carrying member has at least a base and a surface layer,
the surface layer contains a urethane resin,
the urethane resin has a carbonate bond and contains a tertiary amine structure,
the third bias application portion applies an AC bias to the layer thickness regulating member, and
a wave number of the AC bias is one wave number or more within a period in which the developer passes through a nip at which the developer carrying member and the layer thickness regulating member make contact with each other.

60. The image forming apparatus according to claim 59, further comprising:
a detecting portion that detects a state in which the image forming apparatus is used, wherein
when the detecting portion detects a predetermined state, the third bias application portion increases an absolute value of a peak voltage of the applied bias having the same polarity as a normal charging polarity of the developer so as to be larger than that before the predetermined state is detected.

61. The image forming apparatus according to claim 60, wherein
the detecting portion is an environment detection unit that detects environment information indicating an amount of moisture around the image forming apparatus, and
when the environment detection unit determines that an ambient environment of the image forming apparatus is a low-humidity environment, the third bias application portion increases an absolute value of a peak voltage of the applied bias having the same polarity as a normal charging polarity of the developer so as to be larger than that before the predetermined state is detected.

62. The image forming apparatus according to claim 60, wherein
the detecting portion is a detector that detects the number of rotations of the developer bearing member per unit time, and
when the detector determines that the image forming apparatus operates continuously, the third bias application portion increases an absolute value of a peak voltage of the applied bias having the same polarity as a normal charging polarity of the developer so as to be larger than that before the predetermined state is detected.

63. The image forming apparatus according to claim 60, wherein
the detecting portion is a detector that detects the amount of consumption of the developer per unit time in the image forming apparatus, and
when the detector determines that the rate of consumption of the developer is slow, the third bias application portion increases an absolute value of a peak voltage of the applied bias having the same polarity as a normal charging polarity of the developer so as to be larger than that before the predetermined state is detected.

64. The image forming apparatus according to claim 7, wherein the urethane resin has:
a carbonate bond in molecules thereof; and
a partial structure derived from a reaction of a compound represented by Structural Formula (1) and a polyisocyanate:

(C1)

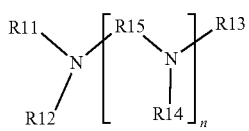

Structural Formula (1)

in Structural Formula (1),

R15 represents a linear or branched alkylene group having at least 2 and not more than 4 carbon attribute items, n is an integer of at least 1 and not more than 4, and a plurality of R15s are each independently defined similarly to the above when n is at least 2 and not more than 4, R11 to R14 are each independently any one selected from the group consisting of (a) to (d) below, a plurality of R14s are each independently defined similarly to the above when n is at least 2 and not more than 4, all of R11 to R14 are any one selected from the group consisting of (b) to (d) below when n=1, at least four of R11 to R13 and two to four R14s are any one selected from the group consisting of (b) to (d) below when n is at least 2 and not more than 4:

(a) a hydrogen atom or a linear or branched alkyl group having 1 to 4 carbon atoms;
(b) a linear or branched hydroxyalkyl group having 1 to 8 carbon atoms;
(c) a linear or branched aminoalkyl group having 2 to 8 carbon atoms; and
(d) a group represented by Structural Formula (2) below:

(C2)

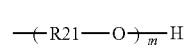

Structural Formula (2)

in Structural Formula (2), m is 2 or 3, and
a plurality of R21s each independently represent a linear or branched alkylene group having at least 2 and not more than 5 carbon atoms.

* * * * *